(12) United States Patent
Silver et al.

(10) Patent No.: US 11,903,086 B2
(45) Date of Patent: Feb. 13, 2024

(54) SYSTEM AND METHOD FOR PROVIDING MOBILE SERVICES VIA VIRTUAL ROAMING

(71) Applicant: TANGO NETWORKS, INC., Frisco, TX (US)

(72) Inventors: Andrew Silver, Frisco, TX (US); John Michael Murray, Selby (GB); Andrew George Bale, Watford (GB); Probal Mukherjee, Plano, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

(21) Appl. No.: 17/390,965

(22) Filed: Jul. 31, 2021

(65) Prior Publication Data
US 2023/0035850 A1 Feb. 2, 2023

(51) Int. Cl.
*H04W 8/08* (2009.01)
*H04W 4/24* (2018.01)
(52) U.S. Cl.
CPC ............. *H04W 8/08* (2013.01); *H04W 4/24* (2013.01)
(58) Field of Classification Search
CPC .................................. H04W 8/08; H04W 4/24

USPC ....................................................... 455/432.1
See application file for complete search history.

(56) References Cited

U.S. PATENT DOCUMENTS

| 2002/0012351 A1* | 1/2002 | Sofer | ................. | H04Q 11/0435 370/386 |
| 2009/0215449 A1* | 8/2009 | Avner | ..................... | H04W 8/06 455/433 |

* cited by examiner

*Primary Examiner* — Huy C Ho

(57) ABSTRACT

An example operation may include one or more of transmitting, via a virtual network, a message to a home network informing the home network that a home network subscriber device is roaming on the virtual network, activating, via the virtual network, a mobile subscription for the home network subscriber device on the virtual network, receiving, via the virtual network, a call for the home network subscriber device that is routed from the home network, routing the call from the virtual network to the home network subscriber device with the activated mobile subscription, wherein the routing further comprises executing, via the virtual network, value added services while routing the call from the virtual network to the home network subscriber device, generating, via the virtual network, a record of the executed value added services, and submitting, via the virtual network, the generated record to the home network.

20 Claims, 36 Drawing Sheets

VRS Call Origination From HNO

VRS SMS Origination From HNO

VRS SMS Origination From RNO

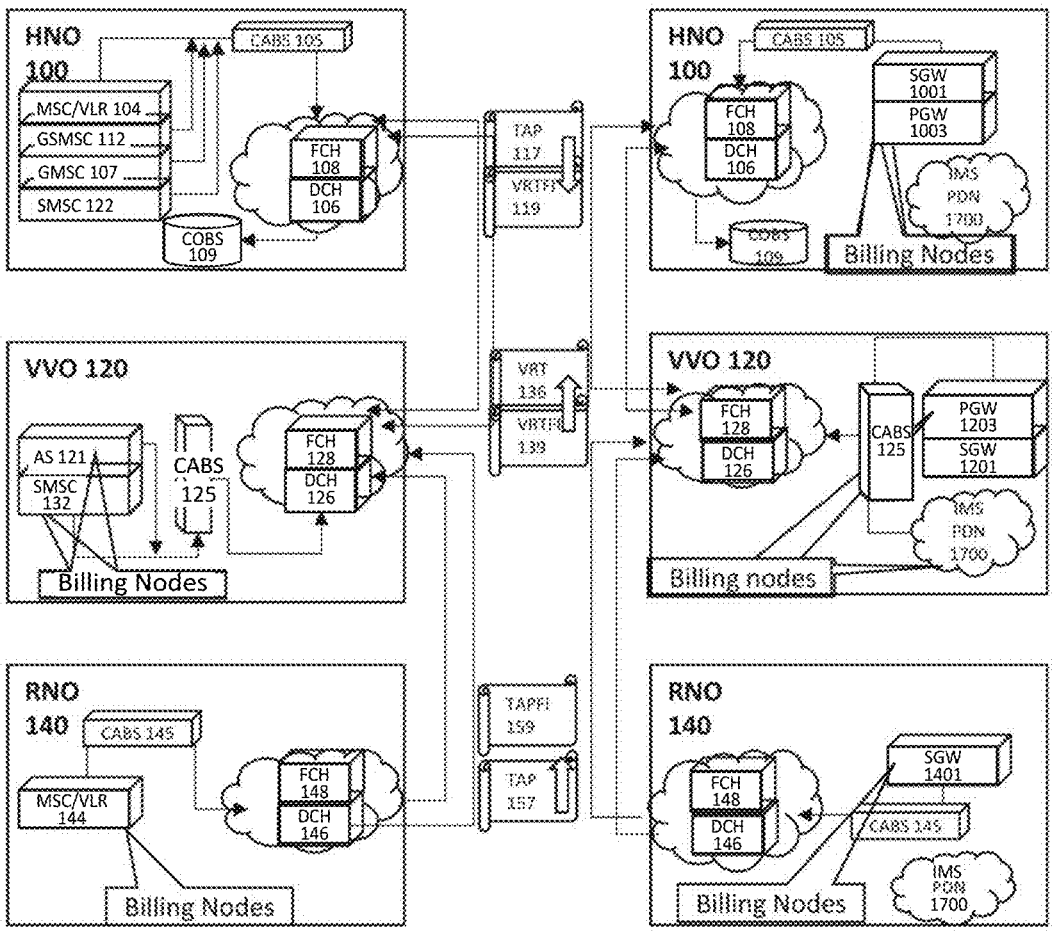

Commentary

Figure 30 shows a summary slide of the billing handling for a VRS subscriber. The salient point is that the billing flow does not change but the nodes involved in capturing raw data to generate billing TAP files to be exchanged between networks for the reconciliation changes.
For example, in 4G network the SGW in RNO plays the role of VMSC/VLR in the RNO.
The information captured to generate billing records towards the billing domain to be used by the TAP procedure are also different between CS and PS networks. But the end goal is one and the same.

Fig 30

SYSTEM AND METHOD FOR PROVIDING MOBILE SERVICES VIA VIRTUAL ROAMING

BACKGROUND

Disclosed are a system and method for enabling a mobile network operator (MNO) to provide value added services for subscribers of the MNO from another network operator without requiring changes to the MNO mobile network or billing infrastructure. The system facilitates billing and settlement arrangements between the MNO and the other network operator via common bilateral roaming agreements.

SUMMARY

One example embodiment provides a method that includes one or more of transmitting, via a virtual network, a message to a home network informing the home network that a home network subscriber device is roaming on the virtual network, activating, via the virtual network, a mobile subscription for the home network subscriber device on the virtual network, receiving, via the virtual network, a call for the home network subscriber device that is routed from the home network, routing the call from the virtual network to the home network subscriber device with the activated mobile subscription, wherein the routing further comprises executing, via the virtual network, value added services while routing the call from the virtual network to the home network subscriber device, generating, via the virtual network, a record of the executed value added services, and submitting, via the virtual network, the generated record to the home network.

Another example embodiment provides an apparatus that includes one or more of a network interface configure to transmit, via a virtual network, a message to a home network informing the home network that a home network subscriber device is roaming on the virtual network, and a processor configured to one or more of activate, via the virtual network, a mobile subscription for the home network subscriber device on the virtual network, receive, via the virtual network, a call for the home network subscriber device that is routed from the home network, route the call from the virtual network to the home network subscriber device with the activated mobile subscription, and execute, via the virtual network, value added services while routing the call from the virtual network to the home network subscriber device, generate, via the virtual network, a record of the executed value added services, and submit, via the virtual network, the generated record to the home network.

Another example embodiment provides a non-transitory computer-readable medium that includes instructions which when executed by a processor cause a computer to perform a method including one or more of transmitting, via a virtual network, a message to a home network informing the home network that a home network subscriber device is roaming on the virtual network, activating, via the virtual network, a mobile subscription for the home network subscriber device on the virtual network, receiving, via the virtual network, a call for the home network subscriber device that is routed from the home network, routing the call from the virtual network to the home network subscriber device with the activated mobile subscription, wherein the routing further comprises executing, via the virtual network, value added services while routing the call from the virtual network to the home network subscriber device, generating, via the virtual network, a record of the executed value added services, and submitting, via the virtual network, the generated record to the home network.

BRIEF DESCRIPTION OF THE DRAWINGS

FIG. 1 is a diagram illustrating a communication sequence of a virtual roaming call termination according to another example embodiment.

FIGS. 13A-3C are diagrams illustrating a process of a virtual mapping according to example embodiments.

FIG. 30 is a diagram illustrating an example of a billing summary.

GLOSSARY OF TERMS

Figure 1:
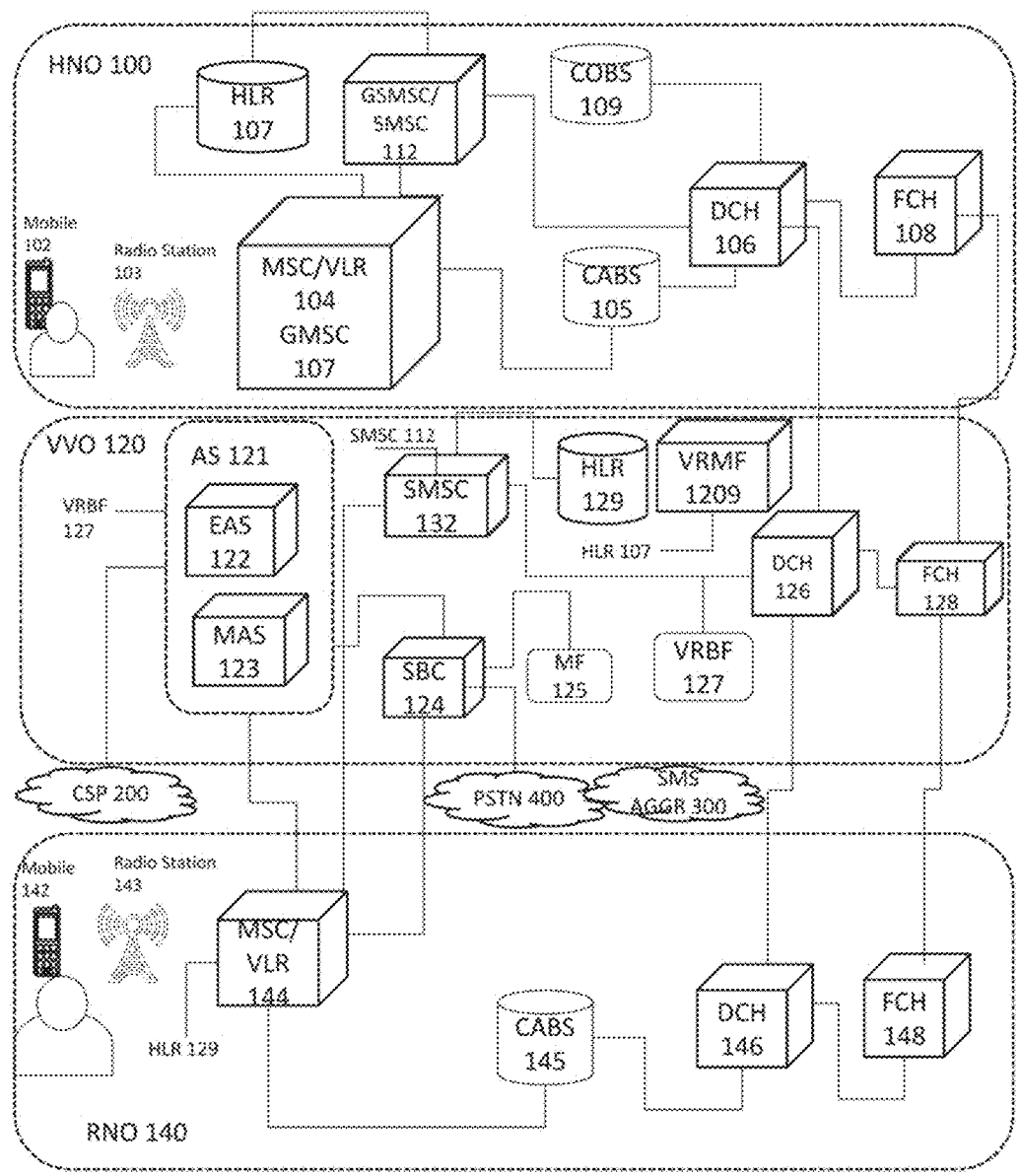
FIG. 1 is a diagram illustrating a network configuration according to an example embodiment.

API—Application Programming Interface
AS—Application Server
CABS—Carrier Billing System
COBS—Consumer Billing System
CSCF—Call Session Control Function
CSP—Customer Service Provider
CUPS—Control and User Plane Separation
DCH—Data Clearing House
EAS—Enterprise Application Server
eSIM—embedded SIM
FCH—Financial Clearing House
GMSC—Gateway MSC
GPRS—General Radio Packet Service
GSMSC—Gateway SMSC
GTP—GPRS Tunneling Protocol
HLR—Home Location Register
HNO—Home Network Operator
HNO ID—HNO identification or the past identification of a VRS subscriber as offered by the HNO. This can be but not limited to the international mobile station identity (IMSI or IMSI-HNO) of the subscriber.
HNO-L—HNO subscriber with an HNO SIM
HNO-V—HNO subscriber with a VVO SIM
HSS—Home Subscriber Server
HTTP—Hypertext Transfer Protocol
IMS—IP Multimedia Subsystem
IMSI—International Mobile Station Identity
IPSM-GW—IP Short Message Gateway
ISDN—Integrated Services Digital Network
LIR—Location Information Request/Response
LTE—Long Term Evolution
MAS—Mobility Application Server
MF—Mapping Function
MF—Mapping Function in the VVO
MME—Mobility Management Entity
MSC—Mobile Switching Centre
MSISDN—Mobile Station ISDN number
NW—Network
PDN—Packet Data Network
PGW—Packet Gateway
RNO—Roaming Network Operator
SGW—Serving Gateway
SIM—Subscriber Identification Module
SMS—Short Message Service
SMSC—Short Message Service Centre
TADS—Termination Access and Domain Selection
TAP-IN Process—the process by which a network receives a TAP or billing file from a roaming partner network indicating the usage incurred by an outbound roaming subscriber of the network in the roaming partner network
TAP-OUT Process—the process by which a network shares a TAP or billing file generated by the network with a roaming partner network to indicate to the roaming partner network the usage incurred by an inbound roaming subscriber of the roaming partner network.
TRN—Temporary Routing Number
VLR—Visited Location Register
VRBF—Virtual Roaming Billing Function
VRMF—Virtual Roaming Mobility Function
VRS—Virtual Roaming Subscriber, a subscriber who has subscribed to the VVO offering of services and has procured a new SIM/e-SIM from the VVO to obtain a new profile and services as offered by the VVO.
VVO ID—Virtual Visited Operator Identification. This is an identification that is used by the VVO to identify a VRS subscriber. This identification is, but not limited to, the international mobile station identity (IMSI or IMSI-VVO). For example, it can be the public number of the VRS subscriber should the VVO decide to assign one.
VVO—Virtual Visited Operator

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Disclosed are a system and method for enabling a mobile network operator (MNO) to provide value added services for subscribers of the MNO from another network operator without requiring changes to the MNO mobile network or billing infrastructure. The system facilitates billing and settlement arrangements between the MNO and the other network operator via common bilateral roaming agreements.

Roaming

Roaming is a broad technology set implemented to allow a subscriber of one network (the Home Network Operator—HNO) to set up a commercial and technical relationship with another operator (the Visited Network Operator—VNO) to allow the Home Network Operator's subscribers to receive service from the Visited Network Operator. These technologies and processes have been defined by the GSMA under the framework of IR.50 and IR.21, and are in broad use across the industry to permit Subscribers to receive consistent service in areas where their mobile provider does not have coverage.

Roaming is facilitated by technical interworking standards that allow the Home Network Operator to be notified when one of their subscribers arrives at a Visited Network Operator's base station and requests service, and to respond appropriately, allowing or denying service depending on the subscriber's service agreement.

This notification is facilitated by a standard message exchange between the Visited Network Operator and Home Network Operator, initiated by a Location Update message being sent by the Visited Network Operator to the Home Network Operator, indicating the existence of a subscriber wishing to receive service.

When the subscriber is successfully connected to the Visited Network Operator's network, the Home Network Operator will send calls and Short Message Service (SMS) text messages to the Visited Network Operator to be served to the subscriber, allowing the subscriber to continue to answer their calls and texts while roaming.

When making calls, or sending SMSs, roaming can be implemented in two main models: Home Routing, where the Visited Network passes calls and SMSs back to the Home Network to be handled; and Local Breakout, where the Visited Network handles call and SMS completion for the subscriber on behalf of the Home Network.

Roaming includes processes for cross-charging and settlement, to allow the Home and Visited Network Operators to have a clear view of the services that have been consumed by the subscriber to facilitate consistent charging for those services from the Visited Network Operator to the Home Network Operator and for the Home Network Operator to be able to settle those charges. These services, based on a standard called Transferred Account Procedure (TAP) files have been in recent years extended into a fully automated clearing house system enabling friction-free cross charging and settlement between operators.

Of note is the concept of Sponsored Roaming wherein an offering mobile operator of sponsored roaming service is able to provide a receiving mobile operator with the ability to offer the receiving operator's subscribers with roaming agreements in accordance with IR.21 from the offering operator's roaming arrangements. Typically the offering mobile operator provides the offering operator with IMSIs for use by the offering operator's subscribers. The IMSIs may be used by subscribers when they roam in certain service areas or countries and provide advantageous access, rates, services and other benefits to the subscriber and/or to the receiving operator. The IMSIs may be used by a single subscriber or may be shared across multiple subscribers by loading the IMSI(s) onto the subscriber SIM or eSIM and utilizing programmable software to select and utilize a desired IMSI based on criteria such as location, service requirements, time, etc.

Virtual Roaming

Virtual Roaming enables a Home Network Operator to offer unique services to the HNO subscribers operated by a Virtual Visited Network Operator by virtually roaming the HNO subscribers onto the network of the VVO, where the VVO does not necessarily operate a radio network.

As such, Virtual Roaming is not intended to address radio coverage gaps in the Home Network Operator's network—rather Virtual Roaming instead addresses functionality gaps in the service offerings.

With Virtual Roaming, the initial Location Update message is not sent to the HNO when the subscriber arrives at a radio base station operated by the VVO. Instead the message may be sent at a time agreed between the HNO and VVO whereby the VVO will begin providing call control and messaging control services to the HNO subscriber.

For example, if an HNO subscriber subscribes to a service offered by the VVO, the VVO will send a Location Update to the HNO network indicating the HNO subscriber is now virtually roaming on the VVO network. The VVO will continue to send any required Location Updates to the HNO to ensure the HNO subscriber remains on the VVO network until such time as the HNO, the HNO subscriber or the VVO desire to terminate the service. At that point the HNO can update the location information to reflect that the HNO subscriber is no longer on the VVO network.

In essence, Virtual Roaming leverages the sophisticated and powerful capabilities inherent in the HNO's network to simply and rapidly move the call and messaging control for the HNO subscriber to the VVO's network, where unique and/or innovative services can be provided. Virtual Roaming may use Local Breakout to enable the HNO to pass all controls to the VVO to be handled on behalf of the subscriber.

The VVO provides the subscriber with new services, which may include the ability to connect to a variety of mobile radio networks, be they the same mobile radio networks as those offered by the HNO or the radio networks of other mobile operators; or different types of radio networks such as WiFi, private mobile networks such as private LTE or private 5G and 6G networks. In these cases, the VVO may provide the subscriber with new technologies to facilitate connection to these networks, such as a new Subscriber Identity Module (SIM) card or Embedded SIM (eSIM) subscription to attach to the mobile networks.

While the subscriber is registered on the VVO network, the subscriber's HNO subscription SIM or eSIM is not utilized for registering on any network—otherwise the HNO network will stop directing calls and messages to the VVO network. Instead, the HNO subscription SIM or eSIM is stored or vaulted and can be reinstated for registration at a point where the HNO desires to re-activate the subscriber on the HNO network such as following the termination of the offering of VVO services to the HNO subscriber.

When the subscriber uses chargeable facilities, the VVO will charge the HNO via TAP files which emulate the situation which would have occurred had the subscriber used real network facilities of the VVO. In some cases, this will include the subscriber using facilities of the HNO such as the HNO radio network, which the HNO will submit as wholesale charges to the VVO. The VVO will then charge these same costs back to the Home Network Operator in separate TAP files.

In many cases, such as where the VVO network is utilizing the radio network resources of the HNO to service the HNO subscriber utilizing the VVO network services, these charges will be equal and identical, and therefore result in a zero cross-charge between the operators, providing for zero-cost usage of the VVO's services by the HNO's subscriber. The VVO may provide a separate charge to the HNO for the utilization of the VVO services by the HNO subscriber, be they individual charges for each service invocation, individual charges for each service over a time period such as monthly or annual subscription, aggregate charges for groups of services and/or aggregate charges for all services over a time period such as monthly or annual subscriptions.

In the case where the VVO network is utilizing the radio network resources of a network other than then HNO, denoted as the radio network of a Roaming Network Operator (RNO), the VVO will be capable of passing on the RNO network usage charges to the HNO for the HNO subscriber usage, in addition to any VVO network service charges. In this case the charges between the HNO and VVO will not necessarily be equal and identical.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

FIG. 1 is a diagrammatic representation of an exemplary network system in which embodiments disclosed herein may be implemented. The system comprises a HNO 100, a VVO 120 and a RNO 140 which may be interconnected for the purpose of enabling mobile phone calls, messaging and data transmissions to occur.

HNO 100 comprises a home mobile network of Mobile 102 and Mobile 142. In order to utilize the services of the VVO 120, an arrangement between HNO 100 and VVO 120 results in the HNO 100 SIM or eSIM of Mobile 102 and Mobile 142 to not become active on any public mobile network. For example, the HNO 100 SIM or eSIM of Mobile 102 and Mobile 142 may be removed and stored in a safe location, known as vaulting, such that these SIMs will not accidentally be activated on a public mobile network. Subsequently, Mobile 102 and Mobile 142 are provided with a SIM or eSIM belonging to the VVO 120 network wherein at least one IMSI is associated with the VVO 120 network. Because VVO 120 maintains roaming agreements with HNO 100 and with RNO 140, FIG. 1 depicts Mobile 102 of HNO 100 with SIM or eSIM and IMSI of VVO 120 activated and operating in HNO 100, and Mobile 142 of HNO 100 with SIM or eSIM and IMSI of VVO 120 activated and operating in RNO 140. In the subsequent descriptions Mobile 102 and Mobile 142 may be considered the same mobile with the same SIM or eSIM and IMSI depicted as operating in different radio networks of either HNO 100 or RNO 140, or they may be considered different mobiles with different SIMs or eSIMs and IMSIs wherein Mobile 102 is activated and operating on HNO 100 and Mobile 142 is activated and operating on RNO 140.

The HNO 100 has a switching network comprised of MSC/VLR 104 and GMSC 107 for servicing Mobile 102 and Mobile 142 and interconnecting with other communications networks, HLR 107 containing the subscription information associated with Mobile 102 when Mobile 102 utilizes a SIM, eSIM or other subscription identifier and at least one IMSI for HNO 100, SMSC 112 for enabling SMS messaging, CABS 105 for handling carrier billing for HNO 100, DCH 106 for reconciling data record transactions between HNO 100 and other networks, FCH 108 for reconciling financial transactions between HNO 100 and other networks, COBS 109 supporting consumer billing for Mobile 102 of HNO 100. While the subscription information for Mobile 102 is stored in HLR 107 and is active thereby enabling the subscriber associated with Mobile 102 to be billed for usage, the SIM, eSIM or other subscription identifier and at least one IMSI in Mobile 102 are replaced with a SIM, eSIM or other subscription identifier and at least one IMSI from VVO 120.

VVO 120 harbors the necessary components, but not limited to, similar to that of a carrier network to render value added services to the customers of a mobile network carrier as depicted by HNO 100 for example. VVO 120 not only communicates with the mobile, landline line systems served by legacy or current architectures and protocols, it also helps in bridging enterprise networks as shown by CSP 200, with the existing carrier networks mobile or otherwise via legacy systems or more modern technologies such as 4G LTE, 5G, 6G.

VVO 120 includes but is not limited to the following nodes and their roles: HLR 129 which plays an important role carrying out switching functions and helps establish and manage communications between mobile phones and other networks such as PSTN 400. HLR 129 comprises the central database that contains details of each mobile phone subscriber that is authorized to use the mobile core network.

The application server AS 121 which forms a core component of the VVO 120 plays specific roles in the bridging of different types of carrier networks and thus holds two primary sub-components EAS 122 and MAS 123. EAS plays a significant role in the VVO 120 to help interworking with the Enterprise networks while MAS helps integrate the mobility side of the carrier networks with VVO 120. EAS 122 and MAS 123 may be comprised of a single node or operate as separate nodes that are communicatively coupled. EAS interworks with the CSP 200 enterprise network over session-based protocols to not only support data, messaging, voice, video capabilities but also has the ability to work over the internet-based protocols to interconnect with monitoring systems. EAS also has the ability to work as a messaging system pass through, monitoring and/or generator for simple text-based messaging or enriched multi-media messaging. This configuration may enable carrier network VVO 120 to have a central point of control for interacting with multiple enterprises, and may not require the use of legacy SS7 messaging to the enterprise. Rather, it can have a secure IP connection supporting SIP or other internet based protocols. This is also useful for offering a Centrex solutions for interconnecting with a carrier-hosted Unified Communications (UC) or Private Branch Exchange (PBX), or for interconnecting a carrier-hosted gateway server with enterprise-hosted PBX systems. MAS works hand in hand with EAS to support similar capabilities for the mobility aspect of the VVO 120 provided sub scribers.

SMSC 132 enables text messaging interconnect with the PSTN world via the SMS Aggregator 300 or to other SMSC 112. It also can connect to switching nodes MSC/VLR 144, 104 in other networks such as RNO 140 and HNO 100. Although not shown via connectivity lines, each node in FIG. 1 has the ability to connect to any node on its own or an external network as long as the handshake protocol is common. SMSC 132 also communicates with HLR 129 to locate and validate subscribers and connects with SMSC 112 of HNO 100 to send and receive messages over a common protocol as agreed upon by the networks HNO 100 and VVO 120.

SBC 124 interfaces with external networks and provides any security, topology hiding or transcoding functionalities that may be required, among other services and capabilities. It can also interwork with network and switching systems to provide mapping functionalities from one personality or subscription to another by invoking functions that are introduced by this document of claim.

The newly introduced mapping function MF 125 in VVO 120, provides a multi-purpose role interworking with systems such as AS 121, SBC 124, SMSC 132 and in later figures, packet gateway systems. MF enables and facilitates mapping of identities between VVO 120 and the HNO 100, helps billing systems as depicted by DCH 126 and FCH 128 by providing billing elements with proper identities to be conveyed to HNO 100. MF 125 works hand in hand with another newly introduced network function VRBF 127.

Billing is a key aspect of this claim whereby the VVO 120 has to settle charges with the RNO 140 and HNO 100 and wherein the VRBF plays an integral role by invoking other functions provided in the VVO 120 network. VRBF works on the TAP elements of charging exchanged between the billing systems of various networks and provides correct charging information such as identities, location information, network information among other data and which may mask or alter the information of the acquired identity and actual location and network towards the HNO 100 from where the VR subscriber actually came from. VRBF 127 is almost network agnostic and can play the roles equally in legacy as well as more modern 4G, 5G, 6G and future networks.

VVO 120 also offers additional new functionalities via VRMF 1209. Although shown here as a standalone function, it is an integral part of the switching system role in VVO 120. VRMF 1209 handles the roles of the access system to facilitate virtual roaming by informing HLR 107 of HNO 100 about the location of the VR subscriber. VRMF 1209 provides to the HLR 107 the pseudo location of the VRS subscriber as being located in VVO 120 while in the real world the VRS subscriber may be roaming anywhere in the world. This allows the HNO 100 to think that its subscribers that have subscribed to the Virtual Roaming services are located in the VVO 120 network and thereby settles charges with the VVO 120 accordingly. VRMF 1209 is interconnected with the HLR 107 of HNO 100 providing MSC/VLR type of functionality by keeping the HNO 100 updated via location update related messaging for legacy networks and registration related messaging to the more modern networks such as IMS/VoLTE 4G, 5G, 6G and beyond. VRMF 1209 in essence represents the VRS and the access system in VVO 120.

CSP 200 represents the enterprise network and is typically comprised of systems such as the UC or PBX for enterprise desk or soft phones, gateways to the outside world such as PSTN 400, messaging systems which can work with the outside world over protocols such as SMPP and HTTP. In general, CSP 200 represents an enterprise network with all its facilities that it needs to provide services to the enterprise users. In addition to that, CSP 200 integrates with AS 121 via EAS 122 to provide a mobile leg to the enterprise users. As mentioned earlier, EAS 122 closely works with MAS 123 to integrate the enterprise side with the mobile carriers. SMS Aggregator 300 provides connectivity to the outside world of messaging and interworks with VVO 120 over well-known protocols such as SMPP and HTTP. It also plays a role in bringing in messages from the outside world. RNO 140 comprises a roaming mobile network of Mobile 102 and Mobile 142.

RNO 140 comprises a roaming mobile network of Mobile 102 and Mobile 142. The RNO 140 has a switching network comprised of MSC/VLR 144 which may include a GMSC and Radio Station 143 for servicing Mobile 102 and Mobile 142 and interconnecting with other communications networks. MSC/VLR 144 interconnects with AS 121 for facilitating value added communications services, SMSC 132 for facilitating SMS text services and SBC 124 for facilitating interconnection of communications with other networks, in VVO 120. RNO 140 may also include CABS 145 for handling carrier billing, DCH 146 for reconciling data record transactions between RNO 140 and other networks and FCH 148 for reconciling financial transactions between RNO 140 and other networks.

Figure 2:
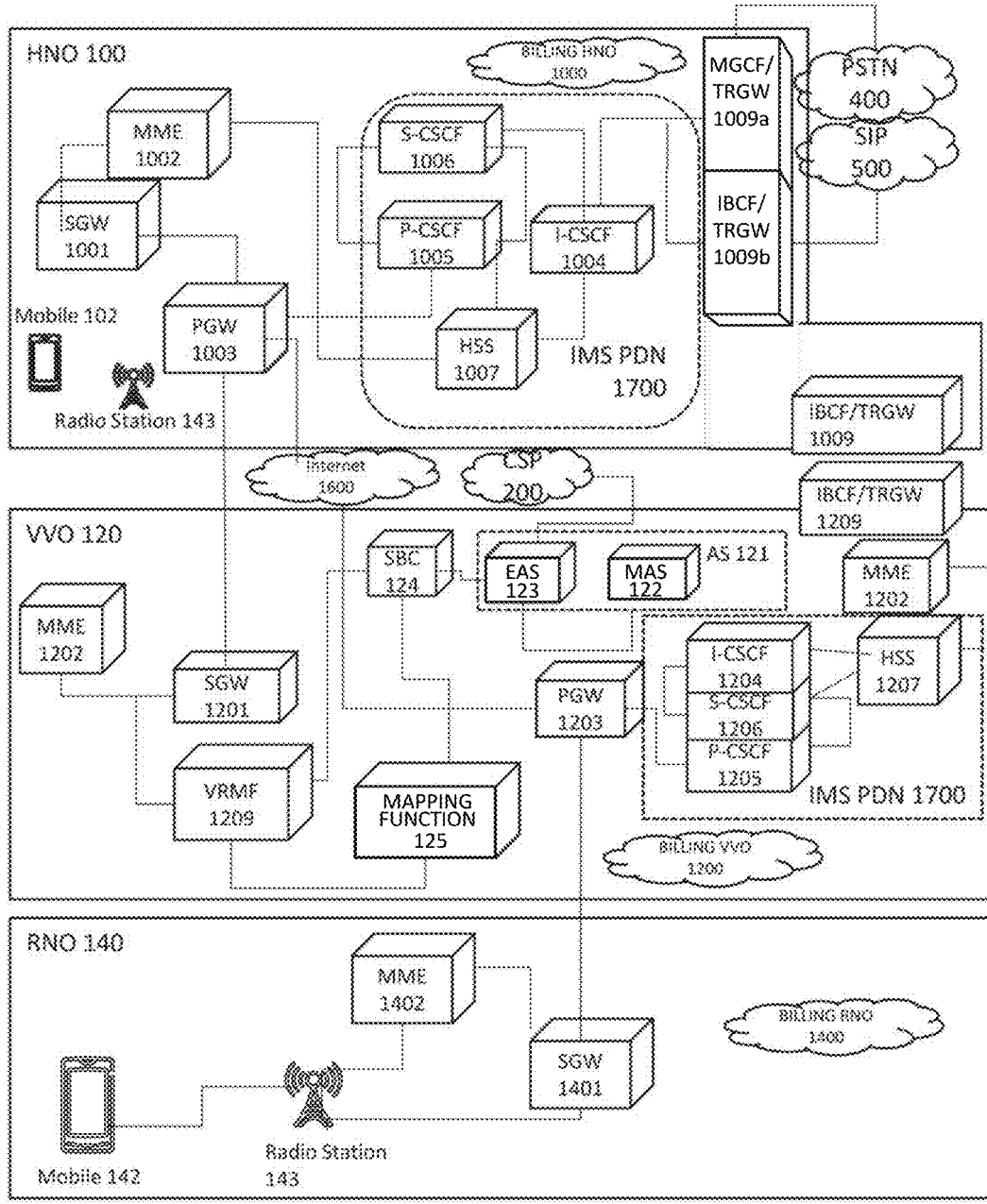
FIG. 2 is a diagram illustrating a network configuration according to another example embodiment.

FIG. 2 is a diagrammatic representation of an exemplary 4G packet network system in which embodiments disclosed herein may be implemented. The system comprises a HNO 100, a VVO 120 and a RNO 140 which may be interconnected for the purpose of enabling mobile phone calls, messaging and data transmissions to occur. HNO 100 comprises a home mobile network of Mobile 102 and Mobile 142. In order to utilize the services of the VVO 120, an arrangement between HNO 100 and VVO 120 results in the HNO 100 SIM or eSIM of Mobile 102 and Mobile 142 to not become active on any public mobile network. For example, the HNO 100 SIM or eSIM of Mobile 102 and Mobile 142 may be removed and stored in a safe location, known as vaulting, such that these SIMs will not accidentally be activated on a public mobile network. Subsequently, Mobile 102 and Mobile 142 are provided with a SIM or eSIM belonging to the VVO 120 network wherein at least one IMSI is associated with the VVO 120 network. Because VVO 120 maintains roaming agreements with HNO 100 and with RNO 140, FIG. 1 depicts Mobile 102 of HNO 100 with SIM or eSIM and IMSI of VVO 120 activated and operating in HNO 100, and Mobile 142 of HNO 100 with SIM or eSIM and IMSI of VVO 120 activated and operating in RNO 140. In the subsequent descriptions Mobile 102 and Mobile 142 may be considered the same mobile with the same SIM or eSIM and IMSI depicted as operating in different radio networks of either HNO 100 or RNO 140, or they may be considered different mobiles with different SIMs or eSIMs and IMSIs wherein Mobile 102 is activated and operating on HNO 100 and Mobile 142 is activated and operating on RNO 140.

The HNO 100 has an IP network comprised of the IMS domain also referred to as the IMS PDN 1700 for servicing Mobile 102 and Mobile 142 and interconnecting with other communications networks, HSS 1007 containing the subscription information associated with Mobile 102 when Mobile 102 utilizes a SIM, eSIM or other subscription identifier and at least one IMSI for HNO 100, MME 1002 for facilitating mobility and session control, CABS 105, a part of the billing domain of HNO 100, for handling carrier billing for HNO 100, DCH 106 for reconciling data record transactions between HNO 100 and other networks, FCH 108 for reconciling financial transactions between HNO 100 and other networks, COBS 109 supporting consumer billing for Mobile 102 of HNO 100.

While the subscription information for Mobile 102 is stored in HSS 1007 and is active thereby enabling the subscriber associated with Mobile 102 to be billed for usage, the SIM, eSIM or other subscription identifier and at least one IMSI in Mobile 102 are replaced with a SIM, eSIM or other subscription identifier and at least one IMSI from VVO 120. The IMS PDN 1700 includes the P-CSCF 1005 which is the access to the handset via several other nodes and ultimately the Radio Station 143 (or E-NodeB in 4G technology) and acts as the first entry point into the IMS domain and interfaces with the S-CSCF (1006) to provide service and security to the mobile user.

I-CSCF 1004 is responsible for interworking with HSS 1007 to locate subscribers and is the entry point into the IMS domain from an external network trying to reach the mobile subscriber Mobile 102. Although HSS 1007 is shown as a part of the IMS PDN 1700, it is also an integral part of the access system working with MME 1002 (providing mobility and session control). SGW 1001 and PGW 1003 are packet gateways that work with each other over the tunneling protocol called GTP (GPRS Tunneling Protocol) to provide data and signaling bearer to and from the Mobile 102 to the IMS PDN or the Internet 1600. Data can be in the form of file upload/download, video streaming, voice calls and its associated signaling. Border gateway MGCF/TRGW 1009a provides access to the legacy world, where the MGCF aspect of it handles signaling conversion from SIP to legacy (example via ISUP), while TrGW provides bearer transcoding from one format to another. IBCF/TRGW 1009 provides security across the border by performing topology hiding for example and also transcoding the bearer.

VVO 120 comprises a 4G mobile network enabling mobile phone calls, messaging and data transmissions for mobile devices. VVO 120 may or may not have a radio network and core IMS network including but not limited to the CSCFs. VVO 120 has a services and switching network comprised of HSS 1207 containing subscription information associated with Mobile 102 or Mobile 142 when Mobile 102 or Mobile 142 utilize a SIM, eSIM or other subscription identifier for the VVO 120 mobile network, AS 121 for facilitating value added communications services to Mobile 102 or Mobile 142 wherein AS 121 may be comprised of EAS 122 for interconnecting with enterprise applications and networks and MAS 123 for interconnecting with carrier applications and networks and wherein AS 121 may interconnect with CSP 200 for routing sessions. HSS 1207 may interconnect with HNO 100 via MME 1002, and RNO 140 via MME 1402. VVO 120 also may include IBCF/TRGW 1209 for facilitating interconnection of communications with other networks such as PSTN 400 and SMS Aggregator 300.

VVO 120 may include the gateway functionalities of SGW 1201 and PGW 1203. SGW 1201 is the pathway to the HNO 100 network, whenever VVO 120 makes a decision to route VVO 120 transiting sessions towards the HNO 100 for reasons defined by the subscriber profile or internetwork agreements. PGW 1203 is the breakout point for VRS subscribers should they choose to access Internet APN 1600 from the VVO 120 for example. PGW 1203 interworks with the IMS PDN 1700 of VVO 120 to provide VoLTE services to VRS subscribers. The gateways are an integral part of providing packet sessions whether it is voice or video or simple data download related activities with the IMS and Internet domains.

VVO 120 may include the VRMF 1209 and Mapping Function 125 which support the virtual roaming service for the HNO 100 and VVO 120. VRMF 1209 is an entity whose responsibility, not limited to, lies in updating HSS 1007 about a VRS subscriber's location and registration status with the aid of Mapping Function 125. VRMF 1209 provides the virtual mobility and session status of a VRS subscriber towards the HNO 100. It also provides the encapsulation and decapsulation of wrappers, namely tunneling protocol envelopes, of the user data traffic leaving from or arriving at the Mobile handset of a VRS subscriber. Mapping Function 125 is not limited to providing identification mapping between VVO 120 and HNO 100—it can also provide mapping of destination identities in the IP packet headers transiting VVO 120 towards the HNO 100 among other mappings.

VVO 120 may also include as a part of the Billing Domain 1200, DCH 126 for reconciling data record transactions between VVO 120 and other networks, FCH 128 for reconciling financial transactions between VVO 120 and other networks. DCH 126 may interconnect with IMS PDN 1700, modifying and originating billing information as will be explained in subsequent descriptions. DCH 126 may interconnect with Mapping Function 125 for mapping of billing information between VVO 120 and at least one of HNO 100 and RNO 140 as will be explained in subsequent descriptions.

RNO 140 comprises a roaming mobile network of Mobile 102 and Mobile 142. The RNO 140 has a packet network comprised of MME 1402 and the SGW 1401. Resulting from the establishment of roaming agreements with VVO 120, the interface to VVO 120 is S8HR, the home routing interface between SGW 1401 of RNO 140 and PGW 1203 of VVO 120. RNO 140 may also include as a part of the billing domain for RNO 140, CABS 145 for handling carrier billing, DCH 146 for reconciling data record transactions between RNO 140 and other networks and FCH 148 for reconciling financial transactions between RNO 140 and other networks.

Figure 3A:
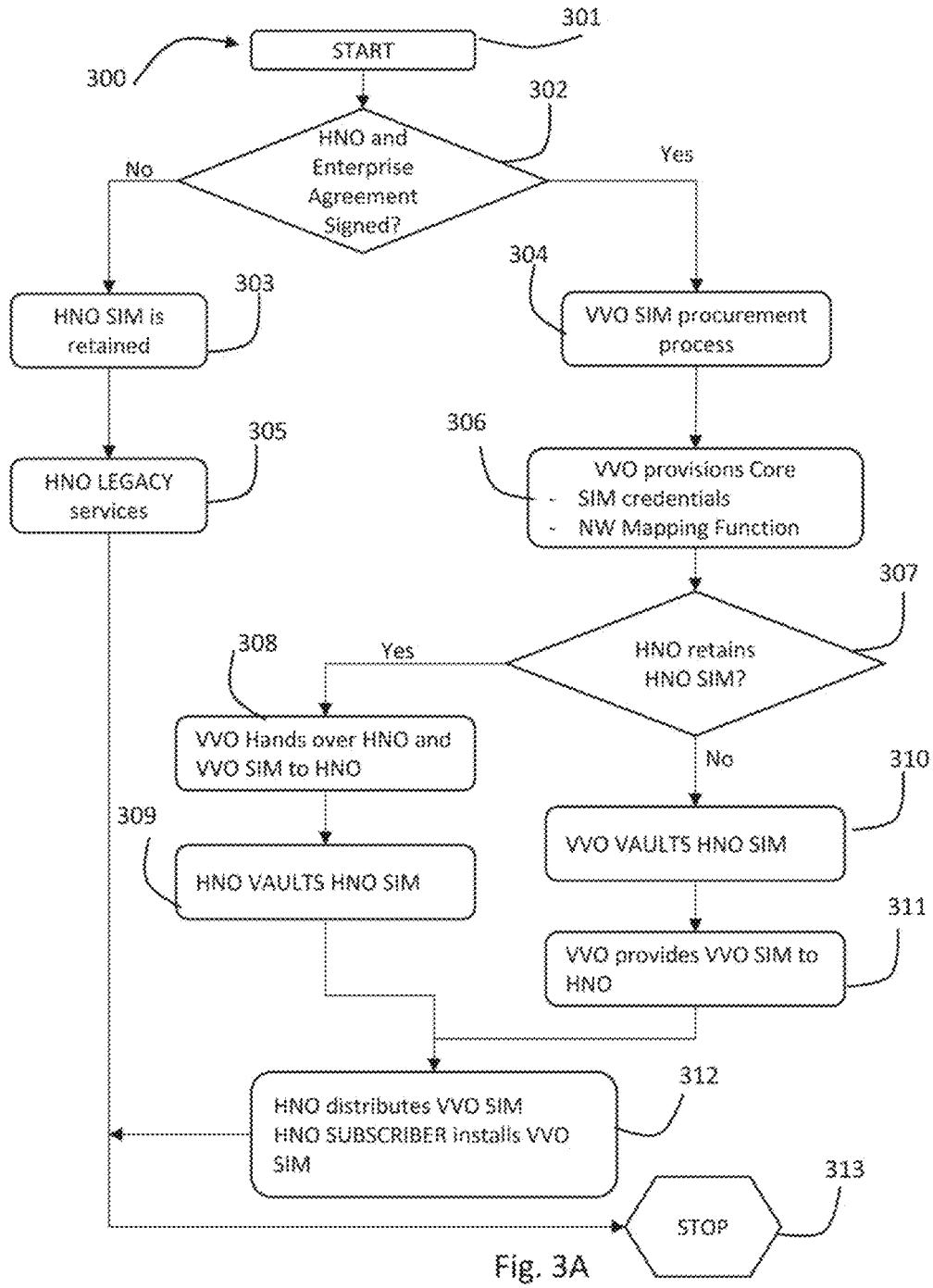
FIGS. 3A and 3B are diagrams illustrating a SIM card swap process according to example embodiments.

FIG. 3A is a flowchart 300 that depicts the collaboration process between the carrier networks HNO 100 and VVO 120 which enables a VRS to procure a new SIM card or eSIM for an existing mobile phone to be able to utilize advantageous services offered by the VVO 120. There may be background processes that require the intervention of personnel in both the networks, such as logistics for shipping, storing or vaulting of a SIM card or eSIM. The SIM swap process 300 begins at 301 as the HNO 100 signs on to offer VVO 120 services for the subscribers of the HNO 100 in 302. This process is a collaboration between the two network operators, which begins with the signing of an agreement between the two operators (step 302) with the enterprise being a customer to such a service agreement. If such an agreement with an enterprise does not exist then the HNO 100 subscriber (the mobile user) retains the existing SIM (step 303) and the current services rendered by the HNO 100 are retained (step 305) and the SIM SWAP process 300 comes to an end (step 313).

On the other hand if an enterprise network has signed an agreement to provide VVO 120 services to its subscribers in 302, the SIM or eSIM procurement process begins (step 304) wherein users can submit their old SIM or eSIM for storage (if HNO 100 may wish to be able to restore HNO 100 services at a later time) or discard. The VVO SIM/eSIM procurement process 304 may be a manual process wherein the HNO 100 SIM is physically removed from the HNO 100 subscriber mobile phone and replaced with a VVO SIM from the VVO 120; or it can be an automated process wherein a VVO eSIM is allocated to the HNO 100 subscriber mobile device and overwrites the HNO 100 eSIM. The eSIM can be procured by scanning a QR-code on the HNO 100 mobile device, for example.

Once the SIM/eSIM procurement process 304 has been completed and in order for VVO 120 to offer the services to the HNO 100 subscriber, VVO 120 starts provisioning its network nodes with the subscriber profile. HLR 129 of VVO 120 is provisioned with VRS subscriber credentials and new identities representing the HNO 100 subscriber in the VVO 120 network, network mapping function MF 125 is provisioned with the logic to map between HNO ID comprising at least the HNO IMSI and VVO ID comprising at least the VVO IMSI (and vice versa), VRMF 1209 is provisioned with the capability of providing location information about the VRS subscriber to HLR 107 of HNO 100. These are some of the basic information that is provisioned for a VRS subscriber in the VVO 120 for the services to be rendered successfully.

During this time the HNO 100 decides if it wants to retain the old SIMs or eSIMs for a later use should the user/enterprise elect to revert to HNO 100 services (step 307). If the HNO 100 decides to retain the old SIM, it either receives the physical SIM from VVO 120 or directly from the HNO 100 subscribers (step 308). HNO 100 can vault the old SIM in step 309 so as to ensure that they do not inadvertently register on a mobile network thereby interrupting the VVO 120 services. Similarly the HNO 100 can vault an eSIM by storing the eSIM information in a database. Similarly, the VVO 120 can retain and vault the old SIM or eSIM in step 310 and then proceed to distribute the new VVO SIM or eSIM to the HNO 100 (step 311). HNO 100 can distribute the VVO SIM or eSIMs in batches or individually in step 312 to the HNO 100 subscribers or to an enterprise to distribute to their employees that are HNO 100 subscribers. The VVO SIMS are then inserted into the HNO 100 subscriber mobile phones and activated on the network to avail the agreed upon services. Similarly the VVO eSIMs are then loaded into the HNO 100 subscriber mobile phones and activated on the network to avail the agreed upon services and the process concludes in step 313.

Figure 3B:
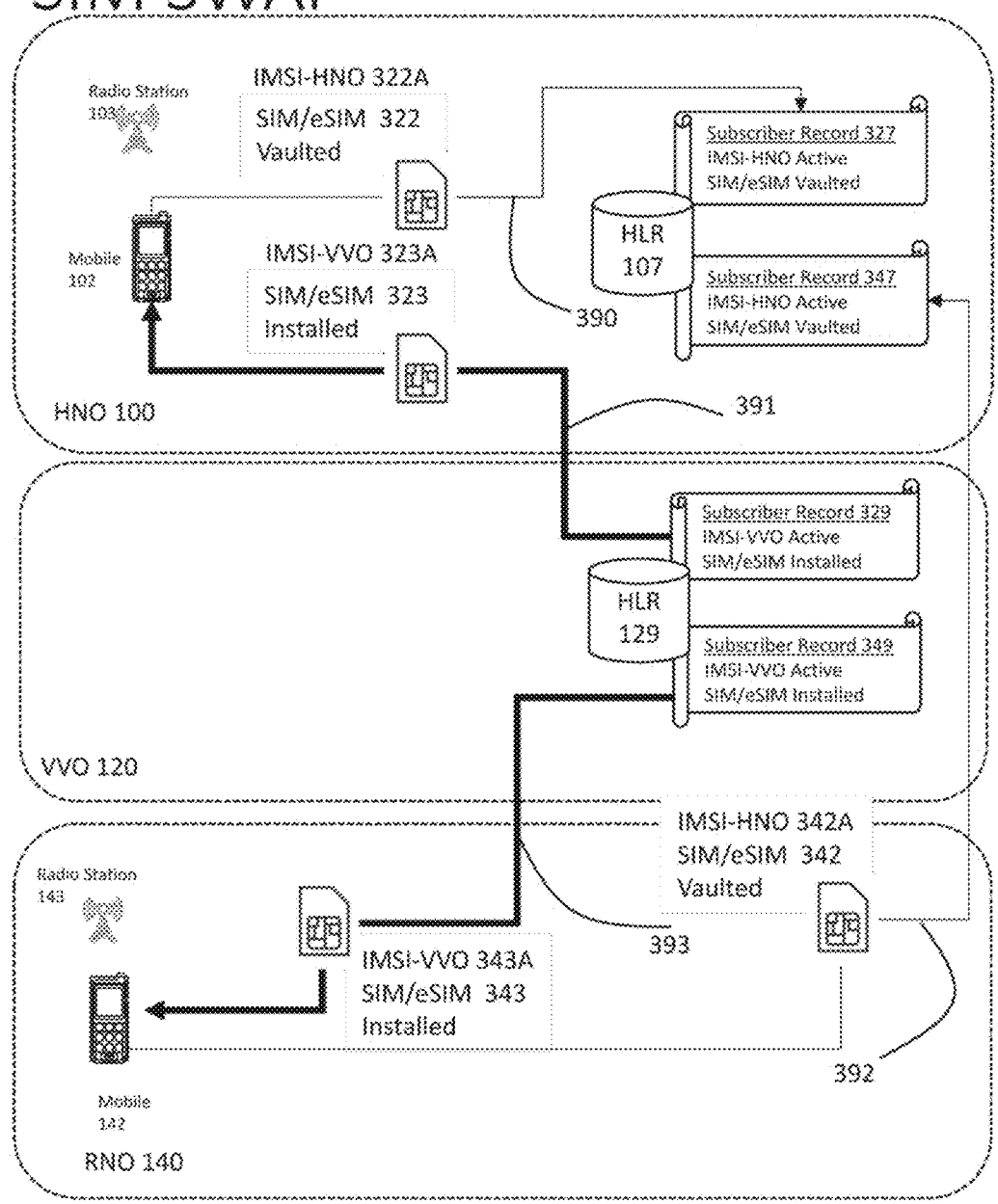

FIG. 3B is a diagrammatic representation of the SIM/eSIM swap process whereby the HNO 100 credentials are yielded by the VRS subscriber and the VVO 120 provided new credentials are adopted and provisioned in the VVO 120 nodes, namely HLR 129. This does not eliminate the profile of the VRS subscriber from the HLR 107. It remains active for three primary reasons:

a) should the subscriber desire to regain its services from the HNO 100 or if the HNO 100 should desire to terminate VVO services for the subscriber, the subscriber's profile will be ready to be easily swapped back;

b) call termination to the VRS subscriber has to go through the HNO 100 since the VRS subscriber's public identity such as the MSISDN are associated with the HNO 100;

c) HLR 107 must keep a record of the subscriber's pseudo location in the VVO 120.

Step 390 shows how the old SIM/e-SIM 322 provided by the HNO 100 having a profile called Subscriber Record 327 in the HLR 107 is removed from the handset Mobile 102 in the HNO 100 and stored or vaulted either by the VVO 120 or the HNO 100 as agreed upon by the two network providers. The profile of the SIM/e-SIM 322 called Subscriber Record 327 is active in the HLR 107. This facilitates the call terminations and the receipt of periodic pseudo location from the VVO 120.

Step 391 shows how a new profile is created on the HLR 129 of VVO 120, called Subscriber Record 329 of the installed SIM/e-SIM 323 provided by the VVO 120. IMSI-VVO 323A is the key to the Subscriber Record 329.

Step 392 shows how the old SIM/e-SIM 342 provided by the HNO 100 having an IMSI-HNO 322A in the HLR 107 is removed from the handset Mobile 142 roaming in the RNO 140 and vaulted either by the VVO 120 or the HNO 100 as agreed upon by the two network providers. The profile of the SIM/e-SIM 342 in the HLR 107 of HNO 100 is called Subscriber Record 347 and is shown to be active. This facilitates the call terminations and the receipt of periodic pseudo location from the VVO 120.

Step 393 shows how a new profile is created on the HLR 129 of VVO 120, called Subscriber Record 349 of the installed SIM/e-SIM 343 provided by the VVO 120. IMSI-VVO 343A is the key to the Subscriber Record 349.

Figure 4:
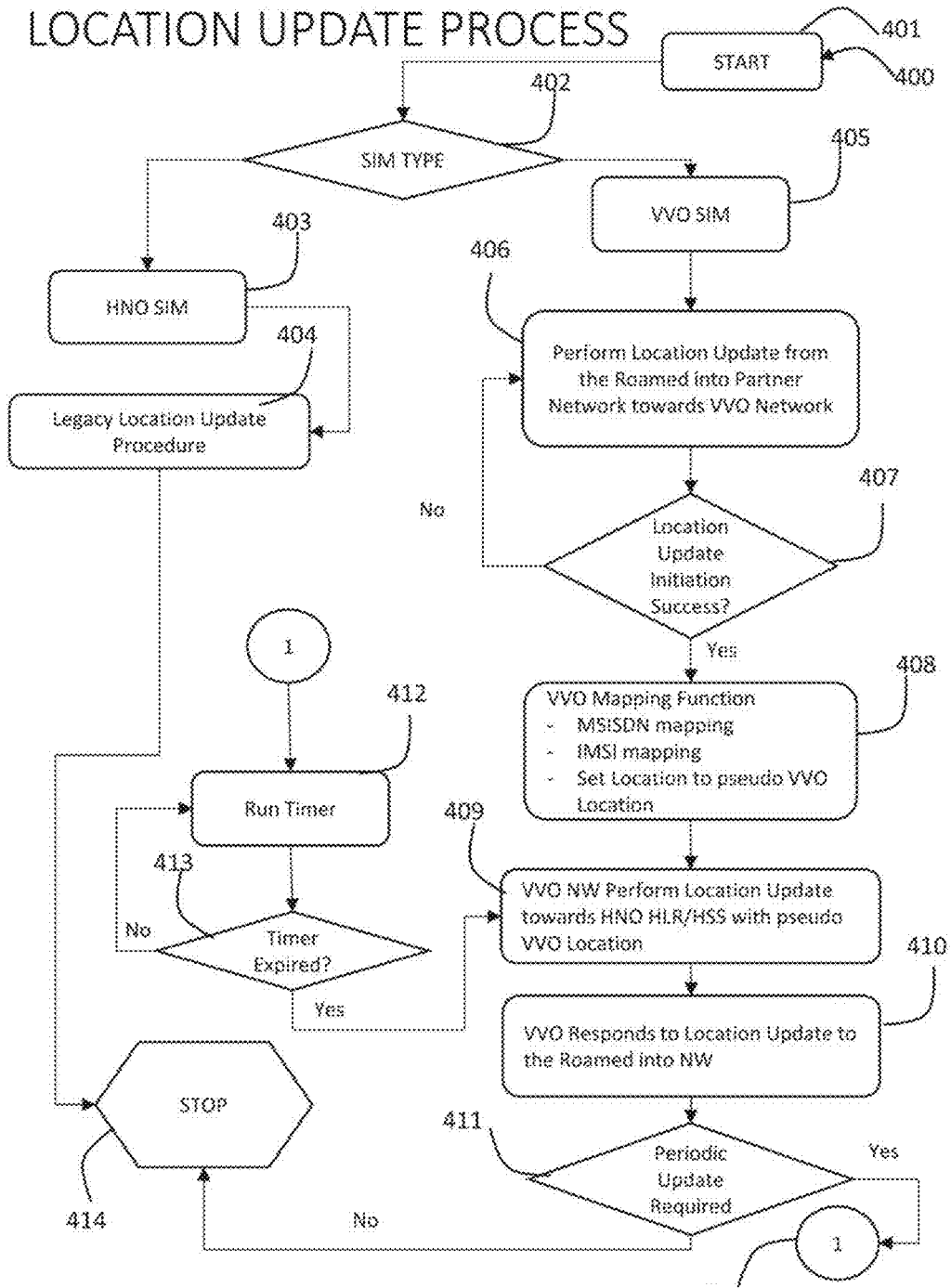
FIG. 4 is a diagram illustrating a location update process according to an example embodiment.

FIG. 4 is a flowchart 400 that depicts the Location Update Process in VVO 120 performing a location update on behalf of the VRS subscriber towards the HNO 100 irrespective of the actual location of the VRS. This process entails VVO 120 providing HNO 100 with the pseudo location information to facilitate proper routing of terminating calls to the VRS. By this mechanism, any calls destined to the VRS subscriber shall be routed to the VVO 120 by the HNO 100. The VVO 120 process then takes over to route the call to the actual location of the VRS.

The processing steps of FIG. 4 may be implemented as automated instructions tangibly embodied on a computer-readable medium executable by a processing system, at the behest of a manual intervention using the internet access. There may be background processes that mandate the intervention of personnel in VVO 120, such as for SIM swap, provisioning, etc.

The Location Update Process is invoked (step 401) as soon as it has been determined that the SIM has been provisioned and activated for a VRS subscriber in the VVO 120. If the SIM type check (step 402) results in an HNO SIM (step 403) the process Legacy Location Update Procedure (step 404) takes over and VVO 120 has no role to play. The Legacy Location Update procedure happens in the HNO 100, and the procedure stops (step 414) in the VVO 120.

If the VRS subscriber has been provided and activated with a VVO SIM with new value-added services (step 405) VVO 120 takes over the location update process (step 406). This process invokes functions residing in nodes as shown in FIG. 1, namely MF 125, VRMF 1209. The process (step 406) involves VVO 120 representing the HNO 100 subscriber and providing pseudo location information to HLR 107 indicating that the subscriber location is in the VVO 120 when in actuality the VRS subscriber could be roaming anywhere in the world including HNO 100. During this process VRMF 1209 works as the MSC/VLR node in the VVO 120 representing the VRS subscriber, invokes the Location Update process (407). If the initiation process is a success, i.e. there is indeed a link up and alive with the HNO 100 node. If not, the Location Update process has to restart (step 406). The VRMF 1209 invokes the MF 125 to map information between VVO ID and HNO ID (step 408) prior to actually sending a Location Update request to HNO 100. Once the identification mapping is a success, VRMF injects the pseudo location information for the VRS subscriber, indicating the VVO 120 location and sends the message towards HNO 100 HLR 107 (step 409). VVO 120 at the same time receives a location update process from the RNO 140, assuming that the subscriber has powered on and roamed into RNO 140. VVO 120, upon receipt of such an indication shall respond to the RNO 140 (step 410). Note, this step may not happen, so if the VRS subscriber indeed has not powered on but the VVO 120 has already performed a location update towards the HNO 100 on the subscriber's behalf, any incoming call and message shall be routed to voice mail or stored in the SMSC 132 (VVO 120). Once the VVO 120 has successfully responded to the RNO 140 location update process and has completed the Location update process towards HNO 100, VVO 120 decides if it needs to perform a periodic update towards the HNO 100 for the VRS subscriber (step 411). If not, the process ends (step 414). If indeed a provisioned information is resident in the VVO 120 (either on a per subscriber basis or a nodal information) the process transitions to extract and execute the timer (step 412). The process of running a timer checks if the timer has expired (step 413), if not the run timer process is continued with the remaining value of the timer. If the timer has indeed expired, the process transitions to performing Location Update towards HNO 100 (step 409) and the process continues.

Figure 5:
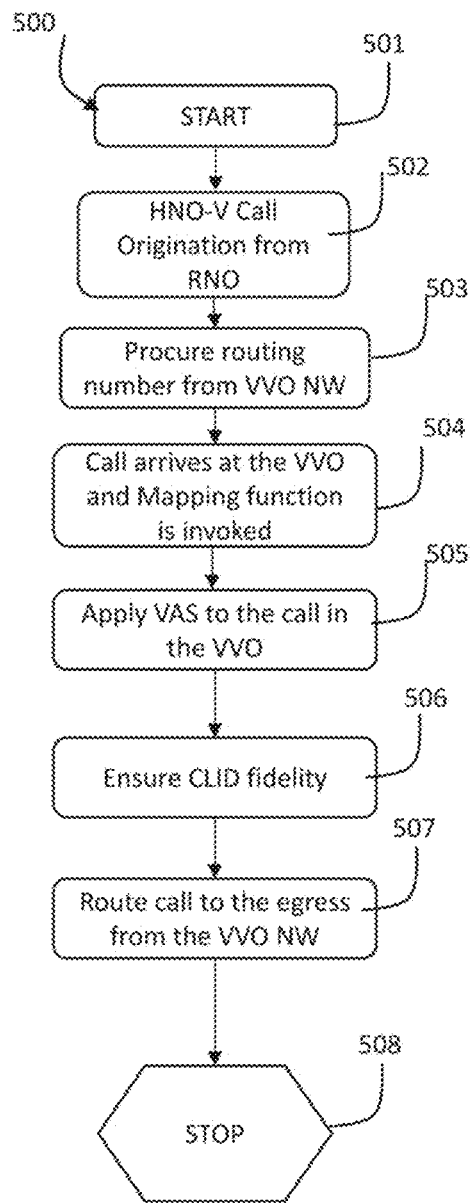
FIG. 5 is a diagram illustrating a virtual roaming call origination process according to an example embodiment.

FIG. 5 is a flowchart 500 that depicts the Call Origination Process initiated by a VRS subscriber from the perspective of a 2G/3G network. This process has to be manually initiated by a VRS subscriber.

The process starts with the VRS subscriber having successfully performed a location update into and attached to the current network RNO 140 (or which can be HNO 100) ready to dial any public number (step 501). The call origination happens from the RNO 140 (step 502) and the call signaling is routed to the VVO 120. The VVO 120, upon detecting the VRS subscriber-initiated call, recognizes the actual location, identity, network to which it is attached, and other relevant information from the signaling. The VVO 120 network is responsible for forced routing the call to AS 121 in VVO 120 and hence the procurement of the temporary routing number process is invoked (step 503).

EAS 122 and MAS 123 of AS 121 in VVO 120 work hand in hand to generate and assign and respond with a temporary routing number to the triggering node in RNO 140. The temporary routing number assigned by AS 121 routes the call to the VVO 120 through the PSTN network or via a direct interconnect if it exists and is preferred. Once the call arrives at the EAS 122 of VVO 120, the mapping function MF 125 is invoked to restore the call properties using the temporary routing number as the key (step 504).

EAS 122 and MAS 123 of AS 121 apply any VAS (step 505) and per agreement with HNO 100. AS 121 ensures that the fidelity of the calling line identity is maintained within the VVO 120 network (step 506). The call is then routed to the CSP 200 domain, the egress path for VVO 120 subscribers where further origination services can be applied by nodes within the CSP domain (step 507) and the process ends within the VVO 120 (step 508). Of note is that the services are invoked in the enterprise or CSP domain which has the capability to execute originating services such as to alter the calling line identification, representing a more generic number for enterprise users rather than a direct line to the VRS.

Figure 6:
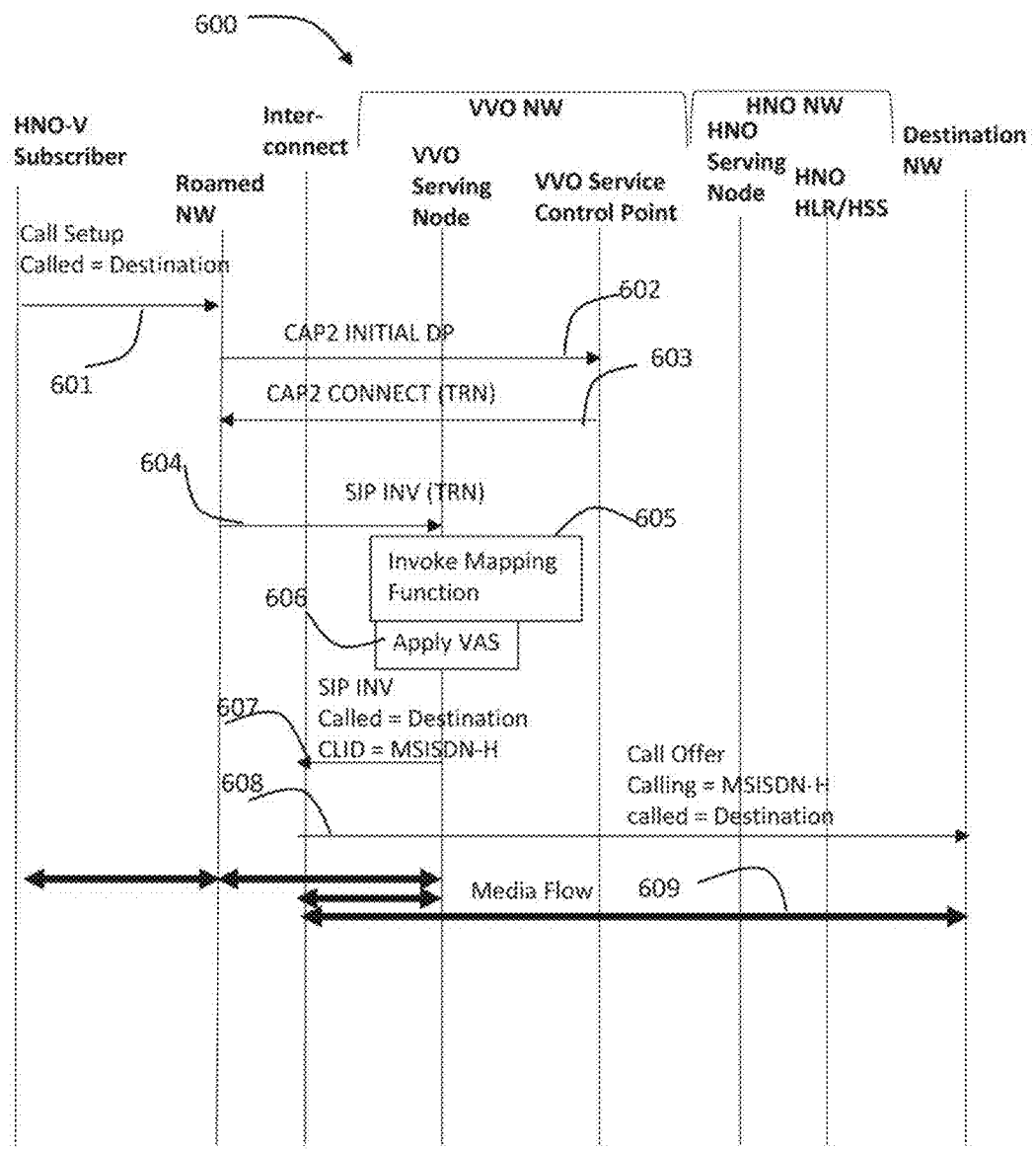
FIG. 6 is a diagram illustrating a communication sequence of a virtual roaming call origination according to an example embodiment.

FIG. 6 depicts a signaling flow 600 where one can assume that the VRS subscriber has successfully location updated in the RNO 140 and is initiating an originating voice call whereby the call setup signaling (step 601) using DTAP/RANAP protocol is sent from the handset to the network node, namely MSC/VLR 144 of RNO 140. The destination number is in the setup message sent to the MSC/VLR. As the VRS subscriber is provisioned with CAMEL profile on the HLR 129 of VVO 120, it was assumed to be downloaded successfully on to the MSC/VLR 144 when the VRS subscriber location updated in the RNO 140.

Upon receipt of the call origination signaling, the CAMEL trigger logic results in a CAP 2 (CAMEL Application Protocol Version 2) protocol call control message being sent to the AS 121 which comprises a service control point function played by MAS 123 (step 602). MAS 123 recognizes the VRS subscriber, captures location information, destination number and other call characteristics and provides a temporary routing number (TRN) to the RNO 140 signaling node MSC/VLR 144 (step 603). The call characteristics are stored against the TRN for it to be retrieved later. The call traverses through the public network and prior to reaching AS 121 of the VVO 120 network a gateway, external/internal to VVO 120, converts the protocol to SIP, if it is not so already and the call is extended to the VVO 120 service node AS 121 in the form of a SIP INVITE with TRN being the TO (destination) party number (step 604).

At this point based on the TRN AS 121 more specifically EAS 122 locates the original call characteristics, restores them by using the mapping function (step 605). Once the original call characteristics have been restored VVO 120 applies VAS to the call, ones that have been provisioned against the VRS (step 606). Post application of the VAS the call information is checked to ensure that the line identity is correct (step 607) and the call is routed to the egress interconnect. Although generically shown as an interconnect, for a VRS subscriber this can be the CSP 200 domain if it belongs to an enterprise. The enterprise can apply other originating services which might alter the calling line identification for topology hiding purposes, for example, before it is sent towards the final destination network (step 608). Media flow is shown in bold arrows (step 609).

Figure 7:
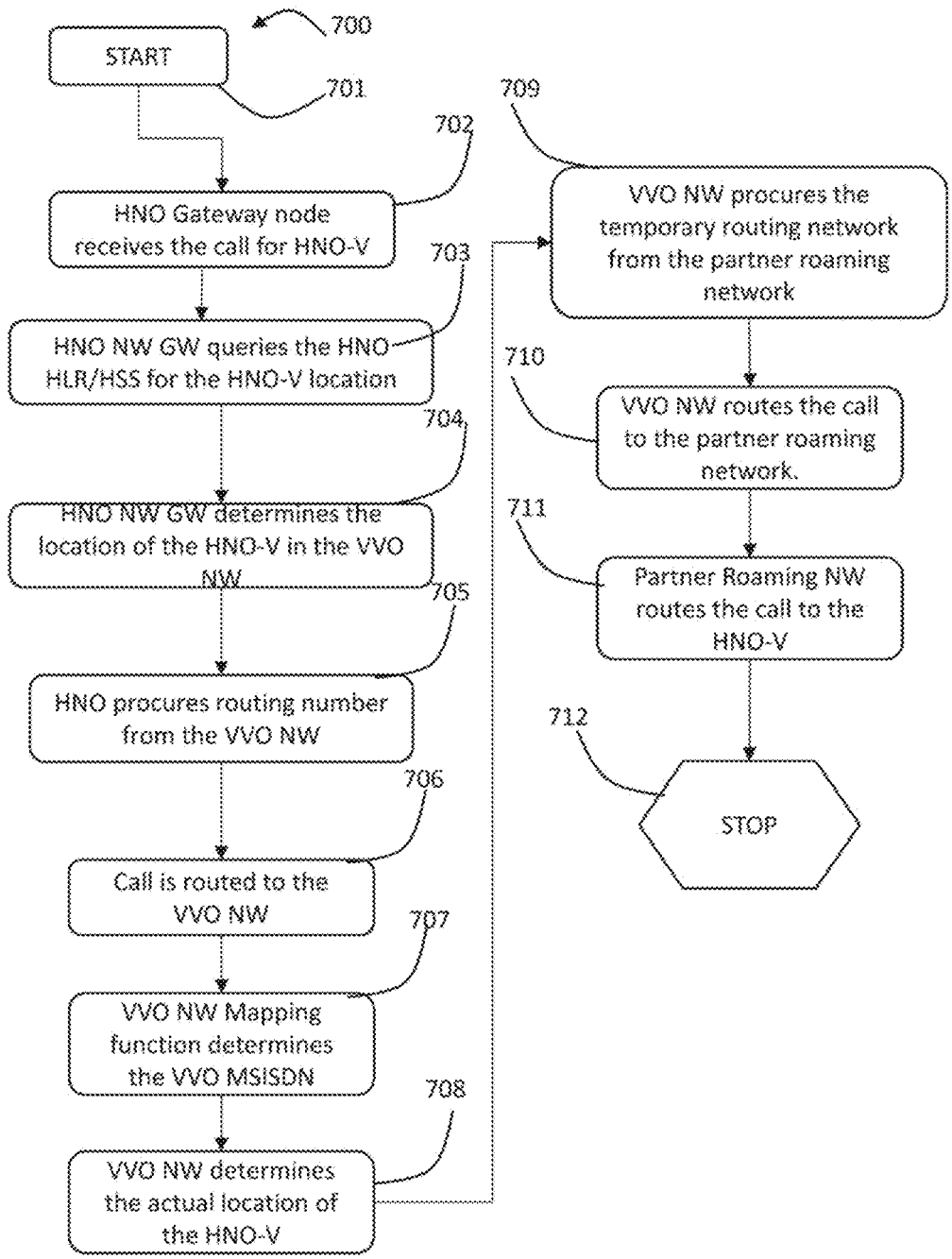
FIG. 7 is a diagram illustrating a virtual roaming call termination process according to an example embodiment.

FIG. 7 is a flowchart 700 that depicts the Call Termination Process initiated by a VRS subscriber while in the realm of a 2G/3G network. This process has to be manually initiated by a VRS subscriber.

The process starts with the VRS subscriber having been successfully location updated into and attached to the current network RNO 140 (which can be HNO 100 if the serving network happens to be owned by the home operator) ready to receive any call from a well-defined public number (step 701). As there is no change in the public number of the VRS subscriber, any call terminated towards it still reaches the HNO 100 gateway node (step 702). In order to complete a call, the HNO 100 first has to determine the location of the subscriber. This is done by querying the HLR/HSS 107 of the HNO 100 (step 703). HLR/HSS 107 of the HNO 100 is under the impression that the subscriber is located in the VVO 120 (step 704). This is due to the location update procedure induced by VVO 120 providing pseudo-location of the VRS subscriber to the HNO 100. There are different mechanisms that can be introduced to route the call towards VVO 120 from HNO 100. These can be manual configuration of a contiguous batch of VRS subscribers, via intelligent triggers, or via querying databases for example. In this diagram the solution resorts to intelligent triggers to procure a temporary routing number from the VVO 120 (step 705) for the call to be routed to the VVO 120 network for further processing (step 706). This is required as the VVO 120 is aware of the actual location of the subscriber. The call arrives at the VVO 120 with a temporary routing number. VVO 120 MF 125 is invoked to restore the call characteristics and then map to the VRS VVO-ID (step 707). VVO 120 queries its own HLR/HSS 129 to procure the actual location of the subscriber which is using the VVO-ID (step 708). This location query is performed with the mapped information as the VRS subscriber is known to the RNO 140 by the VVO ID. VVO 120 gets involved in the process of call termination and requests RNO 140 to provide a temporary routing number for the VRS subscriber, which is completed as per the regular mobile termination process (step 709). Using the routing number provided by RNO 140, VVO 120 extends the call to RNO 140 (step 710). RNO 140 uses the temporary routing number to identify the destination of the call to the VRS subscriber (step 711) and the process comes to an end (step 712).

Figure 8:
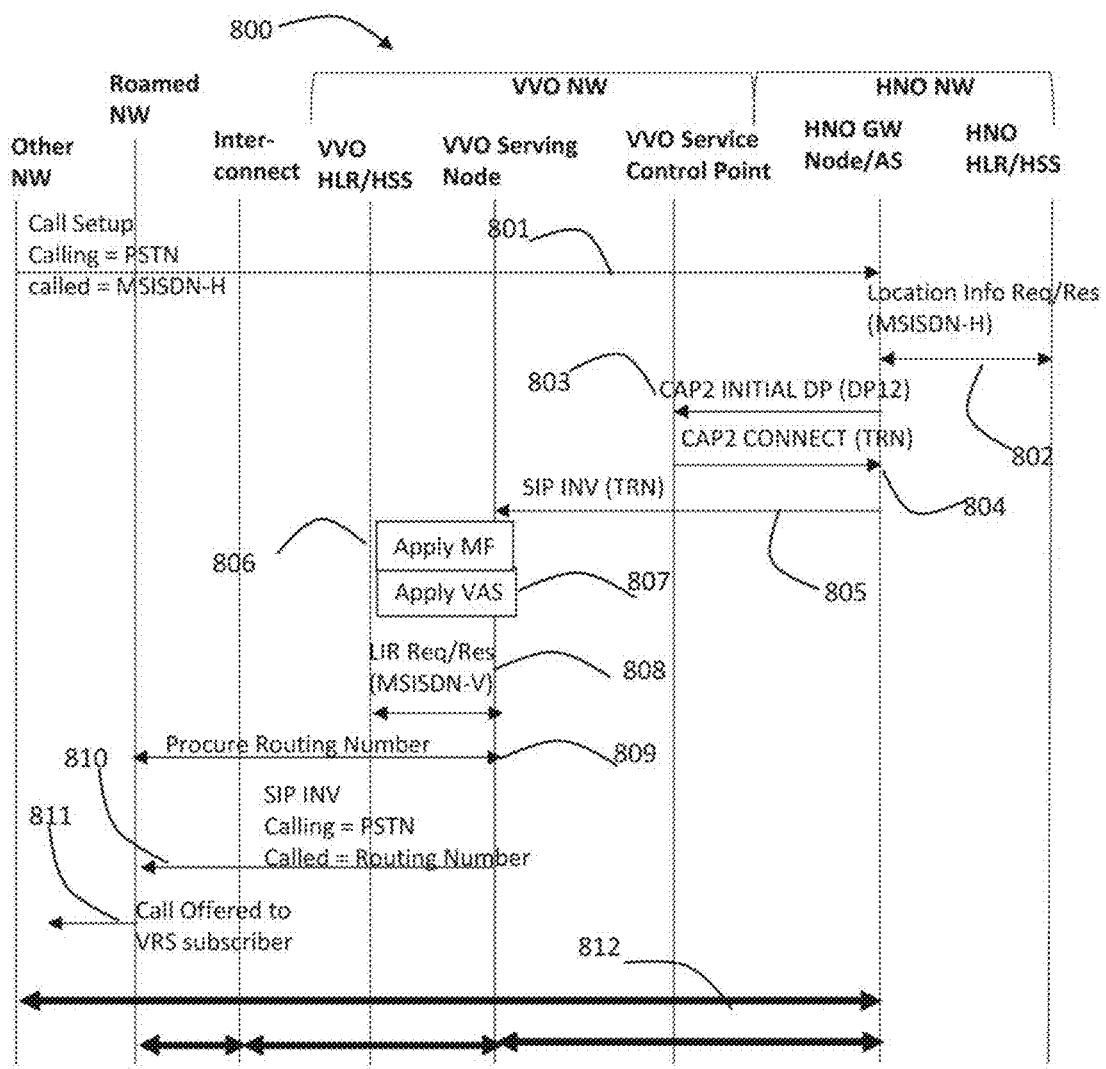
FIG. 8 is a diagram illustrating a communication sequence of a virtual roaming call termination according to an example embodiment.

FIG. 8 depicts a signaling flow 800 where one can assume that the VRS subscriber has successfully updated its location in the RNO 140 and has the ability to successfully receive a terminating voice call from an external network (PSTN)

from any subscriber with a public number (step 801). The call arrives at the HNO 100 gateway. This is because the external world still knows the VRS subscriber by its public number which has not changed. Thereby any call to the VRS subscriber always reaches HNO 100 first. HNO 100 gateway node, knowing its own subscriber, queries the location of the subscriber by querying the HLR/HSS 107 (step 802). This process is performed using the MSISDN-H identity of the VRS subscriber. HNO 100 gateway, upon realizing the subscriber profile, contacts VVO 120 via an intelligent trigger to obtain a temporary routing number for the call (step 803). AS 121, working as a Service Control Point in VVO 120, is responsible for handling the query. MAS 123 works with EAS 122 to generate the routing number and provides it to the gateway node of HNO 100 (step 804). The routing number is a temporary routing number which is publicly routable in the public domain and leads the call to VVO 120 from HNO 100 (step 805). This call can be routed from HNO 100 to VVO 120 via legacy protocols such as ISUP and then transitioned to a more modern protocol such as SIP before it reaches AS 121 in VVO 120 via some session border controller in VVO 120 as a SIP INVITE with the routing number as the destination number. Once the call reaches VVO 120, MF 125 is invoked to restore the call characteristics and then map any HNO 100 provided identification to VVO 120 provided identification (step 806). In this manner, VVO 120 knows it is now responsible for handling a VRS subscriber. Any value-added services offered at VVO 120 for the VRS subscribers are then provided (step 807). Value added services are not just restricted to some services in the VVO 120—they can be in the form of VVO 120 routing the call or session to a CSP 200 partner. CSP 200 comprises nodes such as a Unified Communications (UC), Contact Center (CC), PBX or other session control service which can also apply its own value-added services. This results in the call being routed via CSP 200 and arriving back as EAS 122 of AS 121 in VVO 120. This is followed by a real termination attempt by VVO 120 to the VRS subscriber which is located in RNO 140.

VVO 120 now attempts to terminate the call to the VRS subscriber and in order to do that the actual location must be known. MAS 123 of AS 121 in VVO 120 is responsible for querying HLR 129 in VVO 120 to extract the actual location of the VRS subscriber (step 808). Although shown as MSISDN-V, it can equally be the public identity MSISDN-H, provided by HNO 100. This claim can handle both cases and for now let us assume MSISDN-V and MSISDN-H are identical. Upon determining the actual location of the VRS subscriber in RNO 140, serving node AS 121 in VVO 120 contacts the serving node in RNO 140, possibly MSC/VLR 144, to obtain the temporary routing number (step 809). The call is extended to RNO 140 via interconnects with the calling party identity retained as the original calling party (step 810). RNO 140 is responsible for extending the call to the VRS subscriber (step 811) after restoring call characteristics from the temporary routing number. The media path of the call is shown (step 812).

Figure 9:
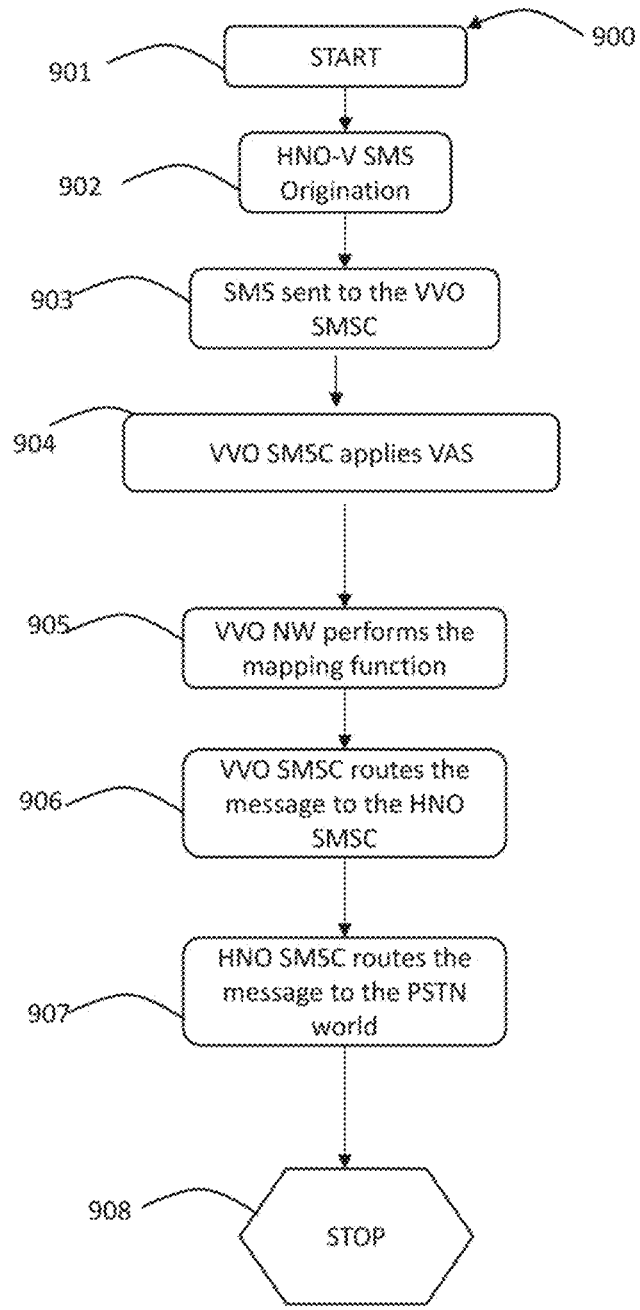
FIG. 9 is a diagram illustrating a process of applying value added services according to an example embodiment.

FIG. 9 is a flowchart 900 that depicts the Short Message Service Origination Process initiated by a VRS subscriber while in the realm of a 2G/3G network. This process may be manually initiated by a VRS subscriber. The process starts (step 901) after the VRS subscriber has successfully updated its location in a network such as RNO 140. Since the VRS subscriber has gone through a process of SIM SWAP (Ref. FIG. 3A, FIG. 3B) it has a new physical SIM card in the handset. The SIM card provided by VVO 120 has the SMSC 132 information stored therein. As a result any origination attempt of a short message by the VRS subscriber (Step 902) is always sent to the VVO 120 defined SMSC address. SMSC 132 of VVO 120 receives the short message which is passed by MSC/VLR 144 of RNO 140 (step 903). VVO 120 applies any value-added services that pertains to the VRS subscriber (step 904). VVO 120 invokes MF 125 (step 905) to determine the VRS subscriber identity in HNO 100. This must be done if the message is to be sent via HNO 100 for any needed regulatory services. Post mapping of identities, SMSC 132 of VVO 120 routes the message to the corresponding entity SMSC 112 in HNO 100 (step 906). HNO 100 at this point can also invoke any regulatory services that are mandated. SMSC 112 is already connected to the outside world via SMS interconnects to deliver messages (step 907) from HNO 100 to the outside world. The process ends in HNO 100 following successful delivery of the message (step 908) to the SMS interconnect.

Figure 10:
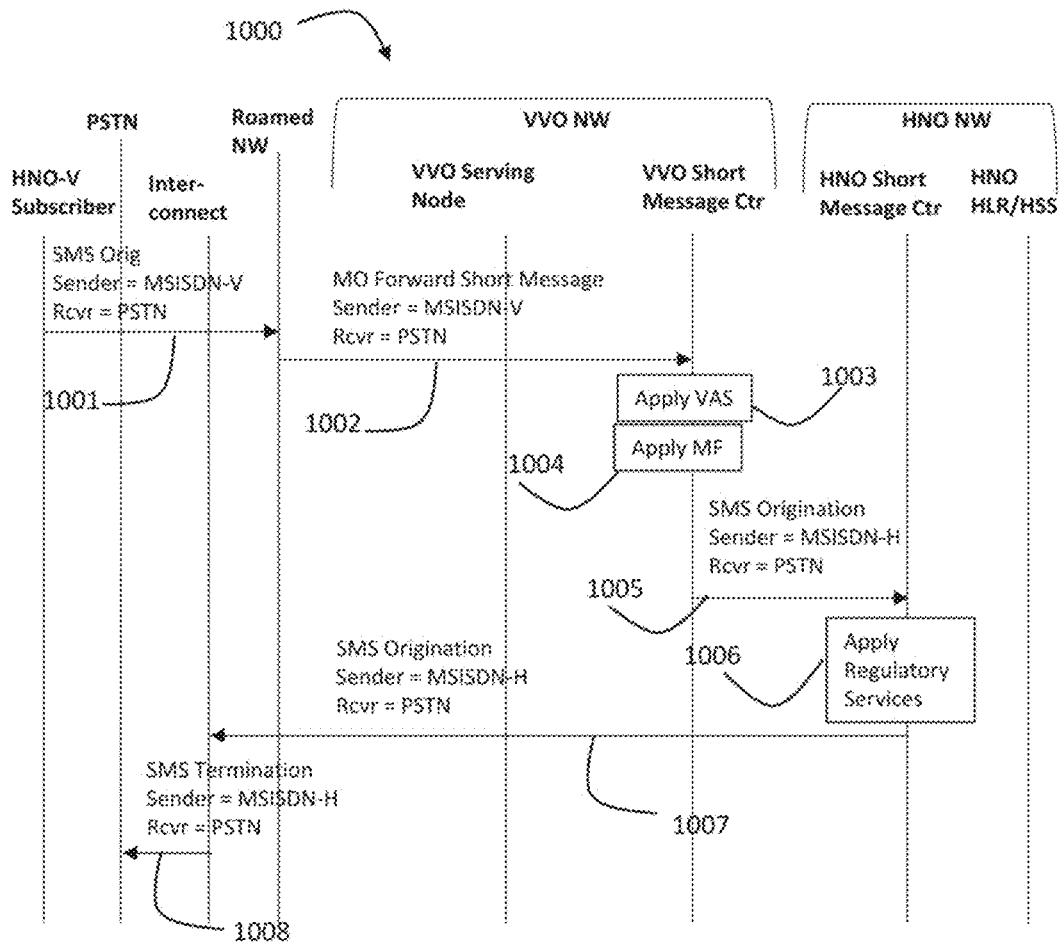
FIG. 10 is a diagram illustrating a communication sequence for applying value added services according to an example embodiment.

FIG. 10 depicts a signaling flow 1000 where one can assume that the VRS subscriber has successfully updated its location in RNO 140 and has the ability to successfully communicate with the nodes in RNO 140 to send an originating short message to a PSTN user. VRS subscriber with HNO-V originates (step 1001) an SMS which arrives at the visited networks MSC/VLR 144 in RNO 140 (FIG. 1). The MSC/VLR 144 determines the SMSC address from the message and the message is forwarded over an SS7 signaling protocol using Mobile Originated Short Message Service message, to the SMSC 132 in VVO 120 (step 1002).

The application of VAS and the invocation of the mapping function MF 125 takes place (steps 1003, 1004). VVO 120 routes the message via HNO 100 as it may be mandated to apply regulatory services in HNO 100 (step 1005 and 1006). Note that the application of regulatory services may be optional and at the discretion of the HNO 100. At this point HNO 100 handles the message as if its own subscriber originated a message destined to the outside world of HNO 100. HNO 100 already has an interconnect with SMS aggregators which are the gateways for SMS routing and HNO 100 sends the message to the interconnect (step 1007). The interconnect is responsible for the progress of delivering the message to the next network (step 1008) before it is actually terminated to the destination party.

Figure 11:
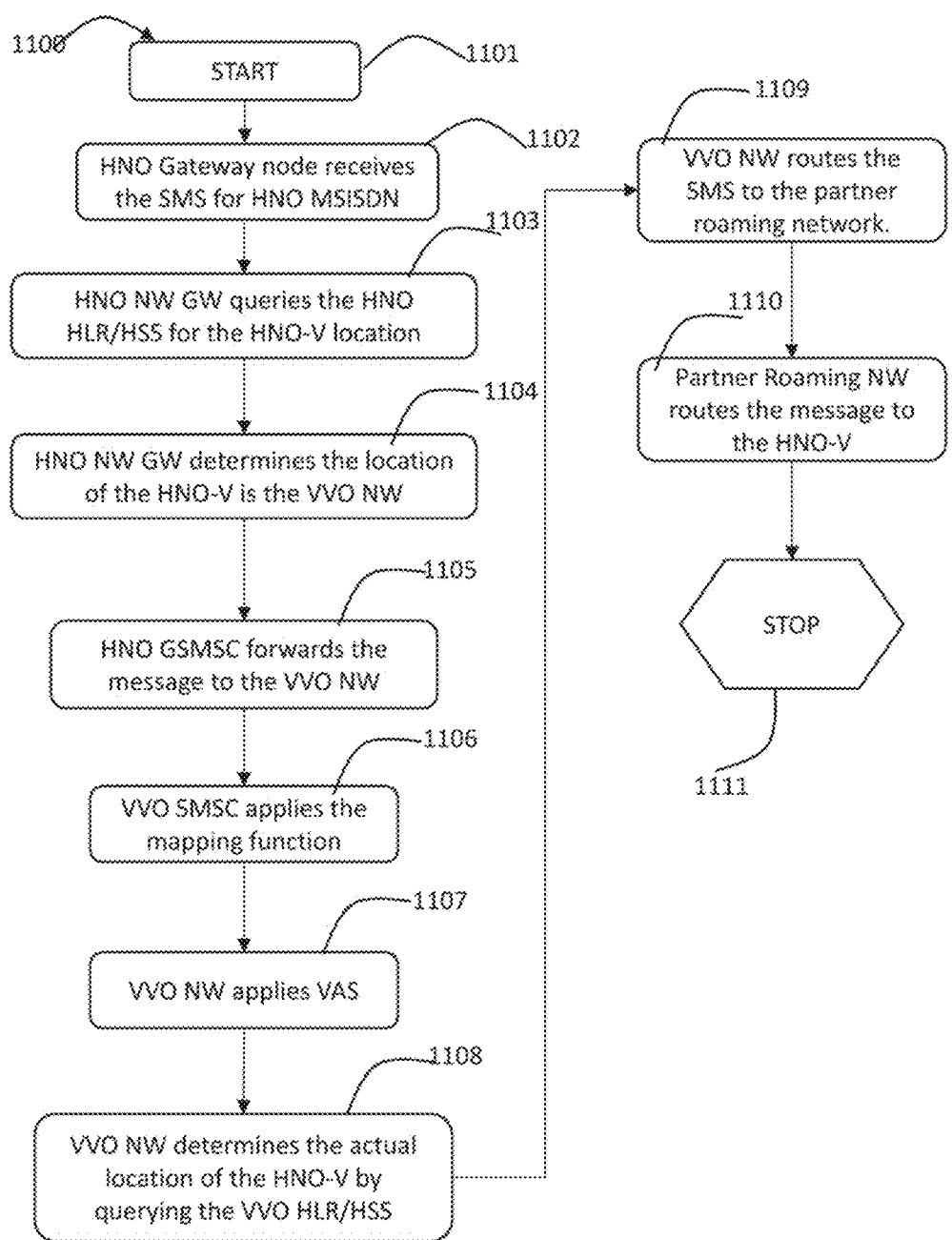

FIG. 11 is a flowchart 1100 that depicts the Short Message Service Termination Process towards a VRS subscriber. It is assumed that the VRS subscriber has successfully updated its location in RNO 140 and is capable of communicating with the network to receive short messages. This is a scenario where some subscriber initiates the process of sending a message (step 1101) to the VRS subscriber. Since the VRS subscriber is known to the outside world by the MSISDN-H which was assigned by the HNO 100, any message terminating to the VRS subscriber, even after the SIM swap process, arrives at the HNO 100 short message gateway (step 1102). In order to deliver the message to the VRS subscriber HNO 100 needs to locate the subscriber by querying its HLR 107 (step 1103). One of the responsibilities of the VVO 120 network is to keep informing HNO 100 about the VRS subscriber pseudo-location as being located in VVO 120. Thereby HLR 107 in HNO 100 provides the location of the VRS subscriber to the HNO 100 SMS gateway, as the VVO 120 (step 1104). HNO 100 GSMSC 112 (refer FIG. 1) sends the short message over a predefined link to the VVO 120 SMSC (step 1105). VVO 120 NW receives the message and invokes the MF 125 and applies any value-added service in accordance with the subscriber profile (steps 1106, 1107). At this point a VAS may be in the form of notifying CSP 200, the VVO 120 partner, about the incoming message and relinquish control, or even send a copy to CSP 200 and continue processing the message. This claim can adapt to both situations and not limited to what has been shown in this process flow. VVO 120 nodes are aware of the actual location of the VRS subscriber and in order to obtain that VVO 120 nodes query HLR 129 of VVO 120 (step 1108). The result of the query determines that the VRS subscriber is indeed located in RNO 140 and VVO 120 forwards the message (step 1109) to the partner roaming network. RNO 140 is now responsible for delivering the message to the VRS subscriber (1110) and the process concludes (step 1111).

Figure 12:
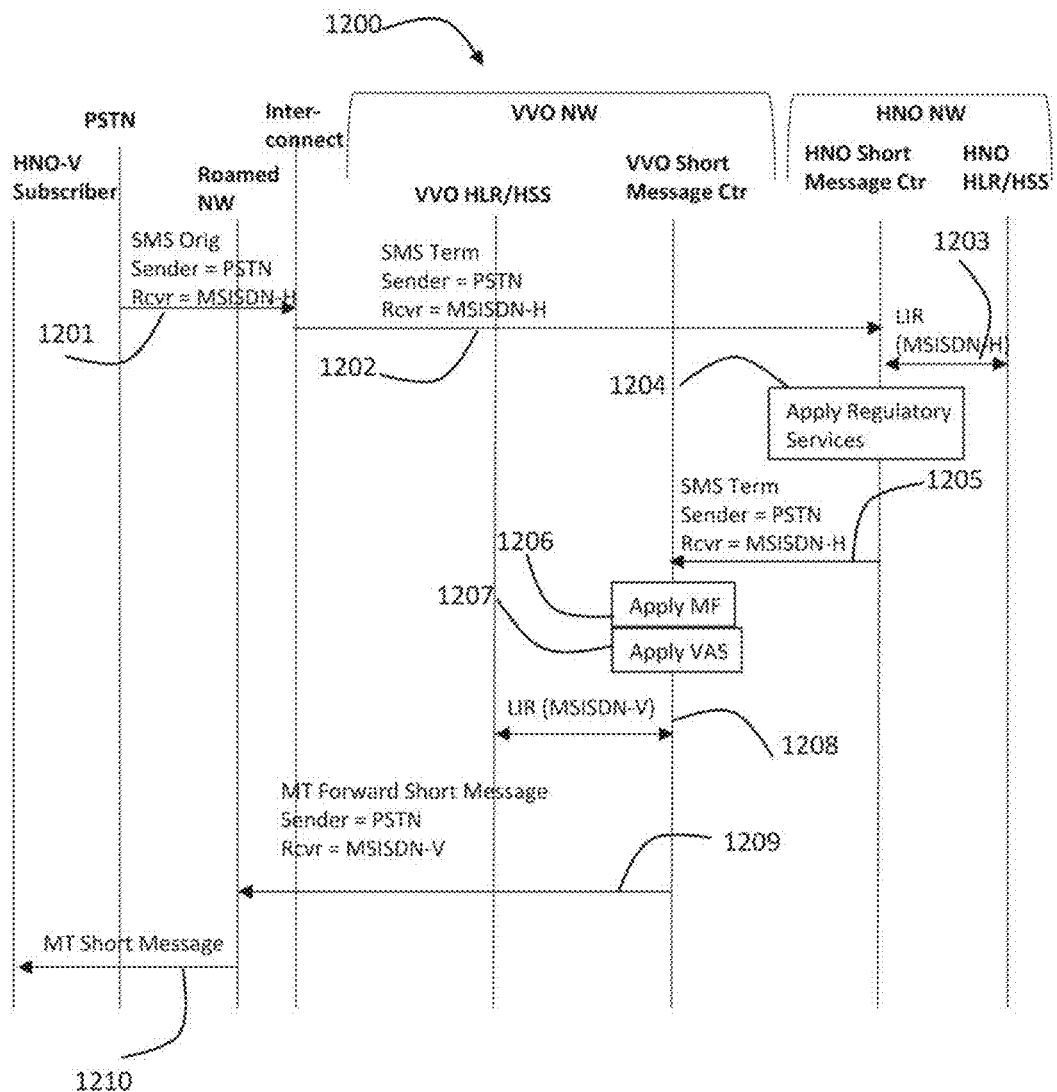
FIG. 12 is a diagram illustrating a communication sequence of a virtual roaming call termination according to another example embodiment.

FIG. 12 depicts a signaling flow 1200 wherein the VRS subscriber has successfully updated its location in the RNO 140 and has the ability to successfully communicate with the nodes in RNO 140 to accept a short message. In this flow a PSTN user sends a message to the VRS subscribers MSISDN-H number (step 1201) as the VRS subscriber is still known by the same public number even after undergoing the SIM swap process. The message arrives at the interconnect which connects the outside world to the HNO 100. The interconnect (aka SMS aggregator) sends the message to the GSMSC 112 of HNO 100 (step 1202). GSMSC is a gateway function that must query HLR 107 in HNO 100 to obtain the location of the subscriber (step 1203). Note that the HLR 107 of HNO 100 has the pseudo location information of the VRS subscriber that is conveyed by the VRMF 1209 of VVO 120 (refer FIG. 4). HNO 100, optionally may apply regulatory services (step 1204) before sending the message to SMSC 132 of VVO 120 (step 1205) as the location query results indicated the pseudo location of the VRS subscriber in the VVO 120.

SMSC 132 of VVO 120 invokes the mapping function to create the VVO ID of the subscriber (step 1206). VVO 120 applies any value-added services it has defined against the VVO ID of the VRS subscriber (step 1207). Note, VAS examples may include sending the message to the CSP 200 and then relinquishing control, message recording, sending a copy of the message to a CSP 200 partner, among other service capabilities. Following the execution of VAS, VVO 120 is ready to terminate the message to the VRS subscriber after determining the actual location of the subscriber by querying the HLR 129 of VVO 120.

This query results in the extraction of the actual location of the VRS subscriber and the short message is forwarded to the MSC/VLR 144 of RNO 140 (step 1209) via the predefined interconnect protocol as agreed upon by VVO 120 and RNO 140. The RNO 140 is now responsible for delivering the message to the handset (step 1210).

Figure 13A:
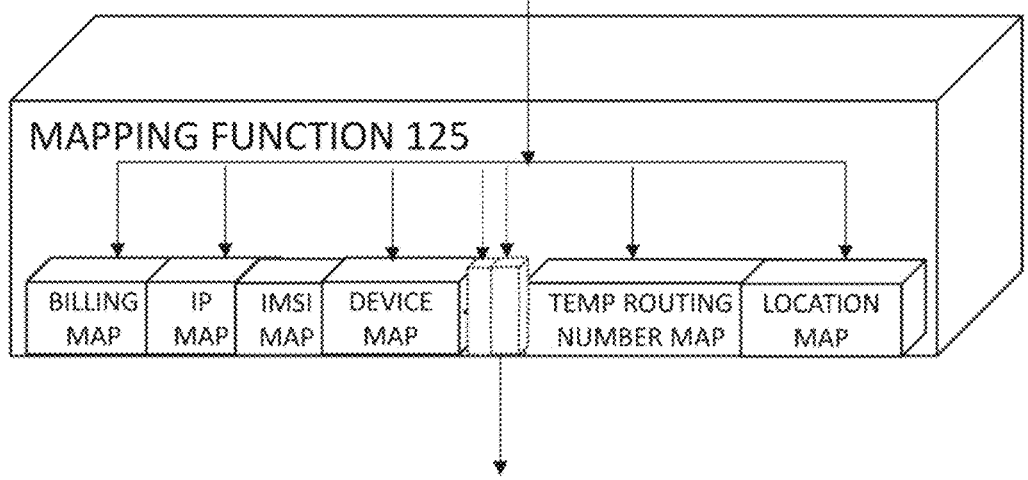

FIG. 13A is a high level sample view of what the mapping function in the VVO 120 may comprise. Mapping Function MF 125, forms an integral part of this claim and is a service between the VVO 120 and HNO 100 (vice versa) to facilitate the VRS roaming capability. MF 125 is capable of handling multiple responsibilities based on the type of job it is required to perform. For example, a mapping may be required for a circuit switched originated voice call or session by a VRS subscriber, a mapping for short message termination, or purely a mapping function for billing provided by the VVO 120 (although shown as a separate function VRBF 127 for clarity, there is nothing prohibitive from its inclusion within MF 125), or it may be invoked by another function like VRMF 1209 for packet voice.

MF 125 is capable of being invoked by any node or function in the VVO 120. The interface to MF 125 can be proprietary or as open as HTTP/S for anybody outside of the realm of VVO 120 to invoke it. The interface input parameters can be defined via API and a high-level information is provided in the diagrammatic view of the mapping function in the VVO 120.

MF 125 is not limited to mapping the VVO 120 provided IMSI to HNO 100 provided IMSI values (and vice versa) but can take any identity and map it to the destination ID, should that be desired in any flow as claimed by this document or in future as an enhancement. For simplicity and for the purposes of discussion this document shall be limited to mentioning the mapping of the IMSIs between the VVO 120 and the HNO 100 only, wherein the IMSI of Mobile 102 associated with SIM/eSIM 322 from HNO 100 is replaced with the IMSI associated with SIM/eSIM 323 from VVO 120.

As previously mentioned, the mapping function is also utilized for billing in order to provide the manipulation and population of the correct identification for billing. For the purposes of clarity this document, the mapping of billing information is shown as a separate function called VRBF 127. VRBF 127 also has more than mapping. It helps provide VVO 120 related pseudo information, provides billing formatting and mapping, location mapping, among other functions—all these different capabilities can be viewed as service functions and can be encapsulated in the mapping function MF 125 as separate logical containerized elements of microservices. Each function can access any other function through a common signaling bus.

Of all the potential microservices envisioned for MF 125, this claim discusses specifically the Billing Map (VRBF 127) which includes IMSI and location mapping in current mobile networks but can be extended to future network mappings, IMSI MAP (shown as MF 125), IP MAP (shown as MF 125 for voice of packet calls), Temp (temporary) Routing Number Map (shown as a part of MF 125). A Public Number Map may be utilized in the case where the Virtual Roaming concept entails a different public number allocation for a VRS subscriber. Similarly a device map may easily map from one device of a VRS subscriber to another co-registered (implicitly registered) device of the same VRS subscriber.

FIG. 13A demonstrates the versatility of the mapping function MF 125, which may take input information and map it to the corresponding destination network information based on factors such as communication type, direction, source and destination network information, etc.

Figure 13B:
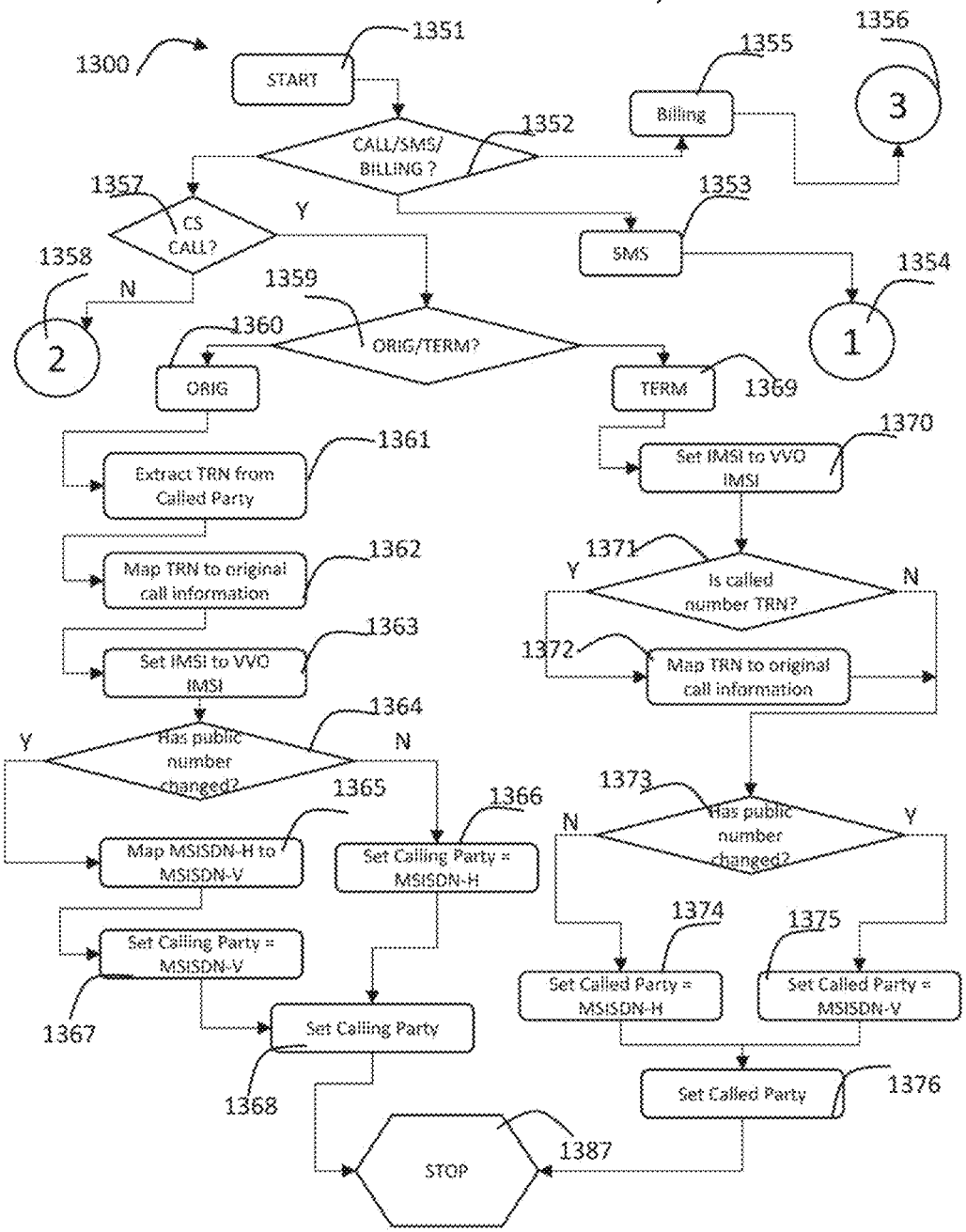

FIG. 13B is a flowchart 1300 that depicts the Mapping Function process that is invoked by VVO 120 during any kind of communication initiated by or towards a VRS subscriber while in the realm of a 2G/3G network.

Any invocation of the MF 125 in step 1351 within the VVO 120 shall result in checking the nature of the invocation. In step 1352 if the reason for invocation is SMS the process proceeds to step 1353 and then to step 1354 which is described in FIG. 13C. If the reason is Billing, then the process proceeds to step 1355 which essentially is the VRBF function and the process proceeds from step 1356, will be explained later in FIG. 13D. If the reason for invocation of MF 125 in step 1352 is CALL, then the process proceeds to step 1357.

Step 1357 evaluates the nature of the call and determines if it is a Circuit Switched (CS) Voice Call or a Packet Voice Call. In case of Packet Voice Call the process moves to step 1358 and is described in FIG. 14.

If the call type evaluates to be a CS Voice Call, step 1359 determines if the call is originated by a VRS subscriber or if it is a call destined to a VRS subscriber. Upon the determination that the call is an origination from a VRS subscriber, the flow proceeds to step 1360. Since all call originations in the realm of CS calls are assigned a Temporary Routing Number (TRN), the called party number is always a TRN when the call arrives at the VVO 120. Step 1361 extracts the called party number, which is the TRN, and proceeds to restore the original call information that was saved off against the TRN at the time of TRN allocation. The restoration of the original call characteristics is done in step 1362. Since the call has arrived at the VVO 120 and the VVO 120 identifies the VRS subscriber by its VVO ID, the mapping and setting is done to restore the VVO ID in step 1363. Although this claim does not warrant a change in the public number of the VRS subscriber, but this claim does not limit that possibility at all and hence a check is performed to see if the public number that is to be presented is indeed retained as the old HNO 100 provided number or not in step 1364. If the public number has not changed the calling party information is set to MSISDN-H in step 1366. If it has indeed changed, meaning a new public number is provided by the VVO 120, the calling party information is set to MSISDN-V in step 1365. Step 1367 is to set the calling party information to whatever value has been set in step 1365/1366 to be returned to the invoker of the MF 125. The process comes to a stop at step 1387.

In step 1369 the call has been determined to be destined to a VRS subscriber. The VVO ID is set to VVO 120 provided IMSI as the VVO 120 recognizes the subscriber by its VVO ID. It is checked if the called party number is a TRN or not in step 1371. If it is a TRN number the call characteristic is restored in step 1372 by mapping the TRN to the call information that was stored off when the TRN was allocated. If the called party number is not a TRN then the call proceeds to step 1373. In step 1373 which is after the TRN check or TRN based restoration of the original call information, it is checked to see if the public number is retained to be HNO 100 provided MSISDN-H or it is a new one assigned by VVO 120. If the HNO 100 provided public number is retained, then the called party is set to be MSISDN-H in step 1374. If not, the called party number is set to be MSISDN-V as provided by the VVO 120 in step 1375. The return information called party is set to the value is set in step 1376 to the value as set by step 1374/1375. The process ends in step 1387.

Figure 13C:
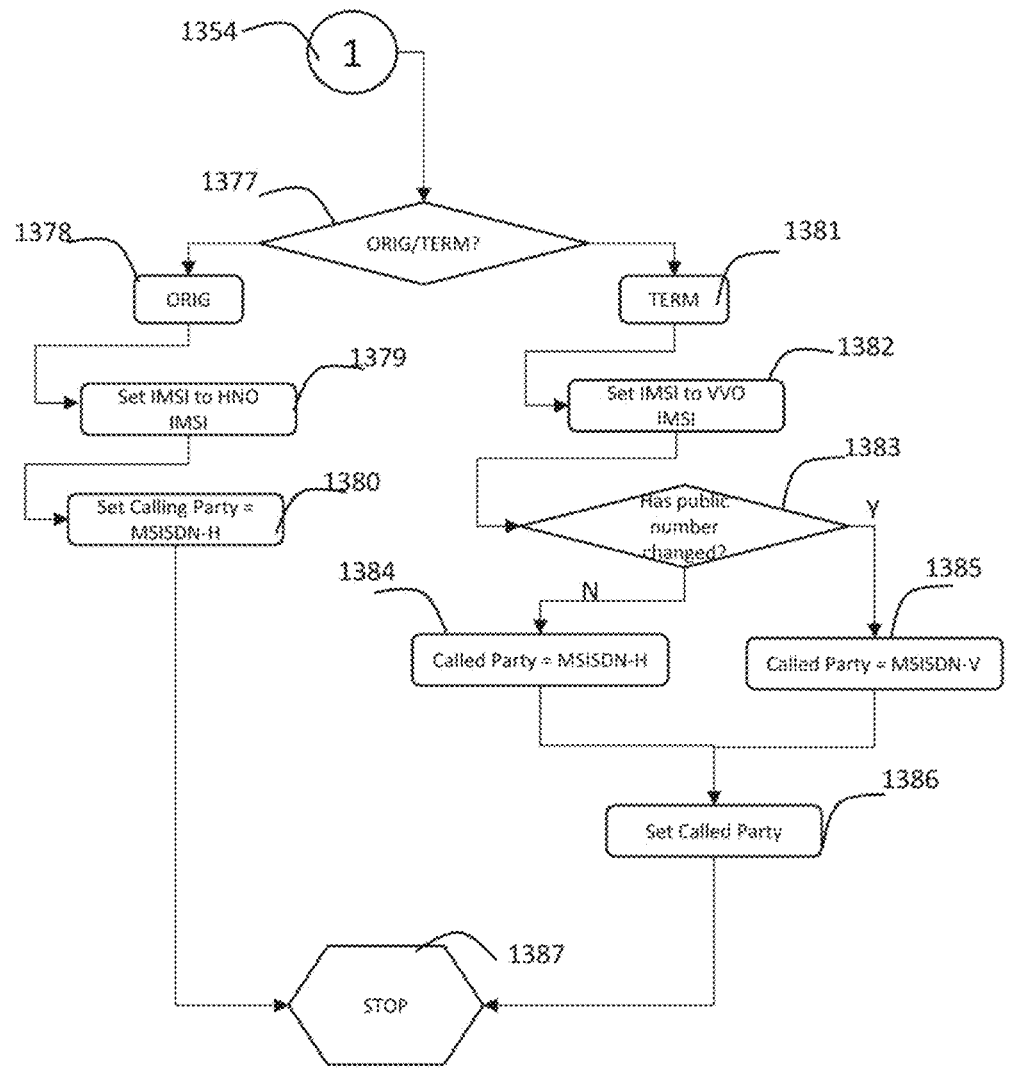

FIG. 13C is the continuation of the flowchart 1300 that depicts the Mapping Function process that is invoked by VVO 120 during SMS communication initiated by or towards a VRS subscriber while in the realm of a 2G/3G network.

The process of SMS communication is checked to see if it is an SMS originated by the VRS subscriber or if it is an SMS destined to a VRS subscriber in step 1377. If the communication is originated by the VRS subscriber as is determined in step 1378, the identification is set to HNO ID in step 1379 as the originated SMS is always HNO 100 routed, unless some regulatory services need to be invoked. In step 1380 the calling party is set to HNO 100 provided MSISDN-H. The process ends in step 1387.

If the SMS is destined to the VRS subscriber as is determined in step 1381, the identification is set to VVO ID in step 1382 as the VVO 120 shall route the message to the VRS subscriber. It is checked to see if the VRS subscriber has been assigned a new public number as is checked in step 1383. If the number has been retained to the HNO 100 provided number the called party parameter is set to MSISDN-H in step 1384. Otherwise the called party is set to MSISDN-V as is allocated by the VVO 120. The called party information is set in step 1386 to the value determined previously by step 1384/1385. The process ends in step 1387.

Figure 13D:
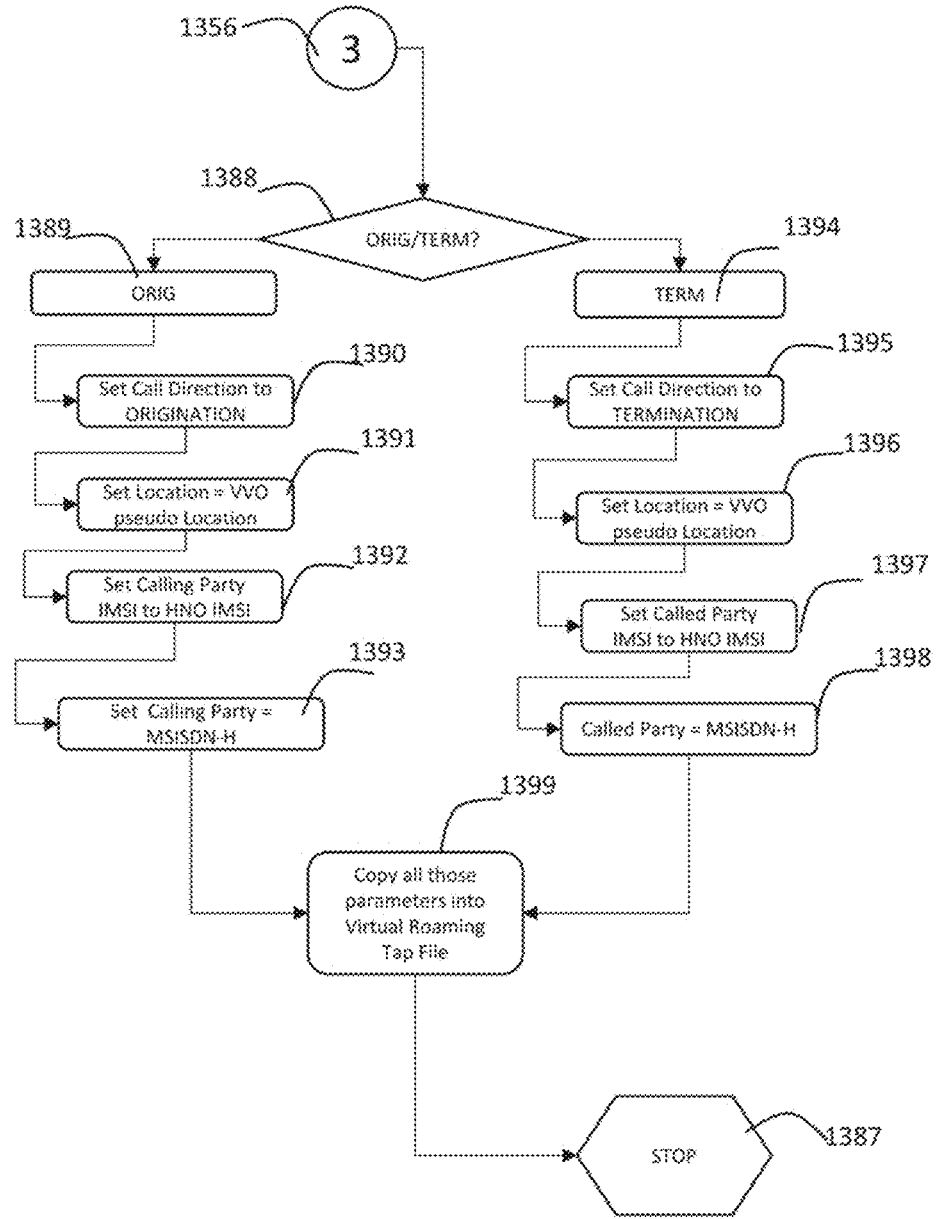
FIG. 13D is a diagram is a diagram illustrating a virtual roaming billing process according to an example embodiment.

FIG. 13D is the continuation of the flowchart 1300 that depicts the Virtual Roaming Billing Function process that is invoked by VVO 120 during any kind of communication initiated by or towards a VRS subscriber while in the realm of a 2G/3G network.

VRBF 127 is responsible for performing the billing mapping function. Although shown as a standalone function it can be envisioned as a part of the holistic mapping function provided by MF 125. VRBF is responsible for ingesting TAP files generated by DCH 126 in VVO 120. The output of the mapping function performed by VFBF 127 is destined towards DCH 126 of VVO 120 to generate the financial/accounting information related to the communication initiated or received by a VRS subscriber towards FCH 128 of VVO 120, and also towards the DCH 106 of HNO 100.

Step 1388 is where the VRBF 127 checks the call direction and if it is a call initiated by the VRS subscriber, the process identifies itself as an ORIGINATION process in step 1389. In step 1390 the call direction is set to ORIGINATION. Step 1391 is where the pseudo location of the VVO 120 is populated for the VRS subscriber. Step 1392 is where the calling party information identification is set to HNO ID or HNO provided IMSI. Step 1393 is where the calling party address is set to MSISDN-H.

Step 1399 is where all the information is written into the Virtual Roaming Tap file to be used by the DCH 126 of VVO 120 to generate appropriate files towards the HNO 100 and the process ends in step 1387. Step 1394 is where the VRBF 127 checks the call direction and if it is a call received by the VRS subscriber, the process identifies itself as a TERMINATION process in step 1394. In step 1395 the call direction is set to TERMINATION. Step 1396 is where the pseudo location of the VVO 120 is populated for the VRS subscriber. Step 1397 is where the called party information identification is set to HNO ID or HNO provided IMSI. Step 1398 is where the called party address is set to MSISDN-H. Step 1399 is where all the information is written into the Virtual Roaming Tap file to be used by the DCH 126 of VVO 120 to generate appropriate files towards the HNO 100 and the process ends in step 1387.

Figure 14:
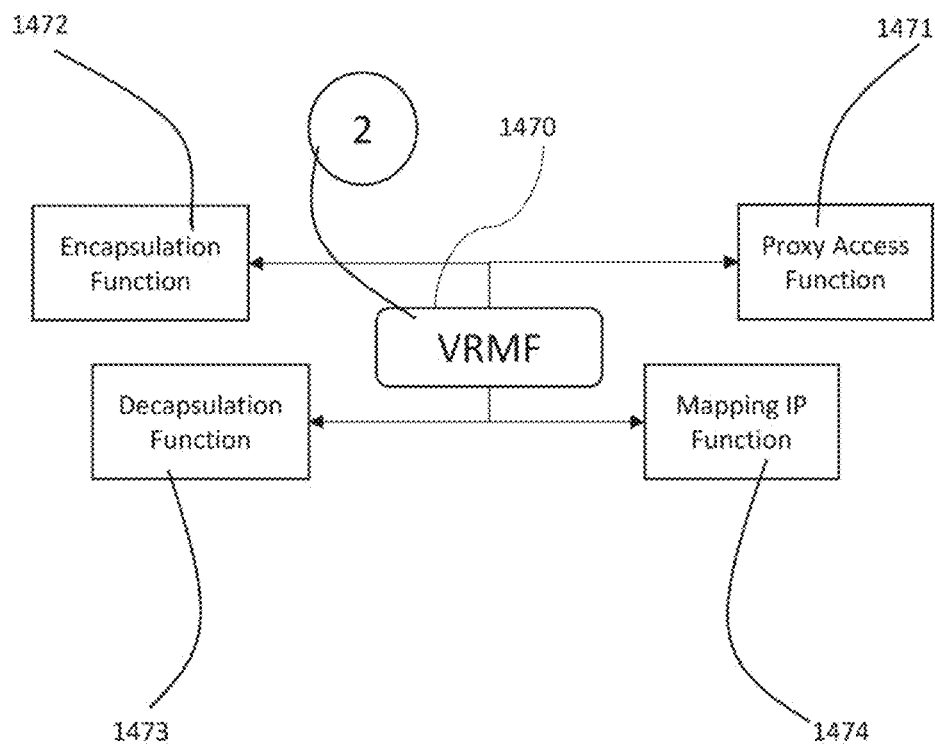
FIG. 14 is a diagram illustrating a virtual roaming mobility function according to an example embodiment.

FIG. 14 is a block diagram depicting the various roles of the Virtual Roaming Mobility Function 1209. Step 1470 shows the capabilities VRMF 1209 can provide to the VVO for a VRS service. It provides access-like functions to the SGW, IP packet encapsulation into GTP headers, IP packet decapsulation from GTP headers and IP mapping function. Please note the mapping function can be invoked by VRMF 1209 or be an integral part of it and hence step 2 from FIG. 13B can also be the initiation point of this block diagram.

VRMF 1209 is a logical function with the possibility of residing in a virtual machine or could be deployed as a standalone node. The concept of virtual roaming provides the impression to the home network of the VRS that the subscriber is located in the VVO when it is actually located elsewhere, the RNO (RNO can be the HNO as well). VRMF 1209 represents that pseudo subscriber in the VVO 120.

Step 1471 indicates the proxy role of the VRS subscriber along with the access function that VRMF 1209 provides. The mobility in the name of VRMF 1209 implies its purpose, but is not limited to it. VRMF 1209 represents the mobile and the access systems that interworks with the network nodes to provide services. Since VVO 120 may not bear any access system, though it is possible that it can have its own access network, VRMF 1209 owns the responsibility of informing the HNO 100 of the pseudo location of the VRS subscriber. It plays the role of the access system in LTE by interworking with SGW 1201 of VVO 100; it plays the role of the VRS subscriber by providing periodic location updates to the HSS 1007 of HNO 100; is responsible to play the role of the VRS subscriber by acquiring an IP from the PGW 1003 of HNO and mapping IP information between the HNO 100 and the actual VRS subscriber Mobile 142/102.

Step 1472 indicates the role of VRMF 1209 also assumes the role of IP header manipulator by enveloping the actual raw IP packet carrying user data. Encapsulation is necessary when packets are HNO 100 bound from the VVO 140. IP packets are sent by the PGW 1203 after stripping off the outer GTP headers, which are then encapsulated by the VRMF 1209 by establishing a GTP tunnel like protocol interface to the SGW 1201, and the packets are then successfully sent to the HNO 100.

Step 1473 indicates the decapsulation role played by the VRMF 1209. For the termination towards a VRS subscriber, CSP 200 establishes the SIP call session towards the AS 121 and sends SIP protocol based IP packets towards the VVO 120. Similarly IP packets without any extra tunneling headers can be sent towards the CSP 200 by the VVO 120. In order for SIP packets arriving from the Mobile 102/142 of the VRS subscriber, or from the HNO 100 destined towards the CSP 200 they must pass through the VRMF 1209 for any decapsulation procedure so that the raw IP packets can be sent to the CSP 200 who does not participate in tunneling protocols.

Step 1474 indicates the role of VRMF 1209 in the IP header mapping function. As indicated before, the MF 125 function itself can take over this function and a simple HTTP/S protocol based command invocation from the VRMF 1209 (or any other functions/nodes) can support the needs of the IP header mapping procedure. The VRMF 1209 plays the role of the pseudo mobile handset representing the VRS subscriber in the VVO 120. In the process of attaching to the HNO 100, as can be dictated by the subscriber profile, the Mobile 142 procures an IP address from the PGW 1203 in the VVO 120. Since a path is established towards the HNO 100 PGW 1003, this PGW 1003 also assigns an IP address. But the actual Mobile 142 in the RNO 140 obtains the address from PGW 1203. VRMF 1209 playing the role of a pseudo mobile in the VVO 120 on behalf of the VRS subscriber procures this IP address from the PGW 1003 of HNO 100. Hence during packet flows, VRMF plays an active role in Source and destination IP address mapping. It also ensures that for a termination to a VRS subscriber scenario, any packets sent by the SGW 1201 of the VVO 120 is sent to the VRMF so that it can now massage the IP header and maintain its connectivity to the CSP 200. VRMF plays an active role in mapping IP header parameters for this as well.

The aforementioned description represents some of the roles that VRMF 1209 can perform but can be enhanced beyond these capabilities.

Figure 15:
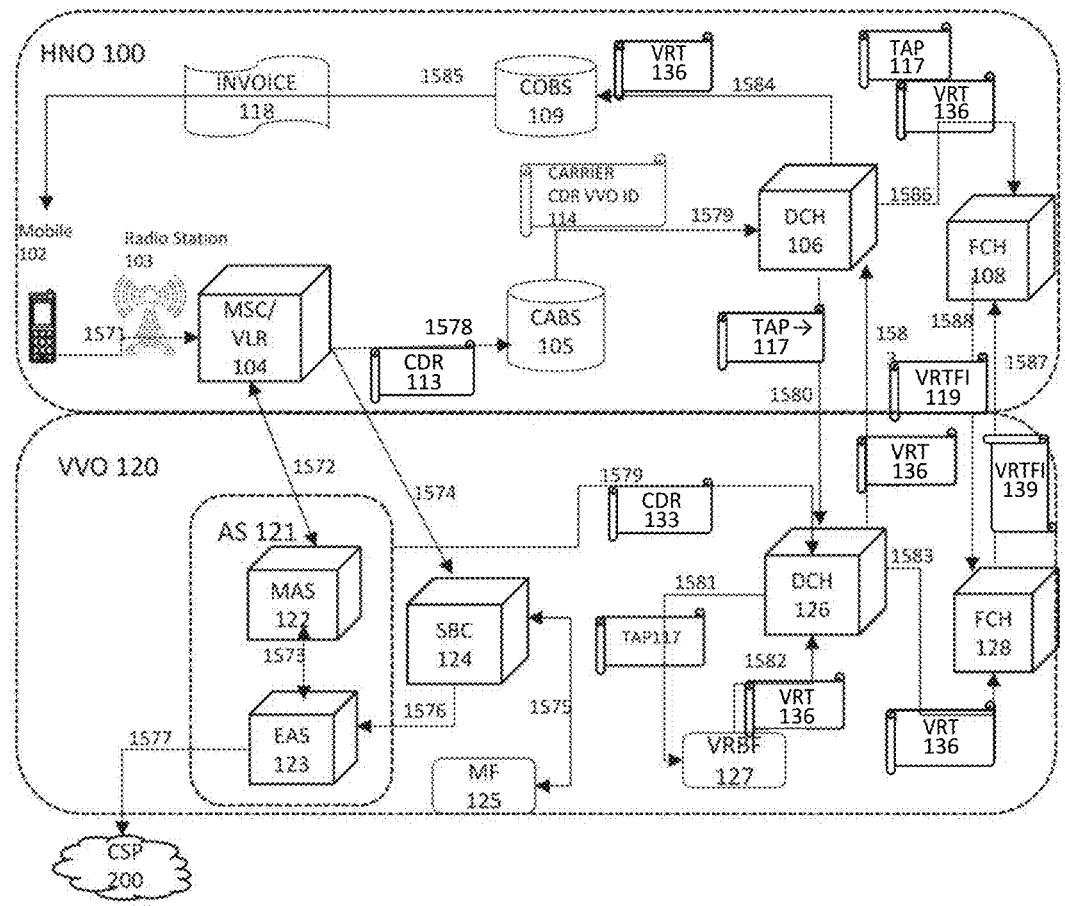
FIG. 15 is a diagram illustrating a process of a virtual roaming call originating from a home network according to an example embodiment.

FIG. 15 is a diagrammatic representation of the network architecture which depicts a Virtual Roamer Subscriber (VRS) associated with the mobile phone 102 originating a call from the HNO 100. Step 1571 represents the call origination step from the VRS towards the MSC/VLR 104. The MSC/VLR 104 invokes step 1572, a CAMEL intelligent network or other trigger to obtain the services of the AS 121 in the VVO 120.

AS 121 consists of two functions: MAS 122 and EAS 123. MAS 122 upon receipt of step 1572 consults with the EAS 123 in step 1573 to obtain and provide a routing number back to the MSC/VLR 104 in step 1572. Upon receipt of the routing number from the MAS 122 the MSC/VLR 104 routes the call to the number in step 1574 possibly via an SBC in the HNO 100 to the VVO 120 SBC 124.

SBC 124 upon receipt of the routing number via call signaling performs the mapping function using MF 125 from the routing number to the original call characteristics (which includes but is not limited to the original called number for example) in step 1575. Post receipt of the mapped numbers from the MF 125, the SBC 124 routes the call to the EAS 123 in step 1576. EAS 123 upon receipt of the call from the SBC 124 routes the call in step 1577 to CSP-PBX 200. The CSP-PBX 200 system is responsible for routing the call to either a dedicated destination such as an internal tie line or out to the PSTN world.

Step 1578 in figure the MSC/VLR 104 is responsible for generating a CDR 113 containing the identities of the subscriber (VVO ID for example) mobile 102 provided by the VVO 120. In Step 1579 CABS 105 is responsible for receiving CDR 113 and generating a Carrier CDR 114 and sending it to DCH 106. Step 1579 in VVO 120 also depicts the process where AS 121 sends CDR 133 to the DCH 126. DCH 126 stores the CDR 133. This allows DCH 126 in the VVO 120 to compare information it receives in the TAP 117 from either HNO 100 or RNO 140. DCH 126 uses TAP 117 in this case, generated from DCH 106 of the HNO 100. DCH 126 has the flexibility of using this information to perform mapping, tap generation, or for any other purpose it might deem necessary.

In Step 1580 DCH 106 creates a TAP file 117 for the VRS Mobile 102 and sends it to the DCH 126. This is done because the HNO 100 thinks that the VRS Mobile 102 with the VVO ID (VVO IMSI) is roaming in the HNO 100 network and hence the TAP-OUT process is invoked for inbound roamers. In Step 1581, DCH 126 sends TAP 117 through the VRBF 127. In Step 1582, VRBF 127, maps and manipulates (which includes but is not limited to, mapping of the VVO ID to HNO ID for the billing records to be sent to the HNO 100) TAP 117 and sends back information to DCH 126 in the form of VRT 136. VRT 136 now has the HNO ID (HNO IMSI) as the key subscriber ID.

In Step 1583 DCH 126 sends TAP file VRT 136 to DCH 106 and to FCH 128. In Step 1584 DCH 106 sends VRT 136 to COBS 109. In step 1585 COBS 109 generates INVOICE 118 for Mobile 102. In Step 1586 DCH 106 sends VRT 136 and TAP 117 to FCH 108. FCH 128 generates a financial invoice VRTFI 139 from VRT 136. In step 1587 FCH 128 sends VRTFI 139 to FCH 108. FCH 108 generates a financial invoice VRTFI 119 from TAP 117. In step 1588 FCH 108 sends VRTFI 11Y to FCH 128.

If VRTFI 139 and VRTFI 119 are equivalent, then the net charge shall cancel out. In this case, no charge is levied for the VVO 120 subscriber usage on the HNO 100. Instead, a fixed, variable or other tariff for usage of the VVO service by the VVO 120 subscriber may be charged by the VVO 120 to the HNO 100. Alternatively, a fixed, variable or other tariff for the usage of the HNO 100 network by the VVO 120 subscriber may be charged by the HNO 100 to the VVO 120.

If VRTFI 139 and VRTFI 119 are not equivalent, then the appropriate delta charges will be levied by the VVO 120 upon the HNO 100 for the VRS service usage in the foreign network by the HNO 100 subscriber. In this case the HNO 100 may be charged for both the VVO 120 service usage (via a fixed, variable or other tariff) and for the RNO 140 network usage by the VVO 120 subscriber.

Figure 16:
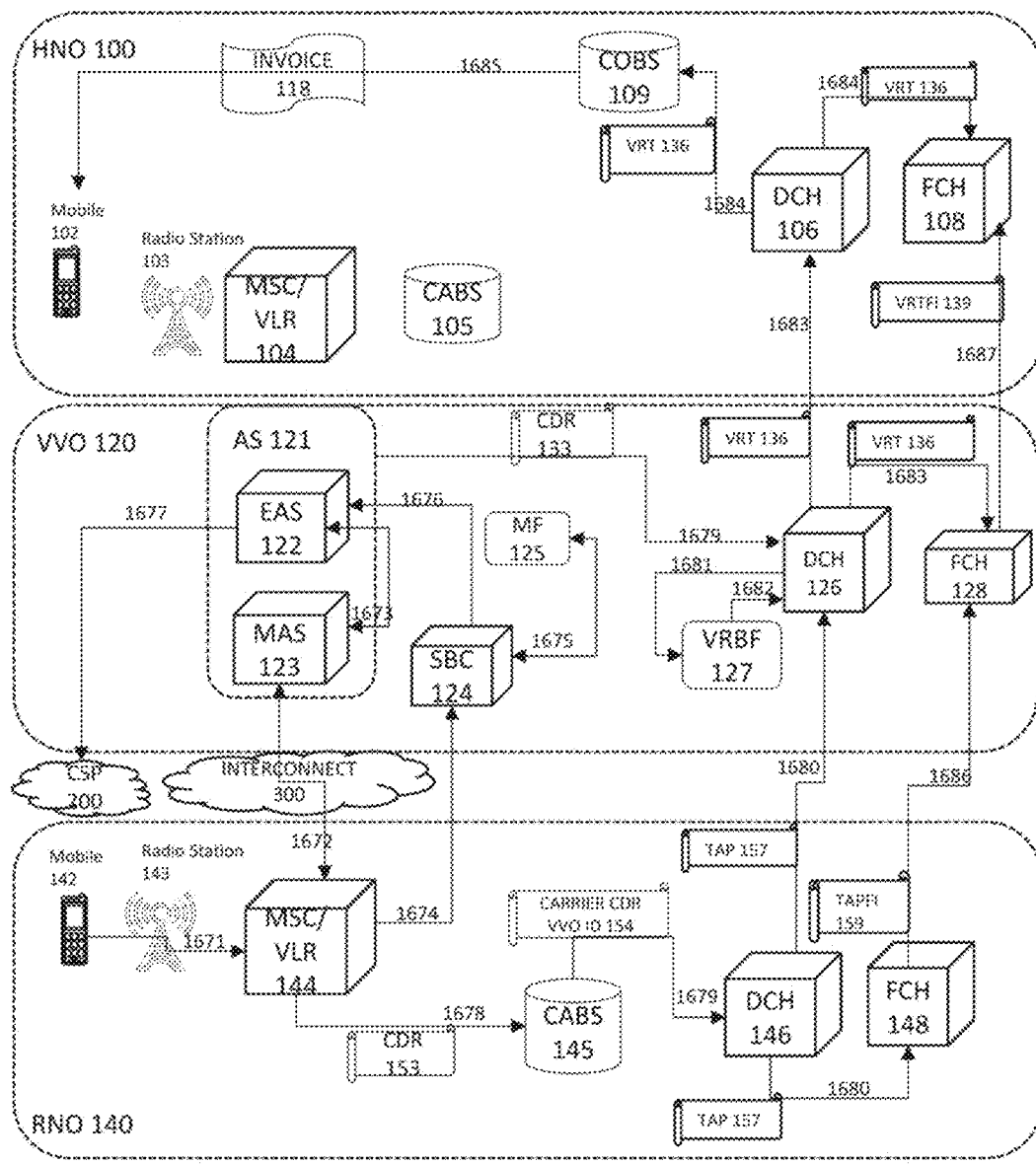
FIG. 16 is a diagram illustrating a process of a virtual roaming call originating from a remote network according to an example embodiment.

FIG. 16 is a diagrammatic representation of the network architecture which depicts an example of a virtual roamer subscriber (VRS) associated with the mobile phone 142 making a mobile originated call from the RNO 140. Step 1671 represents the call origination step from the mobile user using mobile phone 142 towards the MSC/VLR 144.

The MSC/VLR 144 invokes step 1672, a CAMEL trigger to obtain the services of the AS 121 in the VVO 120. AS 121 consists of two functions: MAS 122 and EAS 123. MAS 122 upon receipt of step 1672 consults with the EAS 123 in step 1673 to obtain and provide a routing number back to the MSC/VLR 144 in step 1672.

Upon receipt of the routing number from the MAS 121 the MSC/VLR 144 routes the number in step 1674 possibly traversing an SBC in the RNO 140 to the VVO 120 SBC 124. SBC 124 upon receipt of the number performs the mapping function using MF 125 from the routing number to the original call characteristics in step 1675. Post receipt of the mapped numbers from the MF 125, the SBC 124 routes the call to the EAS 123 in step 1676. NOTE—The MF 125 may or may not reside in the AS 121. EAS 123 upon receipt of the call from the SBC 124 routes the call in step 1677 to CSP-PBX 200. The CSP-PBX 200 system is responsible for routing the call to the PSTN world.

MSC/VLR 144 generates CDR 153 containing the VVO ID (VVO IMSI) of the subscriber mobile 142. In step 1678 CABS 145 receives the CDR 153.

CABS 145 in RNO 140 generates Carrier CDR 154 from the information received in CDR 153. AS 121 in VVO 120 generates CDR 133. In Step 1679: CABS 145 sends CDR 154 to DCH 146; AS 121 sends CDR 133 to DCH 126; DCH 146 creates TAP 157 from the information received in CDR 154.

In step 1680: DCH 146 sends TAP 157 to DCH 126 in VVO 120; DCH 146 also sends TAP 157 to FCH 148 in RNO 140. In step 1681 DCH 126 in VVO 120 passes TAP 157 through VRBF 127, which provides the necessary mapping and manipulation of TAP 157. The mapping includes but is not limited to changing the billing identification from VVO ID to HNO ID.

In Step 1682, VRBF 127, maps and manipulates (which includes but is not limited to, mapping of the VVO ID to HNO ID for the billing records to be sent to the HNO 100) TAP 157 and sends back information to DCH 126 in the form of VRT 136. VRT 136 now has the HNO ID (HNO IMSI) as the key subscriber ID.

In Step 1683, DCH 126 sends VRT 136 to DCH 106 and FCH 128. In step 1684, DCH 106 sends VRT 136 to COBS 109. In Step 1685 COBS 109 generates INVOICE 118 for Mobile 102. FCH 148 of RNO 140 generates the financial invoice TAPFI 159 from TAP 157. In Step 1686 FCH 148 sends the financial invoice TAPFI 159 to FCH 128 in VVO 120. FCH 128 generates VRTFI 139 from VTR 136. In step 1687 FCH 128 sends the financial invoice VRTFI 136 to FCH 108.

If VRTFI 139 and TAPFI 159 are equivalent, then the net charge shall cancel out. If VRTFI 139 and TAPFI 159 are not equivalent, then the appropriate delta charges will be levied by the VVO 120 upon the HNO 100 for the VRS service usage in the foreign network by the HNO 100 subscriber.

Figure 17:
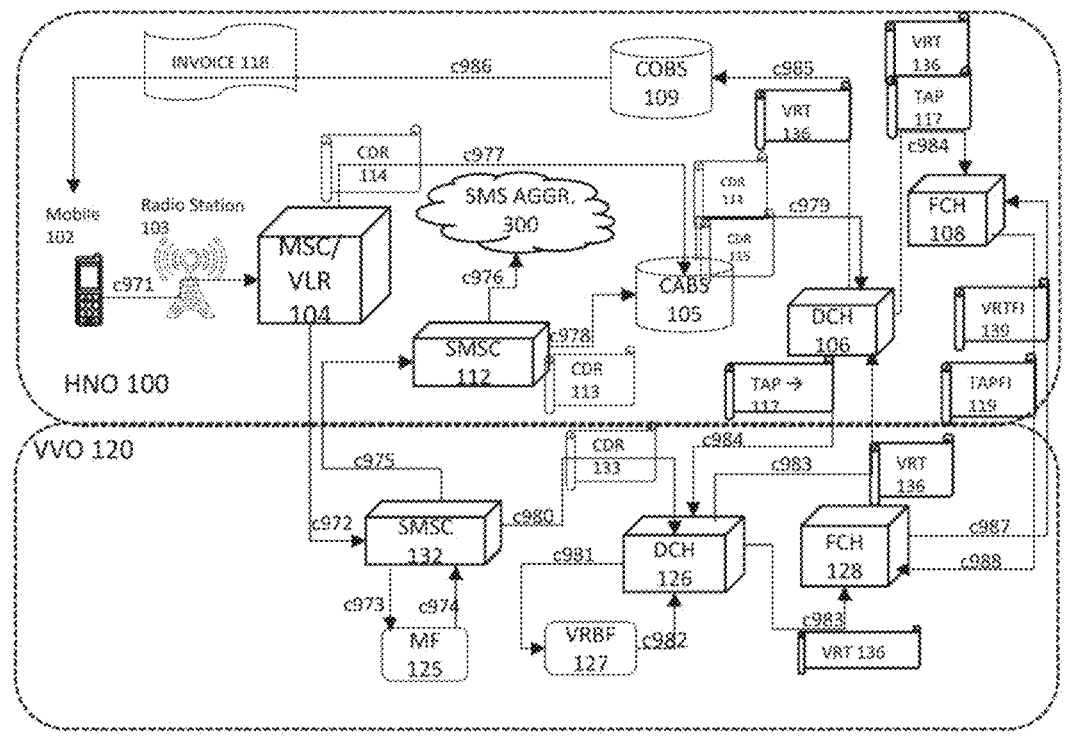
FIG. 17 is a diagram illustrating a process of a virtual roaming call originating from a home network according to another example embodiment.

FIG. 17 is a diagrammatic representation of the network architecture which depicts an example of a virtual roaming subscriber (VRS) associated with Mobile 102 originating an SMS toward MSC/VLR 104 in the HNO 100 in step 1771. Step 1771 also tells the MSC/VLR 104 to which SMSC to send the SMS. Since the subscriber is a VRS, the SMS is sent to the SMSC 132 of the VVO 120 in step 1772 as the SMSC 132 address has been crafted into the SIM/eSIM.

SMSC 132 applies VAS and then performs the mapping function by forwarding information to the MF 125 in step 1773. MF 125 performs the mapping of VVO ID to HNO ID and sends the information back to the SMSC 132 in step 1774.

SMSC 132 upon receipt of the mapped information to HNO ID, sends the message to HNO 100 SMSC 112 in step 1775. This is to ensure any regulatory services required of HNO 100 will be performed.

HNO 100 SMSC 112 forwards the message to its SMS Aggregatory 300 in step 1776 and the message is thus sent to the PSTN world for termination. MSC/VLR 104 of HNO 100, generates an SMS origination CDR 113 with the subscriber ID as the VVO ID.

In step 1777, MSC/VLR 104 sends CDR 113 to CABS 105. CABS 105 generates Carrier CDR 115. SMSC 112 of HNO 100 also generates an SMS origination record CDR 113. This CDR has HNO ID as SMSC 132 has already manipulated the data when sending the message to SMSC 112. In step 1778, SMSC 112 sends CDR 113 to CABS 105. CABS 105 generates Carrier CDR 114 with VVO ID from CDR 113 is received from MSC/VLR 104. CABS 105 generates Carrier CDR 115 with HNO ID from CDR 113 is received from SMSC 112. In step 1779, CABS 105 sends carrier CDR 115 with HNO ID and carrier CDR 114 with VVO ID to DCH 106. DCH 106 generates TAP 117 based on either Carrier CDR 114.

SMSC 132 generates an SMS origination record CDR 133. In step 1780 SMSC 132 sends CDR 133 to DCH 126. In step 1781 the DCH 126 sends CDR 133 through the VRBF 127. In Step 1782, VRBF 127, maps and manipulates (which includes but is not limited to mapping of the VVO ID to HNO ID for the billing records to be sent to the HNO 100) CDR 133 and sends back information to DCH 126 in the form of VRT 136. VRT 136 now has the HNO ID (HNO IMSI) as the key subscriber ID. It is noted that DCH 126 can not only use CDR 133 for generating VRT 136, but also for verifying the authenticity of the TAP 117 from DCH 106. TAP 117 can also be used by DCH 126 to generate VRT 136. All these are flexibilities of DCH 126.

In step 1783 DCH 126 sends TAP 136 to DCH 106 and FCH 128. This is done because the HNO 100 thinks that the VRS subscriber with the VVO ID (VVO IMSI) is roaming in its network and hence the TAP-OUT process is invoked for inbound roamers. In step 1784 DCH 106 sends TAP 117 to DCH 126 and FCH 108. DCH 106 sends VRT 136 to FCH 106. In step 1785 DCH 106 sends VRT 136 to COBS 109. COBS generates INVOICE 118. In step 1786 COBS 109 sends INVOICE 118 to mobile user 102. FCH 128 generates a financial invoice VRTFI 139 from VRT 136. FCH 106 generates TAPFI 119 from TAP 117. In step 1787 FCH 128 sends VRTFI 139 to the FCH 108. In step 1788, FCH 108 sends TAPFI 117 to FCH 128.

If VRTFI 139 and TAPFI 119 are equivalent, then the net charge shall cancel out. If VRTFI 139 and TAPFI 119 are not equivalent, then the appropriate delta charges will be levied by the VVO 120 upon the HNO 100 for the VRS service usage in the foreign network by the HNO 100 subscriber.

Figure 18:
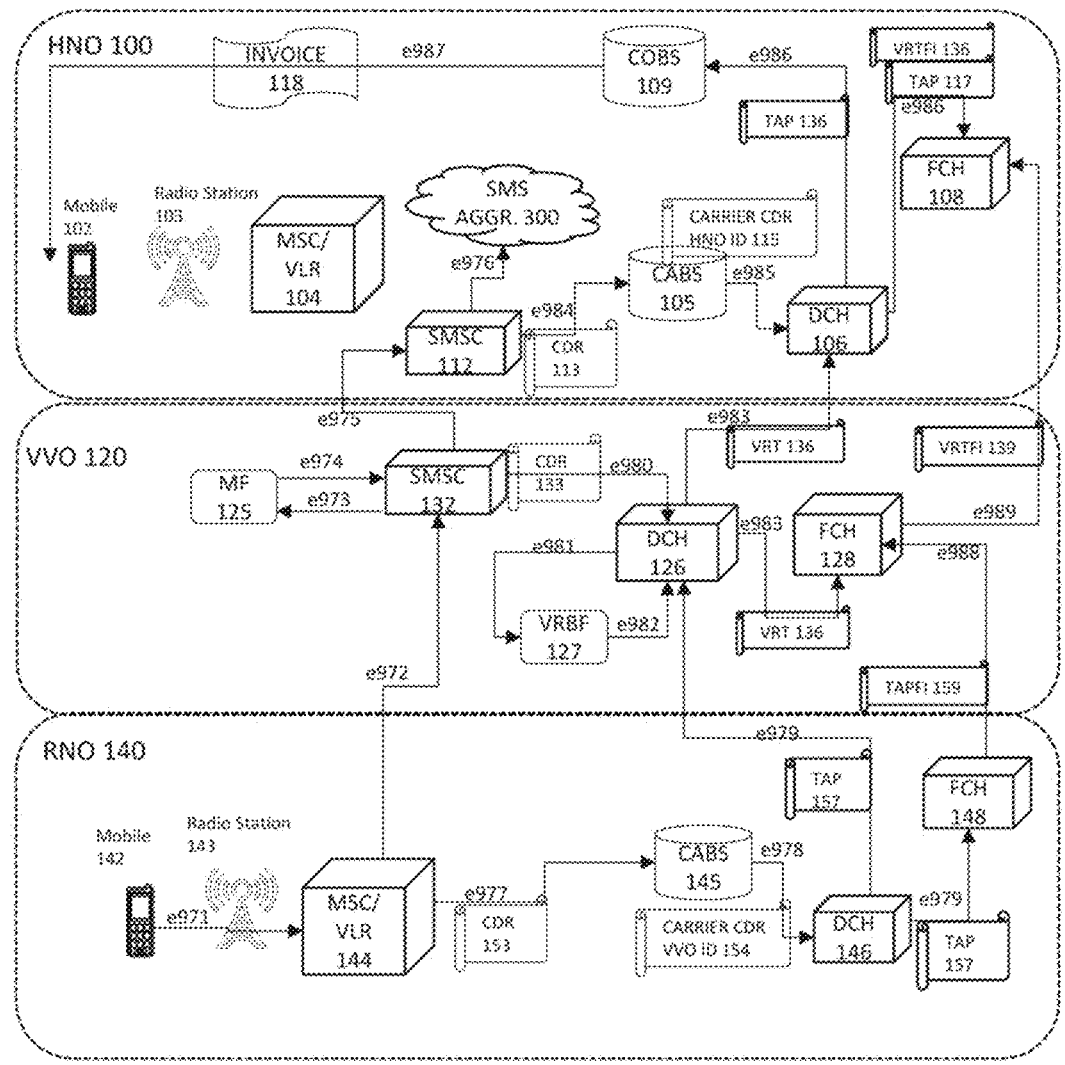
FIG. 18 is a diagram illustrating a process of a virtual roaming call originating from a remote network according to another example embodiment.

FIG. 18 is a diagrammatic representation of the network architecture which depicts a virtual roaming subscriber (VRS) associated with Mobile 142 originating an SMS toward MSC/VLR 144 in the RNO 140 in step 1871. Step 1871 also tells the MSC/VLR 144 to which SMSC to send the SMS.

Since the subscriber is a VRS, the SMS is sent to the SMSC 132 of the VVO 120 in step 1872 as the SMSC 132 address is created onto the SIM/eSIM.

SMSC 132 applies VAS and then performs the mapping function by forwarding information to the MF 125 in step 1873. MF 125 performs the mapping of VVO ID to HNO ID and sends the information back to the SMSC 132 in step 1874. SMSC 132 upon receipt of the mapped information to HNO ID, sends the message to the HNO 100 SMSC 112 in step 1875. This is done to ensure HNO 100 can perform any regulatory services.

HNO 100 SMSC 112 forwards the message to its SMS Aggregator 300 in step 1876 and the message is thus sent to the PSTN world for termination. MSC/VLR 144 of RNO 140, generates a SMS origination CDR 153. In step 1877 MSC/VLR 144 sends CDR 153 with VVO ID to CABS 145. CABS 145 generates a carrier CDR 15 from CDR 153 with VVO ID. In Step 1878 CABS 145 sends CDR 154 to DCH 146. DCH 146 generates TAP 157 from carrier CDR 154. In step 1879 DCH 146 sends TAP 157 to DCH 126 of VVO 120 and FCH 148. SMSC 132 generates CDR 133 for SMS origination with VVO ID. In step 1880 SMSC 132 sends CDR 133 to DCH 126. In Step 1881, DCH 126 sends TAP 117 through the VRBF 127.

In Step 1882, VRBF 127, maps and manipulates (which includes but not limited to, mapping of the VVO ID to HNO ID for the billing records to be sent to the HNO 100) TAP 157 and sends back information to DCH 126 in the form of VRT 136. VRT 136 now has the HNO ID (HNO IMSI) as the key subscriber ID. It is noted that DCH 126 can also use CDR 133 for generating VRT 136, and for verifying the authenticity of the TAP 157 from DCH 146. These are flexibilities of DCH 126.

In Step 1883 DCH 126 sends TAP file VRT 136 to DCH 106 and to FCH 128. SMSC 112 generates CDR 113 with HNO ID. In step 1884 the SMSC 112 sends CDR 113 to CABS 105. CABS 105 generates Carrier CDR 115 with HNO ID from CDR 113. In step 1885 CABS sends CDR 115 to DCH 106. DCH 106 generates TAP 117 from CDR 115. TAP 117 file has HNO ID. In step 1886 DCH 106 sends tap file VRT 136 to COBS 109 and FCH 108. DCH 106 also sends TAP 117 to FCH 108. In step 1887 COBS 109 sends INVOICE 118 to mobile user 102. FCH 148 of RNO 140 generates the financial invoice TAPFI 159 from TAP 157. In Step 1888 FCH 148 sends the financial invoice TAPFI 159 to FCH 128 in VVO 120. FCH 128 generates VRTFI 139 from VRT 136. In step 1889 FCH 128 sends the financial invoice VRTFI 139 to FCH 108.

If VRTFI 139 and TAPFI 159 are equivalent, then the net charge shall cancel out. If VRTFI 139 and TAPFI 159 are not equivalent, then the appropriate delta charges will be levied by the VVO upon the HNO 100 for the VRS service usage in the foreign network by the HNO 100 subscriber.

Figure 19:
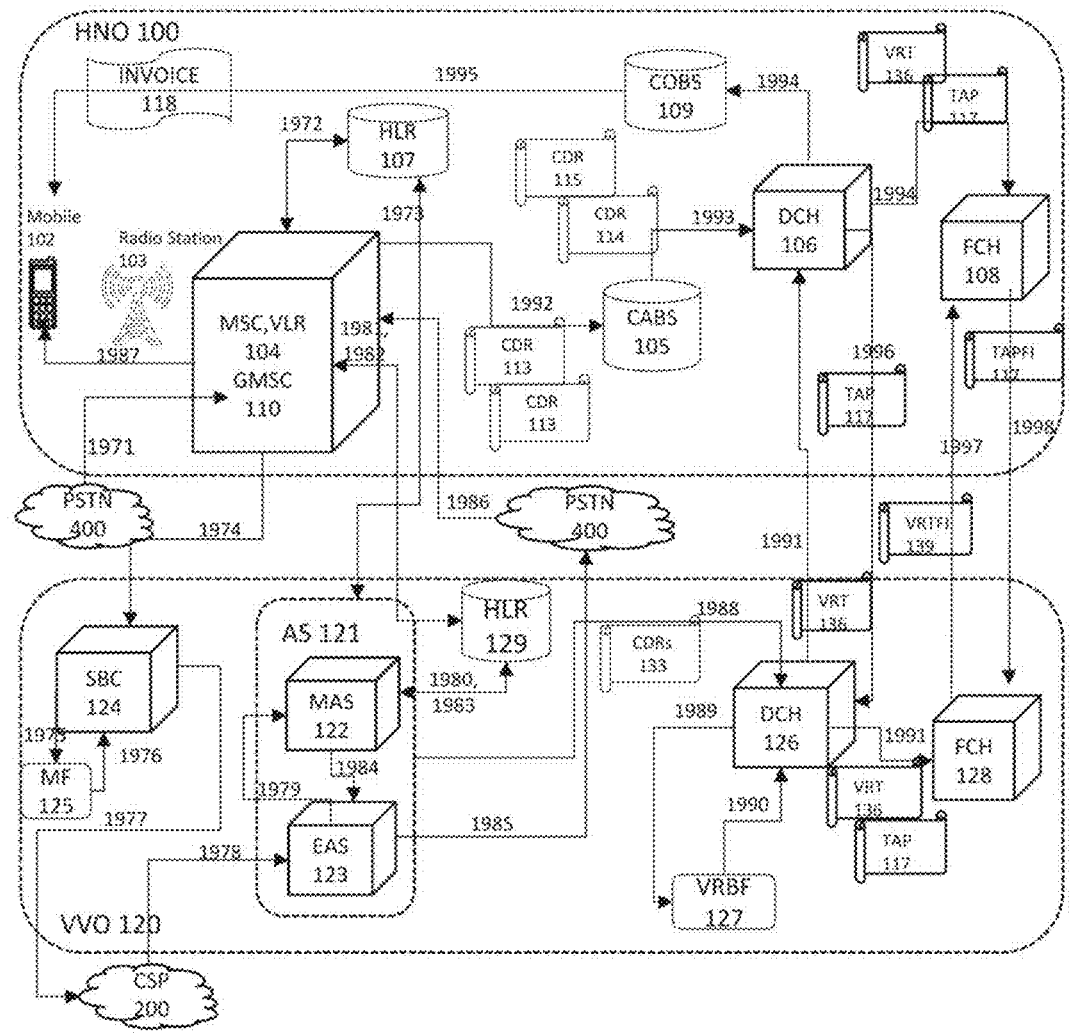
FIG. 19 is a diagram illustrating a call termination process according to another example embodiment.

FIG. 19 is a diagrammatic representation of the network architecture which depicts a virtual roaming subscriber (VRS) receiving a call from a PSTN user via the PSTN interconnect 400. Step 1971 illustrates the call coming from the PSTN 400 to the GMSC 110 in the HNO 100. Since the VRS subscriber public number has not changed, all networks still route calls destined to the VRS public number to the HNO 100.

GMSC 110 queries the HLR 107 for the termination information in step 1972 and since the HLR 107 in the HNO 100 thinks that the subscriber is located in the VVO 120, the query in step 1973 results in the AS 121 in VVO 120 returning the information of the AS 121 in the VVO 120.

The AS 121 is responsible for returning the routing number to the HLR 107. This information is then returned in step 1972 to the GMSC 110.

GMSC 110 routes the call based on the routing number provided by AS 121 towards the SBC 124 in the VVO 120 in step 1974. The SBC 124 involves the mapping function MF 125 via the steps 1975 and 1976 to map HNO ID to VVO ID if necessary. The SBC then extends the call to the CSP 200 PBX for the call termination towards the enterprise network. CSP 200 can ring a desk phone, if necessary, and extends the calls towards the AS 121 in the VVO 120 for the termination leg towards the mobile user 102 in step 1978. EAS 123 in the AS 121 of the VVO 120 receives the call and extends the call to the MAS 122 in the AS 121 for location query in step 1979.

The MAS 122 which is responsible for the mobility side of the enterprise user, queries the HLR 129 in the VVO 120 for actual location of the VRS in step 1980. Since the VRS subscriber is registered at the MSC/VLR 104 of the HNO 100, the HLR 129 of the VVO 120 queries the MSC/VLR 104 for a routing number in step 1981. The MSC/VLR 104 of the HNO 100, provides a routing number to the HLR 129 of the VVO 120 in step 1982. The HLR 129 returns the routing number to the MAS 122 in step 1983 which is handed over to the EAS 123 in step 1984. The EAS 123 routes the call, post application of VAS to the PSTN interconnect 400, in step 1985. PSTN 400 routes the call to the MSC/VLR 104 in step 1986 for termination to the VRS. The MSC/VLR 104 locates the subscriber and offers the call to the VRS associated with the mobile 102 in step 1987. In step 1988 AS 121 in the VVO 120, generates a CDR 133 which is sent to the DCH 126. In step 1989 DCH 126 send CDR 133 to VRBF 127.

In Step 1990, VRBF 127, maps and manipulates (which includes but is not limited to mapping of the VVO ID to HNO ID for the billing records to be sent to the HNO 100) CDR 133 and sends back information to DCH 126 in the form of VRT 136. VRT 136 now has the HNO ID (HNO IMSI) as the key subscriber ID to perform the billing function which is not limited to mapping only. The intention here is to map the VVO ID to the HNO ID and then to generate a tap file with the HNO ID and send it to the DCH 106 of the HNO 100. It is noted that DCH 126 has multiple options here: It can use the CDR 133 generated from AS 121, or it can use the TAP 117 arriving from the DCH 106. We are showing here the case where the DCH 126 is using the CDR 133.

In step 1991 DCH 126 sends VRT 136 to DCH 106 and FCH 128. There are two CDRs 113 that are generated and sent to CABS 105. One CDR 113 is for the incoming call to the GMSC 110 which carries the HNO ID of the VRS subscriber. Another CDR 113 is generated by the MSC/VLR 104 for the actual termination to the VRS subscriber with VVO ID of the VRS subscriber. In Step 1992 these CDRs 113 are sent to CABS 105.

CABS 105 generates two carrier CDRs 114 and 115 based on the CDRs 113. Carrier CDR 114 with the VVO ID is for the actual termination based on CDR 113 received from MSC/VLR 104. Carrier CDR 115 with HNO ID of the VRS subscriber is for the gateway termination, based on CDR 113 received from GMSC 110.

In step 1993 CDR 114 and CDR 115 are sent to DCH 106 from CABS 105. DCH 106 generates TAP 117 based on CDR 114. In step 1994 DCH 106 sends TAP 117 to COBS 109 and FCH 108. DCH 106 sends VRT 136 to FCH 108. In step 1995 COBS 109 generates INVOICE 118 for Mobile 102. In step 1994 DCH 106 sends the VRT 116 extracted from VRT 136, to the consumer billing system COBS 109 for the consumer billing invoice 118 to be generated. In step 1995 COBS 109 sends the INVOICE 118 to the user of the mobile 102. In step 1996 DCH 106 sends TAP 117 to DCH 126. FCH 128 generates financial invoice VRTFI 139 based on VRT 136. FCH 108 generates financial invoice TAPFI 119 based on TAP 117. In step 1997 FCH 128 sends VRTFI 139 to FCH 108. In step 1998 FCH 108 sends TAPFI 119 to FCH 128.

If VRTFI 139 and VRTFI119 are equivalent, then the net charge shall cancel out. If VRTFI 139 and VRTFI119 are not equivalent, then the appropriate delta charges will be levied by the VVO 120 upon the HNO 100 for the VRS service usage in the foreign network by the HNO 100 subscriber.

Figure 20:
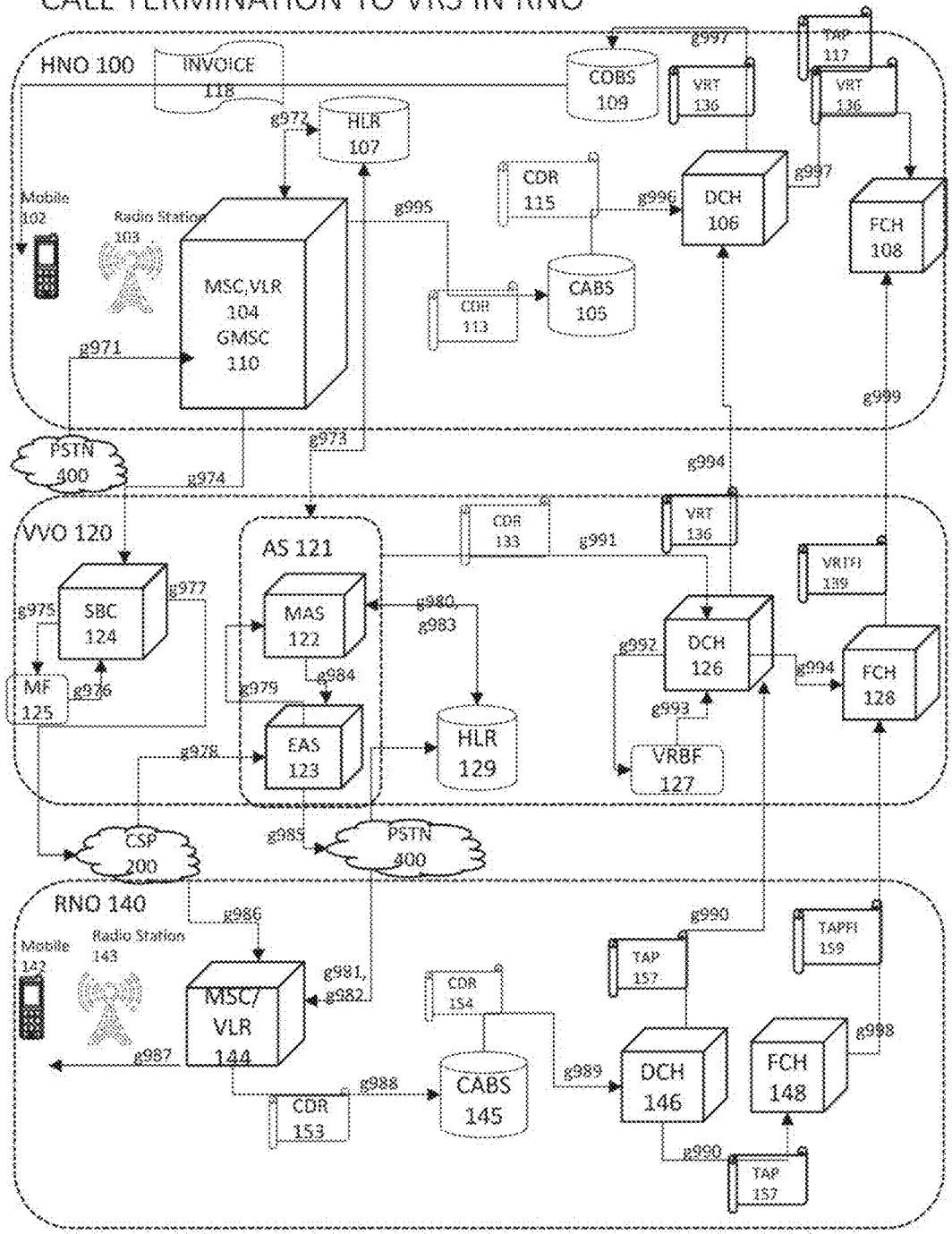
FIG. 20 is a diagram a call termination process according to another example embodiment.

FIG. 20 is a diagrammatic representation of the network architecture which depicts a virtual roaming subscriber (VRS) receiving a call from a PSTN user via the PSTN interconnect 400 while it is in the RNO 140. Step 2071 illustrates the call coming from the PSTN 400 to the GMSC 110 in the HNO 100. Since the VRS subscriber public number has not changed, all networks still route calls destined to the VRS public number to the HNO 100.

GMSC 110 queries HLR 107 for the termination information in step 2072 and since the HLR 107 in the HNO 100 thinks that the subscriber is located in the VVO 120, the query in step 2073 results in the AS 121 in VVO 120 returning the information of the AS 121 in the VVO 120. AS 121 is responsible for returning the routing number to the HLR 107. This information is then returned in step 2072 to the GMSC 110.

GMSC 110 routes the call based on the routing number provided by AS 121 towards the SBC 124 in the VVO 120 in step 2074. The SBC 124 involves the mapping function MF 125 via the steps 2075 and 2076 to map HNO ID to VVO ID if necessary. It is noted that MF 125 may or may not reside in AS 121.

SBC124 extends the call to CSP 200 PBX for the call termination towards the enterprise network in step 2077. CSP 200 can ring a desk phone if necessary and extends the calls towards AS 121 in the VVO 120 for the termination leg towards the mobile user 102 in step 2078. EAS 123 in AS 121 of the VVO 120 receives the call and extends the call to MAS 122 in AS 121 for location query in step 2079. MAS 122, responsible for the mobility side of the enterprise user, queries the HLR 129 in the VVO 120 for the actual location of the VRS in step 2080. Since the VRS subscriber is registered at MSC/VLR 144 of the RNO 140, HLR 129 of the VVO 120 queries MSC/VLR 144 in the RNO 140 for a routing number in step 2081. MSC/VLR 144 of the RNO 140, provides a routing number to HLR 129 of the VVO 120 in step 2082. HLR 129 returns the routing number to MAS 122 in step 2083 which is handed over to the EAS 123 in step 2084. EAS 123 routes the call, post application of VAS to PSTN interconnect 400, in step 2085. PSTN 400 routes the call to MSC/VLR 144 in step 2086 for termination to Mobile 142. In step 2087, MSC/VLR 144 locates Mobile 142 and offers the call to mobile 142. CDR 153 is generated by MSC/VLR 144 for the actual termination to the VRS subscriber. In step 2088 the MSC/VLR 144 delivers CDR 153 to CABS 145. CABS 145 generates carrier CDR 154. The subscriber ID in this CDR is VVO ID of the VRS subscriber. In step 2089, CABS 145 sends Carrier CDR 154 to DCH 146. DCH 146 generates TAP 157 from CDR 154. In step 2090, DCH 146 sends TAP 157 to DCH 126 and FCH 148. AS 121 generates CDR 133 a termination record with subscriber ID as VVO ID. In step 2091 CDR 133 is sent to DCH 126 by AS 121.

DCH 126, has the discretion to use either incoming TAP 157 from the RNO 140 or use the record CDR 133 generated by AS 121 for the generation of a tap file VRT 136. DCH 126 has the ability to perform a comparison of the information sent in TAP 157 with the information received in the CDR 133, to ensure the fidelity of the charges being accrued by the VRS subscriber.

In step 2092 it is assumed that DCH 126 is using the TAP 157 and passes the record through the VRBF 127. VRBF 127 maps and manipulates (which includes but is not limited to mapping of the VVO ID to HNO ID for the billing records to be sent to the HNO 100) TAP 157. VRBF 127 generates VRT 136. VRT 136 has the HNO ID (HNO IMSI) as the key subscriber ID. In step 2093 VRBF 127 sends VRT 136 to DCH 126. In step 2094 DCH 126 sends VRT 136 to FCH 128 and DCH 106. GMSC 110 generates CDR 113 for the gateway termination of the call to the VRS subscriber with HNO ID. In step 2095 GMSC 110, sends CDR 113 to CABS 105. CABS 105 generates the carrier CDR 115. CDR 115 is known as the carrier CDR and this contains the HNO ID of the VRS subscriber. In step 2096 CABS 105 sends CDR 115 to DCH 106. DCH 106 generates TAP 117 based on CDR 115. Since this record contains the HNO ID, this record is never shared with the other networks. In step 2097, DCH 106 sends the tap file TAP 136 and TAP 117 to FCH 108. DCH 106 also sends VRT 136 to COBS 109 for the generation of the INVOICE 118 towards the VRS user associated with the mobile 142.

FCH 148 generates financial invoice VRTFI 159 based on VRT 157. FCH 128 generates financial invoice VRTFI 139 based on VRT 136. In step 2098 FCH 148, shares the financial invoice TAPFI 159 with FCH 128. In step 2099 FCH 128 shares the financial invoice VRTFI 139 with FCH 108.

If VRTFI 139 and TAPFI 159 are equivalent, then the net charge shall cancel out. If VRTFI 139 and TAPFI 159 are not equivalent, then the appropriate delta charges will be levied by the VVO 120 upon the HNO 100 for the VRS service usage in the foreign network by the HNO 100 subscriber.

Figure 21:
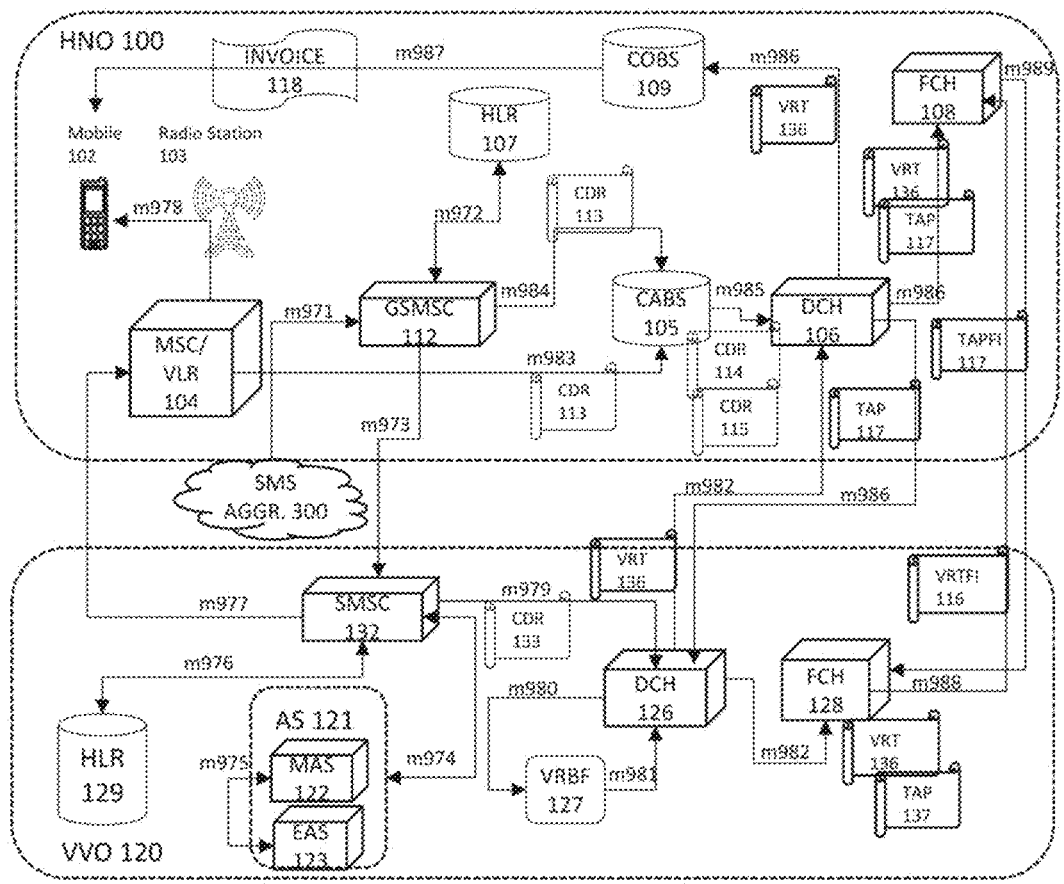
FIG. 21 is a diagram illustrating a messaging termination process according to an example embodiment.

FIG. 21 is a diagrammatic representation of the network architecture which depicts a virtual roaming subscriber (VRS) associated with Mobile 102 receiving an SMS while in the HNO 100. Step 2171 shows the message coming from a PSTN user via the SMS Aggregator 300 towards the GSMSC 112 in the HNO 100. In step 2172 GSMSC 112 queries the HLR 107 in the HNO 100 for the location of the VRS subscriber. HLR 107 stores the pseudo location information of the VRS subscriber and returns the SMSC address of the VVO 120 in step 2172. GSMSC 112 forwards the message to the SMSC 132 in the VVO 120 in step 2173. SMSC 132 for the application of VAS forwards the message to AS 121 in step 2174. The two functions in the AS 121 MAS 122 exchange the messages in step 2175 apply VAS. As then responds back in the same step 2174 to the SMSC 132. SMSC 132 upon receipt of the message performs the HLR 129 query to obtain the actual location of the VRS subscriber in step 2176. Since the VRS subscriber is roaming in the HNO 100 the HLR returns the address of the MSC/VLR 104 in the HNO 100. SMSC 132 forwards the message to the MSC/VLR 104 in step 2177. MSC/VLR 104 in the HNO 100 sends the message to the VRS subscriber mobile 102 in step 2178. SMSC 132 generates a message termination record CDR 133. In step 2179 SMSC 132 sends CDR 133 to DCH 126. In Step 2180, DCH 126 sends TAP CDR 133 through the VRBF 127. In Step 2181, VRBF 127, maps and manipulates (which includes but is not limited to mapping of the VVO ID to HNO ID for the billing records to be sent to the HNO 100) CDR 133 and sends back information to DCH 126 in the form of VRT 136. VRT 136 now has the HNO ID (HNO IMSI) as the key subscriber ID.

In Step 2182 DCH 126 sends TAP file VRT 136 to DCH 106 and to FCH 128. MSC/VLR 104 generates CDR 113 for the actual termination of the message to the subscriber of Mobile 102. In step 2183 MSC/VLR 104 sends CDR 113 to CABS 105. GSMSC 112 generates CDR 113 for the gateway involvement in the message termination to the VRS subscriber. This record CDR 113 generated by GSMSC 112 has the subscriber ID as the HNO ID (HNO IMSI). In step 2184 CDR 113 generated by GSMSC 112 is sent to CABS 105. CABS 105 generates two carrier CDRs 114 and 115 based on the CDRs 113. Carrier CDR 114 with the VVO ID the actual termination based on CDR 113 received from MSC/VLR 104. Carrier CDR 115 with HNO ID of the VRS subscriber for the gateway termination, based on CDR 113 received from GSMSC 112. In step 2185 CABS 105 sends the carrier CDR 114 and CDR 115 to DCH 106.

DCH 106 generates TAP 117 from the carrier CDR 114. In step 2186: DCH 106 sends TAP 136 to COBS 105, DCH 106 sends TAP 117 and VRT 136 to FCH 108, DCH 106 sends TAP 117 to DCH 126. In step 2187 COBS 109 generates INVOICE 118 for Mobile 102. FCH 128 generates a financial invoice VRTFI 139 from VRT 136. In step 2188 FCH 128 sends VRTFI 139 to FCH 108. FCH 108 generates a financial invoice VRTFI 119 from TAP 117. In step 2189 FCH 108 sends VRTFI 119 to FCH 128.

If VRTFI 139 and VRTFI119 are equivalent, then the net charge shall cancel out. If VRTFI 139 and VRTFI119 are not equivalent, then the appropriate delta charges will be levied by the VVO 120 upon the HNO 100 for the VRS service usage in the foreign network by the HNO 100 subscriber.

Figure 22:
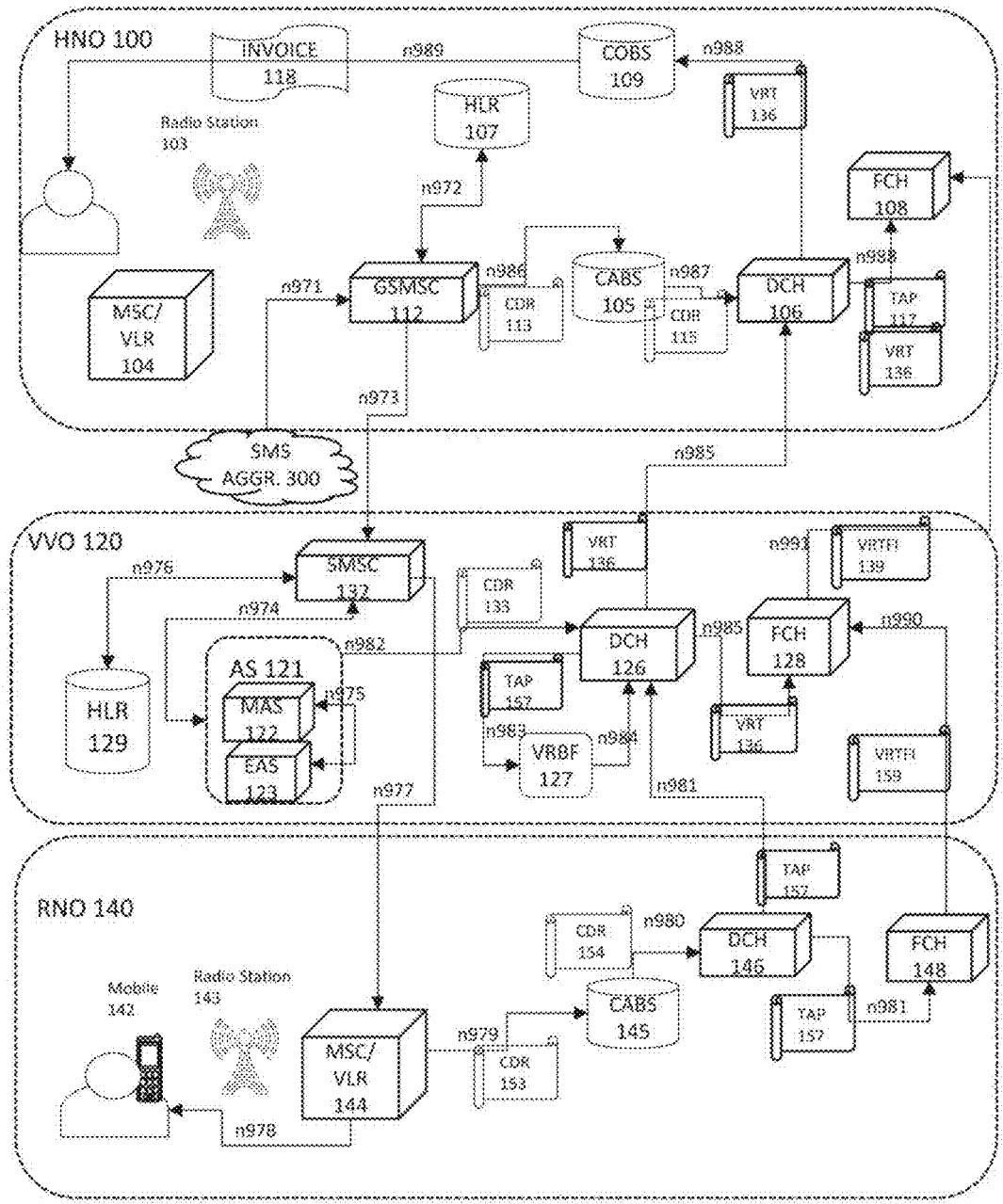
FIG. 22 is a diagram illustrating a messaging termination process according to another example embodiment.

FIG. 22 is a diagrammatic representation of a network architecture which depicts a virtual roaming subscriber (VRS) associated with Mobile 142 receiving an SMS while in the RNO 140. Step 2271 shows the message coming from a PSTN user via the SMS Aggregator 300 towards the GSMSC 112 in the HNO 100. In step 2272 GSMSC 112 queries the HLR 107 in the HNO 100 for the location of the VRS subscriber. HLR 107 stores the pseudo location information of the VRS subscriber and returns the SMSC address of the VVO 120 in step g972. The GSMSC 112 forwards the message to the SMSC 132 in the VVO 120 in step 2273. SMSC 132 for the application of VAS forwards the message to the AS 121 in step 2274. The two functions in the AS 121 MAS 122 exchange the messages in step 2275 apply VAS. As then responds back in the same step 2274 to the SMSC 132. SMSC 132 upon receipt of the message performs HLR 129 query to obtain the actual location of the VRS subscriber in step 2276. Since the VRS subscriber is roaming in the HNO 100 the HLR returns the address of MSC/VLR 144 in the RNO 140. SMSC 132 forwards the message to MSC/VLR 144 in step 2277. MSC/VLR 144 in the RNO 140 sends the message to the VRS subscriber mobile 142 in step 2278.

MSC/VLR 144 generates an actual message termination CDR 153. In step 2279 MSC/VLR 104 sends CDR 153 to CABS 145 for the generation of the carrier CDR 154. CABS 145 generates carrier CDR 154 with the VVO ID of the VRS from CDR 153. In step 2280 CABS sends CDR 154 to DCH 146. DCH 145 generates TAP 157 from CDR 154. In step 2281 DCH 146 sends TAP 157 to DCH 126 and FCH 148. AS 121 generates CDR 133. In step 2282 CDR 133 is sent to DCH 126. DCH 126 has the options of using either incoming TAP 157 from the RNO 140 or use the record CDR 133 generated by AS 121 for the generation of a tap file VRT 136. DCH 126 has the ability to perform a comparison of the information sent in TAP 157 with the information received in the CDR 133, to ensure the fidelity of the charges being accrued by the VRS subscriber.

In step 2283 it is assumed, DCH 126 is sending TAP 157 to VRBF 127. VRBF 127, maps and manipulates (which includes but not limited to mapping of the VVO ID to HNO ID for the billing records to be sent to the HNO 100) TAP 157. VRBF 127 generates VRT 136. VRT 136 has the HNO ID (HNO IMSI) as the key subscriber ID.

In Step 2284 VRBF 127 sends VRT 136 to DCH 126. In step 2285 DCH 126 sends TAP file VRT 136 to DCH 106 and to FCH 128. GSMSC 112 generates CDR 113 for the gateway involvement in the message termination to the VRS subscriber. This record CDR 113 generated by GSMSC 112 has the subscriber ID as the HNO ID (HNO IMSI). In step 2286 CDR 113 generated by GSMSC 112 is sent to CABS 105. CABS 105 generates CDRs 115 based on the CDR 113. Carrier CDR 115 has HNO ID of the VRS subscriber. In step 2287 CABS 105 sends CDR 115 to DCH 106. DCH 106 generates TAP 117 from CDR 113. In step 2288 DCH 106 sends the TAP 117 and VRT 136 to the FCH 108. DCH 106 sends VRT 136 to COBS 109. COBS generates INVOICE 118. In step 2289 COBS 109 generates INVOICE 118 for Mobile 102. FCH 148 generates financial invoice VRTFI 159 based on VRT 157. FCH 128 generates financial invoice VRTFI 139 based on VRT 136. In step 2290 FCH 148, shares the financial invoice TAPFI 159 with FCH 128. In step 2291 FCH 128 shares the financial invoice VRTFI 139 with FCH 108.

If VRTFI 139 and TAPFI 159 are equivalent, then the net charge shall cancel out. If VRTFI 139 and TAPFI 159 are not equivalent, then the appropriate delta charges will be levied by the VVO 120 upon the HNO 100 for the VRS service usage in the foreign network by the HNO 100 subscriber.

Figure 23:
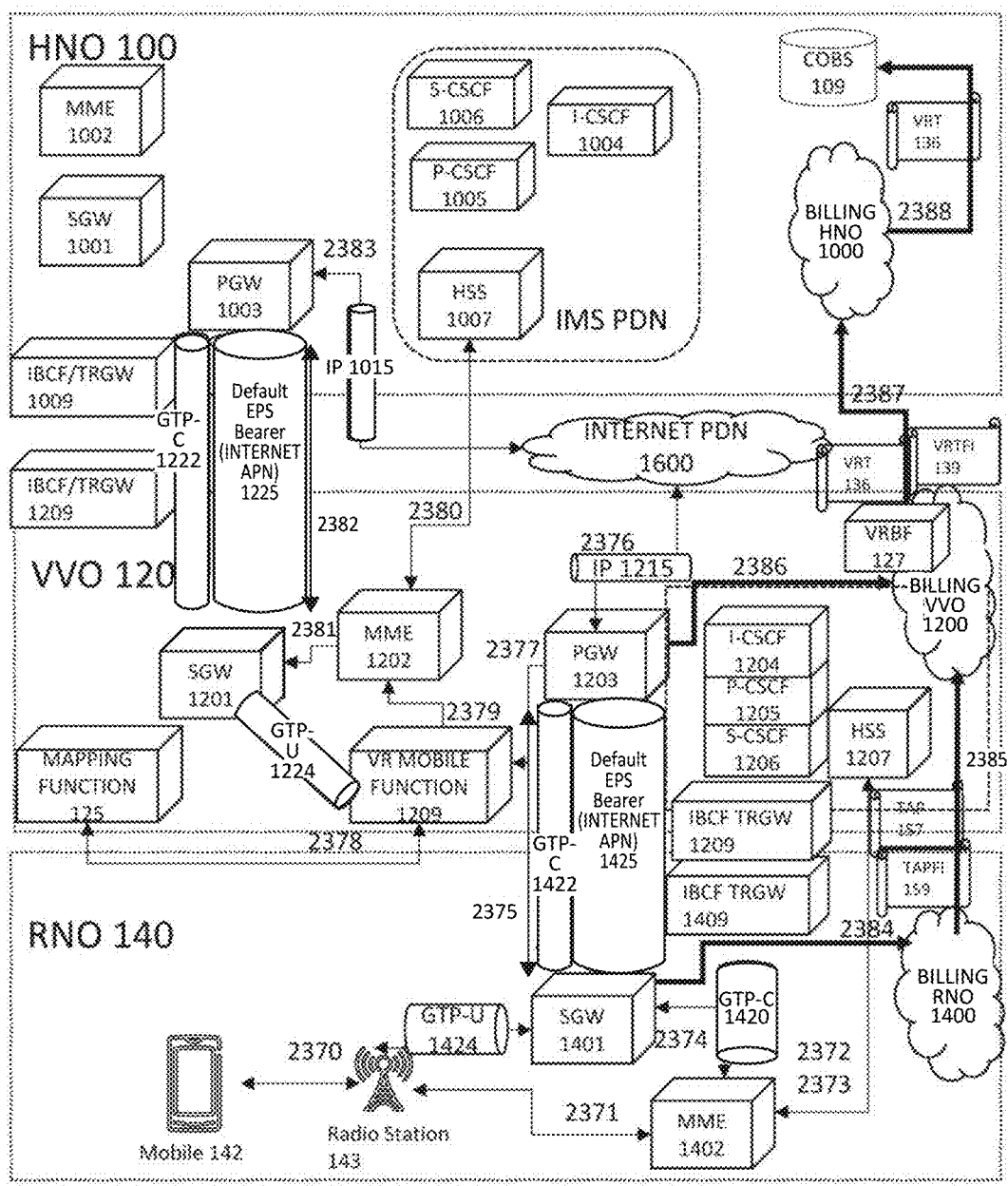
FIG. 23 is a diagram illustrating a roaming attach process according to an example embodiment.

FIG. 23 is a diagrammatic representation of the network architecture which depicts a virtual roaming subscriber (VRS) associated with Mobile 102 attaching to the LTE network. In step 2370 VRS Mobile 142 attaches via the EPS access network Radio Station 143. The initial attach is always towards the default Internet PDN 1600 as defined in the subscriber profile on the HSS 1207 in the VVO 120.

In step 2371 MME 1402 interworks with the Radio Station 143 over S1-AP interface to establish the signaling and bearer links between the Radio Station 143 and the SGW 1401 and the SGW 1401 and PGW 1203.

In steps 2372 and 2373, a Diameter protocol-based query response relationship between the MME 142 and HSS 1207 is established. The MME 1402 downloads the VRS Mobile 1402 related information which is used to establish the bearer link to the default Internet PDN 1600.

In step 2374 a GTP-C tunnel 1420, a signaling tunnel, is established between the SGW 1401 and the MME 1402.

In step 2375, GTP-C tunnel 1422 and GTP-U tunnel 1425 are established between the SGW 1401 in RNO 140 and PGW 1203 in VVO 120. Note that during this exchange a GTP-U tunnel 1424, between the Radio Station 143 and the SGW 1401 is also established.

In step 2376, PGW 1203 establishes the IP tunnel 1215 to the Internet PDN 1600. It is noted that based on the subscriber profile, the VVO reserves the right and ability to either connect to the Internet PDN 1600 from the VVO or forward requests to the HNO 100 so that the user can connect to the Internet PDN from the HNO 100. This allows the VRS Mobile 142 to connect to corporate networks via the HNO 100 thus maintaining the level of security to access user confidential information.

In step 2377, PGW 1203 realizing this is a VRS subscriber, initiates the process of establishing a connection with the HNO 100 by invoking function VRMF 1209 which can be collocated or otherwise. VRMF provides the handshake between the RNO and the HNO. This is because the essence of the Virtual Roaming solution is to give an impression to the HNO 100 that the subscriber is located in the VVO 120 irrespective of the subscriber's actual location. The S8HR architecture entails that the routing takes place via the home network.

In step 2378 VRMF 1209 consults MF 125 to convert the identity from VVO ID to HNO ID as the VRS subscriber is known to the HNO 100 via the HNO ID. In step 2379 VRMF 1209 initiates a transaction with the MME as if VRS subscribers with the HNO ID are trying to attach to the HNO 100. In step 2380 MME 1202 updates HSS 1007 in HNO 100 about the location of the VRS subscriber. This transaction happens over the Diameter protocol. In step 2381 MME 1202 selects an SGW 1201 in the VVO 120 to talk to the HNO PGW 1003. PGW selection logic on MME 1202 in VVO 120 can be based on the information provided by the VRMF 1209. In Step 2382 SGW 1201 in VVO 120 establishes GTP-C tunnel 1222 and GTP-U tunnel 1225 with PGW 1003 in the HNO 100. In step 2383 PGW based on the default APN information establishes an IP tunnel 1015 to the Internet PDN 1600. NOTE, this tunnel remains dormant for most of the time other than any keep alive mechanism the VVO might invoke to prevent detachment. This document assumes it is always on for the bearer to the default APN. At this point the VRS user is using the internet offered by the VVO network. It is noted that border gateways 1409, 1209 and 1009 have been shown for completeness as one network might utilize access to the other via their own border gateway to maintain border security.

In step 2384 SGW 1401 generates bearer data volume based CDRs and sends it to the RNO Billing system 1400. In step 2385 the RNO Billing system sends TAP files to the VVO Billing system 1200. In step 2386 PGW 1203 sends volume-based charging CDR over GTP' to the VVO Billing system 1200. The VVO Billing System 1200 invokes the VRBF 127 function to map from VVO ID to HNO ID. In step 2387 VVO Billing system 1200 sends the tap file to the HNO Billing system 1000. In step 2388 HNO Billing system sends the tap file to the COBS 109 to generate the billing invoice towards the VRS subscriber.

Figure 24:
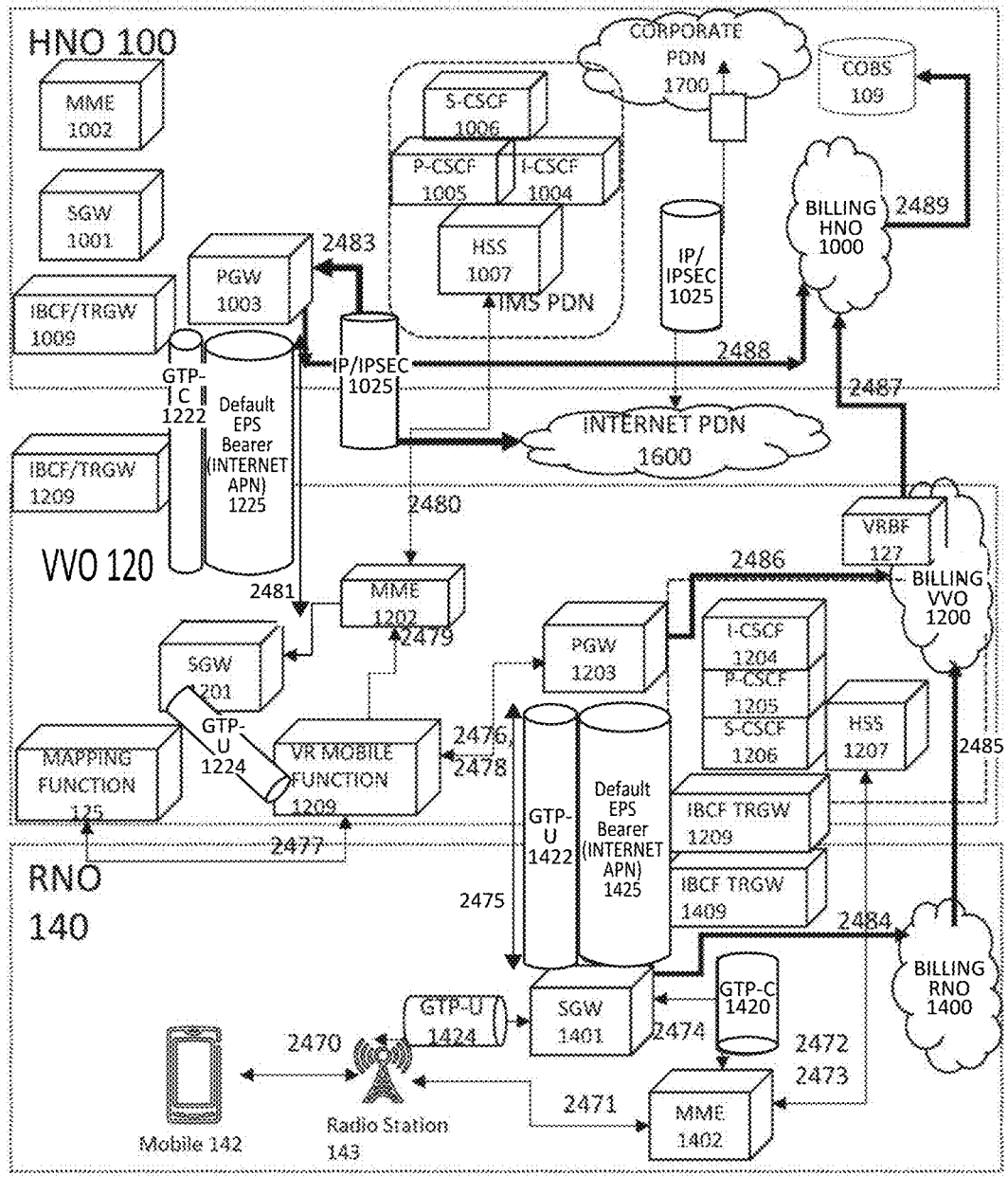
FIG. 24 is a diagram illustrating a roaming attach process according to another example embodiment.

FIG. 24 is a diagrammatic representation of the network architecture which depicts a virtual roaming subscriber (VRS) associated with Mobile 102 attaching to the LTE network. FIG. 24 is an extension of FIG. 23 except there are a couple of new interfaces introduced.

Step 2476 from PGW 1203 to the MF 125 becomes bidirectional. As a result, the PGW is informed of the mapping information from VVO ID to HNO ID so that the same can be employed for the data traffic. A GTP-U tunnel 1224 is setup between SGW 1201 and the VRMF 1209 to transfer signaling, perform mapping and en/de-capsulation between the VVO 120 and the HNO 100. PGW 1003 in the HNO connects to the Internet PDN 1600. Internet 1600 is a pathway to the Corporate Network 1700. IP/IP-Sec tunnels 1025 are established to access the corporate network 1700 with adequate security. The flexibility of routing to the Internet PDN 1600 via the HNO 100 resides in the VVO 120 which can be based on the subscriber profile or locally crafted logic. Step 2488 now is from the PGW 1003 of HNO 100 sending data volume CDR towards the HNO Billing System 1000. Step 2489 is from HNO Billing system 1000 to COBS 109 for the generation of the consumer invoice.

Figure 25:
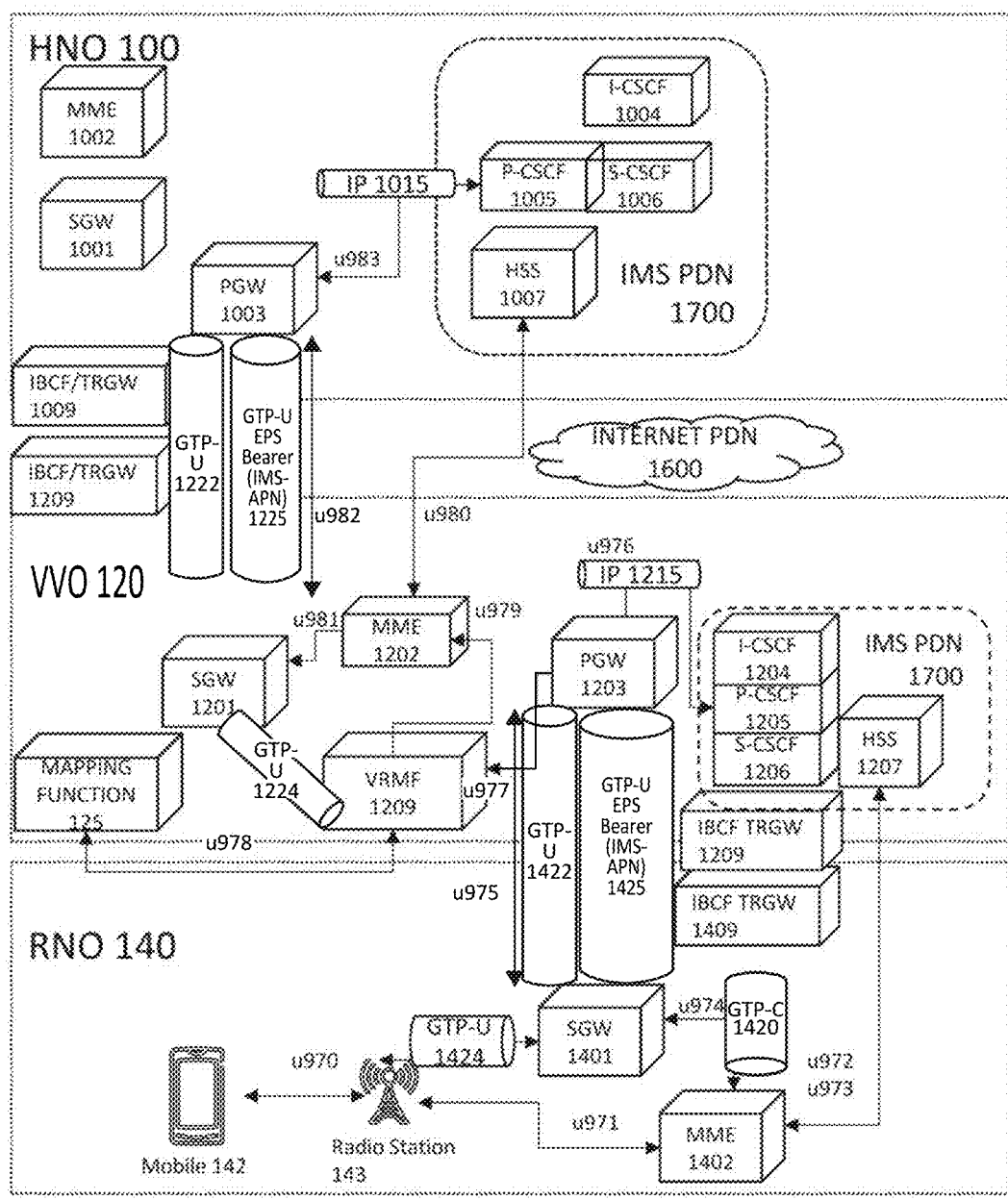
FIG. 25 is a diagram illustrating a virtual roaming registration process according to an example embodiment.

FIG. 25, is a diagrammatic representation of the network architecture which depicts a virtual roaming subscriber (VRS) associated with Mobile 102 performing an attach towards the IMS APN and initiates the process by sending an Initial Attach or a PDN connectivity request based on the state of the default connection towards the internet APN.

In step 2570, Mobile Station 142 sends an attach request towards the IMS APN and requests the IMS entry point address of the IMS PDN 1700 in the VVO. In step 2571 the signaling to create a connection towards the IMS APN is sent to the MME 1402 over the S1AP interface embedded in the RRC message. In steps 2572, if authentication is required the MME 1402 in RNO 140 interworks with HSS 1207 in VVO 120 to extract authentication, ciphering related information and interworks with Mobile Station via Radio Station 143 to authenticate and cipher. In step 2573 the MME 1402 updates the HSS 1207 to update the HSS with the user information. In step 2574 MME 1402 interworks with SGW 1401 over GTP-C 1420 to help establish GTP-U tunnels for SIP messaging for the purposes of IMS registering. In step 2575 SGW 1401 interworks with PGW 1203 in VVO 120 over GTP-C 1422 to establish the default EPS bearer GTP-U 1425. In step 2576 PGW 1203 is responsible for allocation an IP address to the Mobile Station 142 for the IMS PDN 1700 in the VVO 120 and also discovers and provides P-CSCF 1205 address of the IMS PDN 1700, so that the Mobile Station 142 send SIP messages to the entry point of the IMS PDN 1700 in the VVO.

In step 2577 PGW 1203 realizing that this is a VRS subscriber, invokes the VRMF 1209 and sends the attach request towards the IMS PDN 1700 of the HNO. This is done because the HNO 100 thinks that the subscriber is registered in the VVO 120 and hence any terminating calls that arrive at the HNO 100 to the VRS subscriber using the HNO ID can be routed to the VVO 120.

In step 2578 VRMF 1209 post getting the indication from the PGW 1203, invokes the MF 125 to convert the VVO ID to the HNO ID before establishing a tunnel towards the HNO 100. VRMF 1209 performs the access functions representing the mobile access side. In step 2579 VRMF 1209 sends an attach indication towards the MME 1202 over the S1AP interface. This includes sending the pseudo VVO location information of the VRS subscriber. In step 2580 MME 1202 interworks with the HLR to obtain subscriber information based on the HNO ID. In step 2581 MME selects the PGW 1003, SGW 1201 and using GTP-C tunnel signaling helps establish the GTP-U tunnel 1224 between the VRMF 1209 and the SGW 1201. In step 2582 SGW 1201 using GTP-C tunnel establishes GTP-U tunnel 1225 with PGW 1003. In step 2583 PGW assigns an IP address, discovers P-CSCF 1005 and entry points to the IMS PDN 1700 in HNO 100. This information is delivered to the VRMF 1209 via GTP-C signaling.

At this point the Mobile station 142 is registered with the VVO ID to the IMS PDN 1700 in VVO 120, and the VVO 120 on behalf of the Mobile Station is registered to the IMS PDN 1700 in HNO 100 using HNO ID. This way any mobile originated call will go through the VVO IMS PDN 1700 and any call received for the VRS subscriber with the HNO ID, will be routed from the HNO 100 to the VVO 120 to be terminated to the RNO 140, where the subscriber is actually located.

Figure 26:
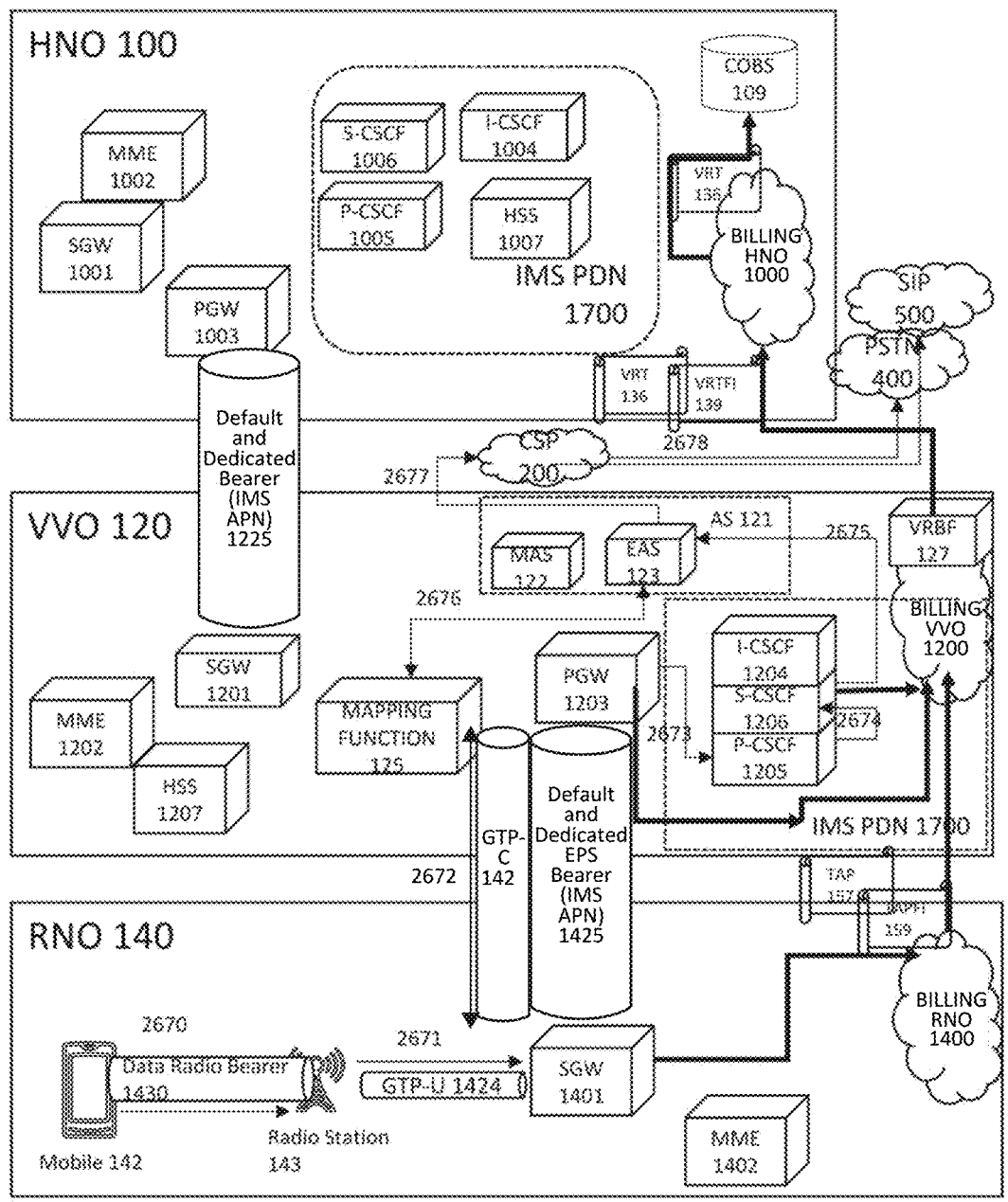
FIG. 26 is a diagram illustrating a call origination process according to another example embodiment.

FIG. 26 is a diagrammatic representation of the network architecture which depicts a virtual roaming subscriber (VRS) associated with Mobile Station 142 residing in RNO 140, originating a call in step 2670 using the voice over packet services for which it has already performed a registrations towards the IMS PDN 1700 in the VVO 120. The destination of the call can be to the legacy network PSTN 400 or towards the SIP network SIP 500.

In step 2671 via the GTP-U Tunnel 1424 the SIP signaling is sent to establish the call (SIP INVITE message). In step 2672 Default bearer tunnel 1425 is used to convey the signaling from the SGW 1401 to the PGW 1203 in the VVO 120. In step 2673, since the IMS registration process has already led to the discovery of the P-CSCF 1205 in the VVO 120, the PGW 1203 forwards the SIP signaling to the P-CSCF 1204. In step 2674 P-CSCF 1205 sends the SIP message to the S-CSCF 1206. In step 2675, due to the filter criteria as provisioned on the subscriber profile, already downloaded on to the S-CSCF 1206 from the HSS 1202, the signaling is sent to EAS 123 of AS 121. The subscriber is a unified communication subscriber and hence all calls are routed via the CSP 200. In step 2676 any mapping function required is availed by EAS 123 from MF 125. In step 2677 EAS 123 sends the call to the CSP 200 domain where the CSP 200 applies its own services of choice for the VRS subscriber. In step s978 CSP 200 sends the call out to the SIP interconnect SIP 500 to complete the call towards the terminating party.

The billing reconciliation is no different than what has been shown for call/message scenarios in the legacy systems so the same logic applies wherein the RNO 140 generated billing files are conveyed to VVO 120, which then undergoes a mapping process before being shared with HNO 100 and the financials are reconciled.

Figure 27:
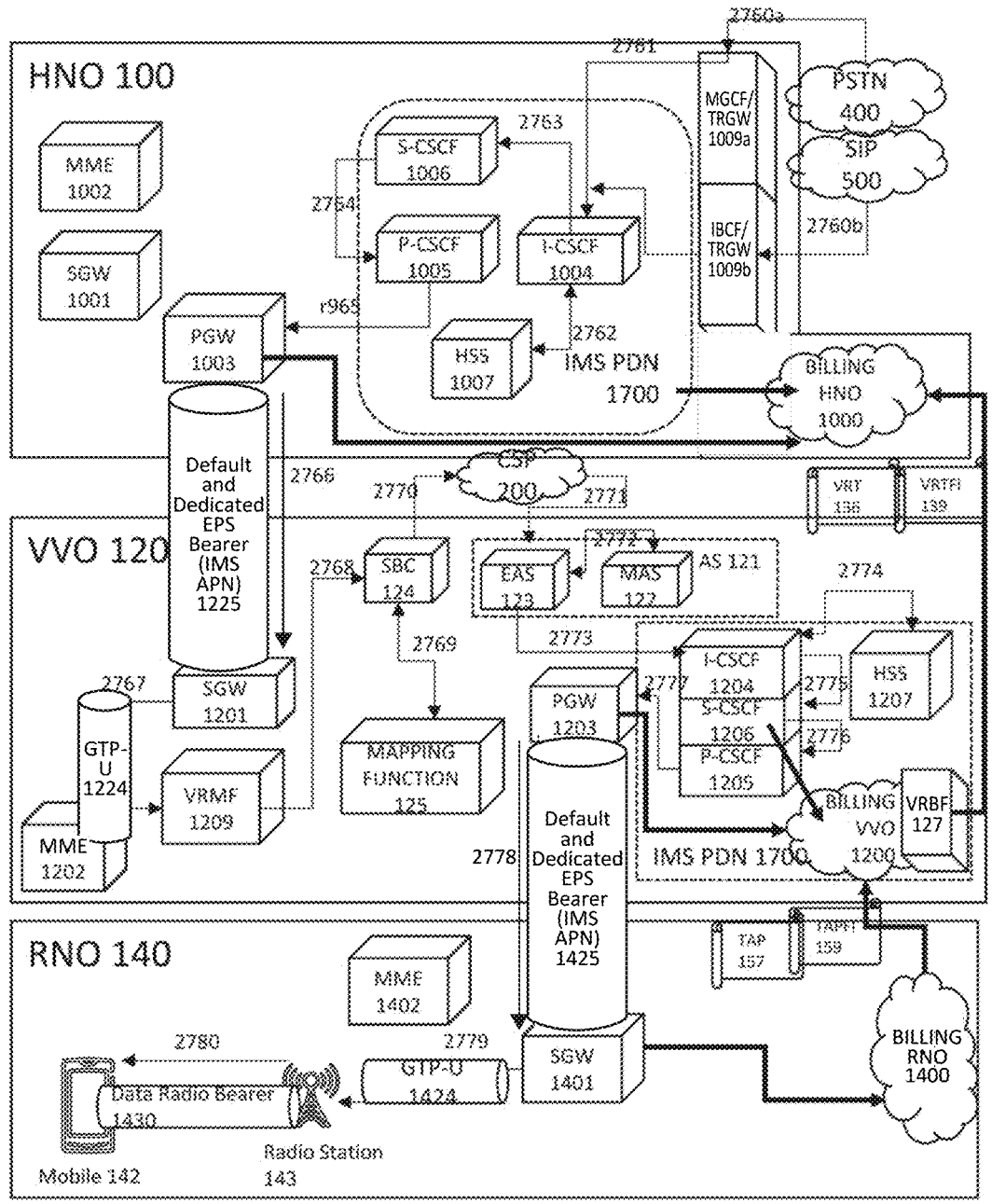
FIG. 27 is a diagram illustrating a call termination process according to another example embodiment.

FIG. 27 is a diagrammatic representation of the network architecture which depicts a virtual roaming subscriber (VRS) associated with Mobile 142 residing in RNO 140 receiving a call from either PSTN 400 via step 2760*a* or from the SIP 500 domain via step 2760*b* towards the VRS subscriber. Since VRS subscriber is known to the outside world via the HNO 100 provided public number, the calls lead to the HNO 100 network via the border gateways MGCF/TrGW 1009*a* or via IBCF/TrGW 1009*b*.

In step 2761 the call arrives at the IMS PDN 1700 via the node I-CSCF 1004. This is due to the fact that the I-CSCF is the entry node that works with HSS 1007 to determine the location of the VRS subscriber. In step 2762 I-CSCF 1004 determines the location of the subscriber by interacting with HSS 1007. In step 2763 the call is extended towards S-CSCF 1006 from I-CSCF 1004. In step 2764 S-CSCF 1006 extends the call to P-CSCF 1005. P-CSCF 1005 knows the access location of the VRS subscriber is via the PGW 1003 and knows the call related signaling is to be sent over to it. In step 2765 P-CSCF 1005 sends call related SIP signaling towards PGW 1003. PGW 1003 is aware of the pseudo location of the subscriber to be in the VVO 120 due to the IMS registration that has happened before. NOTE, this is not the actual location of the subscriber but rather an impression created by the VVO 120.

In step 2766 the call is extended over the Default EPS bearer tunnel 1225 created during the registration phase, from the PGW 1003 in HNO 100 to SGW 1201 in VVO 120. In step 2767 SGW 1201 extends the call to VRMF 1209. VRMF provides the mobility and access function that implies to SGW 1201 that the subscriber is accessing the network via the VRMF. VRMF 1209 is a multi-function node which provides, but not limited to, mapping function, access function, IP packet encapsulation and decapsulation function.

In step 2768 VRMF 1209 provides the decapsulation and IP mapping functionality that allows the VRMF to do the following: Remove the GTP headers and change the IP address source of the source IP address to its own.

In step 2768, VRMF 1209 forwards on the modified IP packet to SBC 124. In step 2769, SBC 124 invokes the mapping function MF 125 altering HNO ID to VVO ID before extending the call towards the CSP 200. In step 2770 SBC 124 extends the call towards CSP 200 for the PBX system in the CSP 200 to apply enterprise related terminating services before actually terminating to the user. In step 2771 CSP 200 by virtue of knowing that the subscriber is an enterprise based subscriber extends the call to the VVO 120 enterprise application server EAS 123 of AS 121 to terminate to the mobile leg of the enterprise VRS subscriber.

In step 2772 EAS 123 interacts with the mobility application server MAS 122 of AS 121, to locate the subscriber entry point into the IMS domain. In step 2773 EAS 123 extends the call to I-CSCF 1204 of the IMS PDN 1700 in VVO 120. In step 2774 I-CSCF 1204 extends the call to S-CSCF 1206. In step 2775 S-CSCF 1206 extends the call to P-CSCF 1205.

In step 2777 P-CSCF 1205 knows the access point of the VRS subscriber being via the PGW 1203 of VVO 120 and extends the call towards it. In step 2778 PGW 1203 extends the call to SGW 1401 over the Default EPS bearer tunnel 1425. In step 2779 SGW 1401, which has a GTP-U tunnel (default bearer) 1424 towards the Radio Station 143, extends the call over it. In step 2780, Radio Station 143 removes the GTP packet and sends the actual IP packet destined towards the Mobile Station 142 over the Data Radio Bearer 1430. The call has now reached the terminating VRS subscriber.

Figure 28:
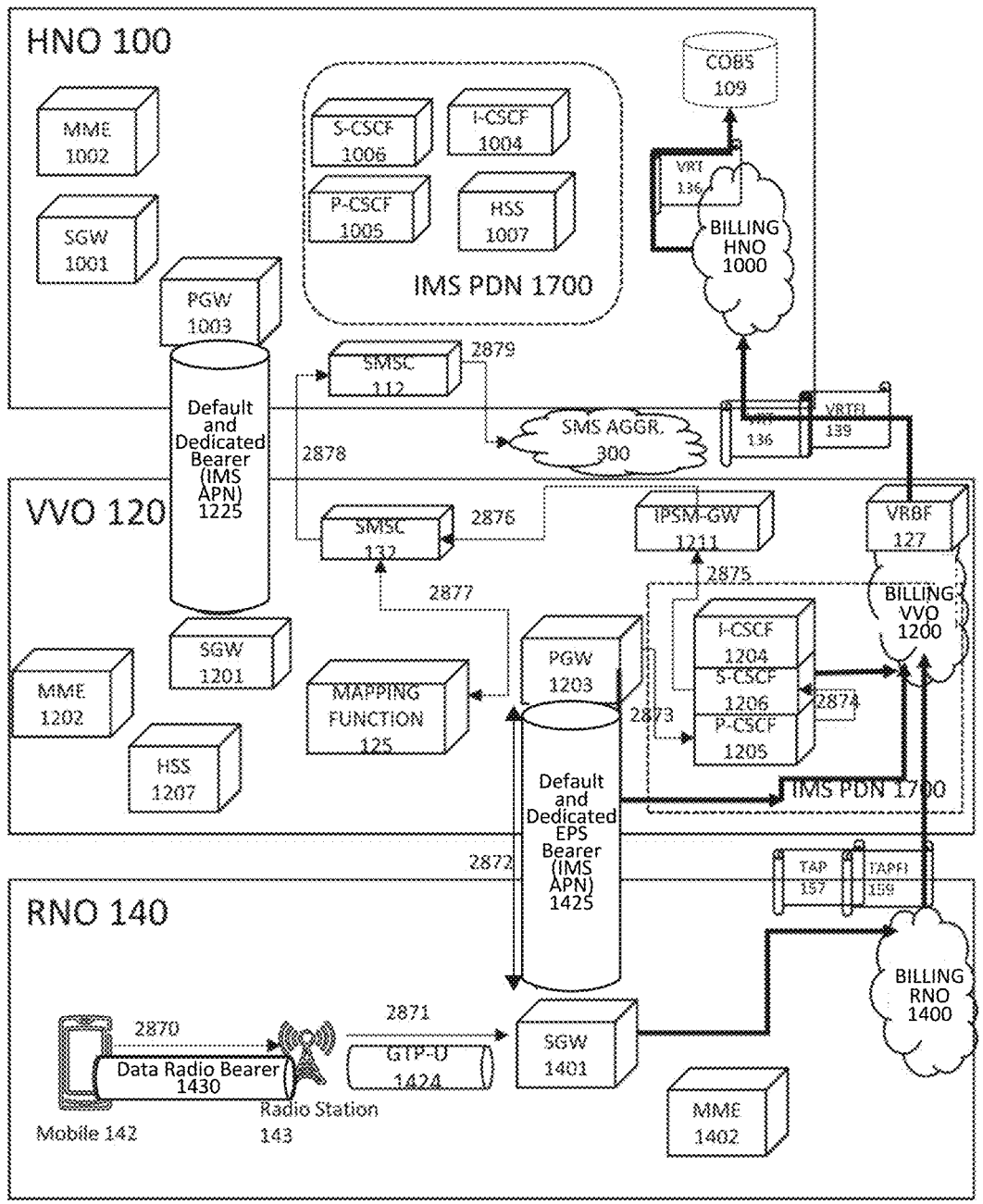
FIG. 28 is a diagram illustrating a messaging origination process according to another example embodiment.

FIG. 28 is a diagrammatic representation of the network architecture which depicts a virtual roaming subscriber (VRS) associated with Mobile 142 residing in RNO 140 originating an SMS. During the registration process towards the IMS PDN 1700 in VVO 120 the data radio bearer has already been established between the Mobile Station 142 and the Radio Station 143.

In step 2870 Mobile Station 142 sends the SIP message with the SMS content towards the network via the Radio station 143 using Data Radio Bearer 1430. In step 2871 Radio Station 143 encapsulates the SIP message in a GTP protocol and sends the message to SGW 1401 in RNO 140 over GTP-U tunnel 1424. In step 2872 SGW 1401 uses Default Bearer EPS 1425 to send the SIP message towards PGW 1203 in VV 120. PGW 1203 has an established access to the IMS PDN 1700 in VVO 120 via P-CSCF 1205. This access was established during the IMS registration process by the VRS subscriber. In step 2873 PGW 1203 extends the SIP message to P-CSCF 1205. In step 2874 P-CSCF 1205 knows which S-CSCF is serving the VRS subscriber and forwards the message to S-CSCF 1206. In step 2875 S-CSCF 1206 sends the message to IPSM-GW 1211. IPSM-GW 1211 is an interworking gateway that provides interworking between SMSC 132 and IMS PDN 1700.

In step 2876 IPSM-GW 1211 forwards the message to SMSC 132 for the message to be routed towards the SMS aggregator to eventually route it towards the terminating network. In step 2877 SMSC 132 invokes Mapping Function 125 to change VVO ID to HNO ID as the routing mechanism always routes the VRS subscriber's message via the HNO 100 network. In step 2878 SMSC 132 in VVO 120 sends the message to SMSC 112 of HNO 100. In step 2879 SMSC 112 routes the message towards SMS Aggregator 300 for the routing of the message towards the terminating network.

Figure 29:
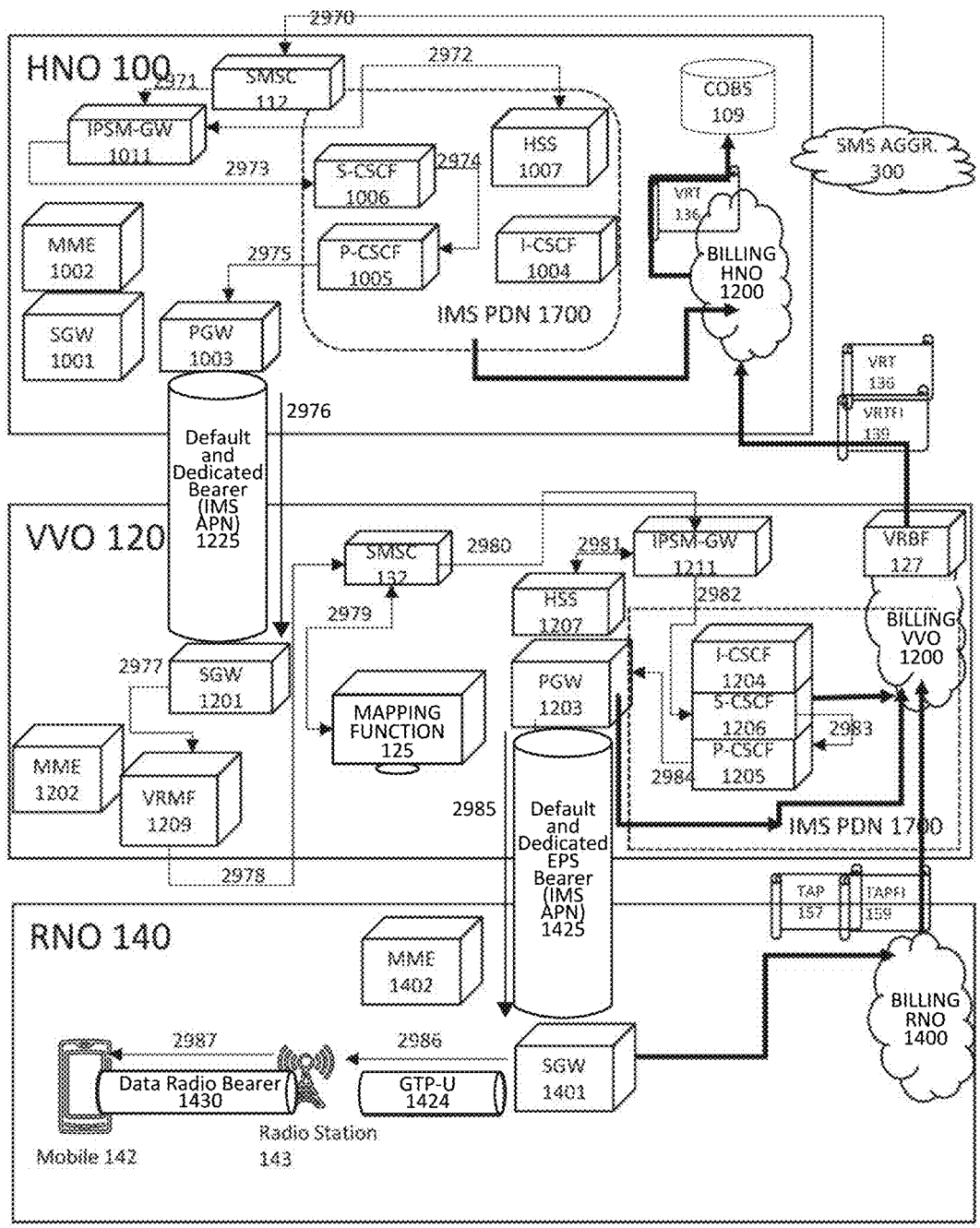
FIG. 29 is a diagram illustrating a messaging termination process according to an example embodiment.

FIG. 29 is a diagrammatic representation of the network architecture which depicts a virtual roaming subscriber (VRS) associated with Mobile 142 residing in RNO 140 receiving a message from SMS Aggregator 300 to the SMSC 112 in HNO 100 in step 2970.

In step 2971 SMSC 112 in HNO sends the message to IPSM-GW 1011 in HNO 100.

In step 2972 IPSM-GW 1011 consults HSS 1007 to determine the S-CSCF 1006 catering to the VRS subscriber using the HNO ID. In step 2973 IPSM-GW 1011 sends the message to S-CSCF 1006. In step 2974 S-CSCF 1006 sends the message to P-CSCF 1005.

In step 2975 P-CSCF 1005 knows the access to the VRS subscriber is PGW 1003 in HNO 100. NOTE, during the registration process VVO 120 has given the impression to HNO 100 that the subscriber is located at VVO. In step 2976 PGW 1003 sends the message to SGW 1201 over the Default EPS Bearer 1225. In step 2977 SGW 1201 sends the message to VRMF 1209. VRMF 1209 invokes multiple functions over here. VRMF 1209 performs decapsulation of the IP packet from the outer GTP header. VRMF also converts the source IP address to its own address in the IP header packet. In step 2978 VRMF sends the message to SMSC 132. In step 2979 SMSC 132 invokes the Mapping Function to convert HNO ID to VVO ID. In step 2980 SMSC 132 sends the message to IPSM-GW 1211. In step 2981 IPSM-GW consults with HSS 1207 to determine the serving S-CSCF address. In step 2982 IPSM-GW 1211 sends the message to S-CSCF 1206. In step 2983 S-CSCF 1206 sends the message to P-CSCF 1205. In step 2984 P-CSCF 1205 knows PGW 1203 is the access route for the VRS subscriber and sends the message to it. In step 2985 using the default EPS Bearer tunnel 1425 PGW sends the message encapsulated in the GTP header, to SGW 1401. In step 2986, SGW 1401 sends the message over GTP tunnel 1424 to the Radio Station 143. In step 2987, Radio Station decapsulates the message by removing the GTP header and sends the raw IP packet to the Mobile Station 142 via the Data Radio Bearer channel 1430.

FIG. 30 shows a summary slide of the billing handling for a VRS subscriber. To be noted is that the billing flow does not change when compared with the 3G network flows however the nodes involved in capturing raw data to generate billing TAP files to be exchanged between networks for the reconciliation change. For example, in the 4G network the SGW in RNO plays the role of VMSC/VLR in the RNO.

The information captured to generate billing records towards the billing domain to be used by the TAP procedure are also different between CS and PS networks. However the end goal for the virtual roaming charging remains the same.

Important point to note in this figure is that not all billing flows are applicable in all scenarios. Billing flows from any network are only applicable when a communication mode traverses through that network.

For example, if the VRS subscriber is located in the RNO 140 and originates a voice call towards a PSTN user and the destination user is in no way associated with either of these three networks (RNO 140, VVO 120, HNO 100), wherein the call path involves RNO 140, VVO 120, CSP 200 and out to the PSTN 400—in this case there will be billing information exchanged between the RNO 140 and VVO 120. This means TAPFI 159, TAP 157 from RNO 140 and VRT 136 and VRTFI 139 from VVO 120 shall be involved in the billing flow. Although HNO 100 shall be the recipient of billing information from VVO 120, it shall not generate and send any billing files for the usage by VRS subscriber, towards the VVO 120.

Similarly, if the VRS subscriber originates an SMS from HNO 100 to a PSTN user, the communication path traverses HNO 100 and VVO 120 and thereby the billing exchanges in the form of TAP 117 and VRTFI 119 from HNO 100 and VRT 136 and VRTFI 139 from RNO 120 shall take place.

Figure 31:
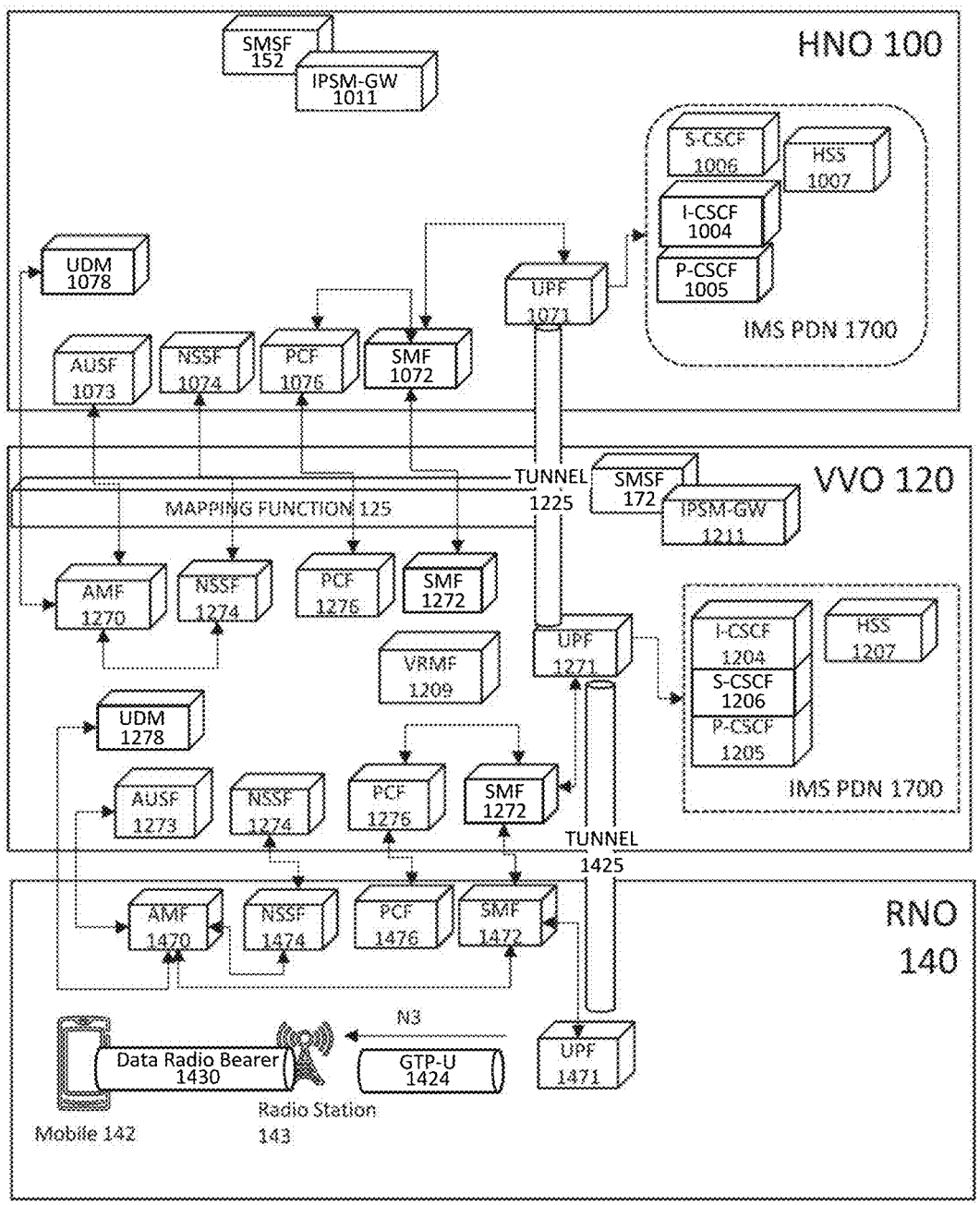
FIG. 31 is a diagram illustrating a virtual roaming architecture according to an example embodiment.

FIG. 31 is a diagrammatic representation of the 5G architecture providing an overview of how the VRS concept applies. For the configurations of the 5G deployment where there is CUPS employed between the 4G enodeB (radio access) and NR gNB (New Radio gnodeB or 5G radio access) deployed in an NSA (Non-Standalone Mode) the core architecture remains the same and since the VRS solution does not demand anything in particular from the Mobile Handsets (102 or 142), the concept of the VRS solution remains the same.

This section discusses how VRS may be deployed in a 5G environment. Firstly, the VVO 120 core network changes from 4G EPC to SGC; the handling of subscriber identifiers remains the same although the subscriber identifiers are named differently (SUPI—Subscriber Permanent Identifier which may be IMSI). The VRMF 1209 is envisioned to play the same role of proxy access, encapsulator/decapsulator, and with the aid of the Mapping Function 125 the roles will essentially remain the same.

As networks transition to 5G, 6G and beyond, core network interworking will be further defined. RNO 140, HNO 100 shall correspondingly be upgraded. VVO 120 maintains the flexibility of rendering backward compatibility with the aid of the MF 125 and VRMF 1209 interworking with a more modern core network for the same call or data session.

VVO 120 shall adopt all the 5G core network functions namely SMF 1272 to manage user plane function UPF 1271, AMF 1270 to interwork with VRMF 1209 and provide a proxy access for VRS subscriber towards the HNO 100, UDM 1278 to store VRS subscriber credentials and service information, AUSF 1273 for interworking with RNO access.

Figure 32:
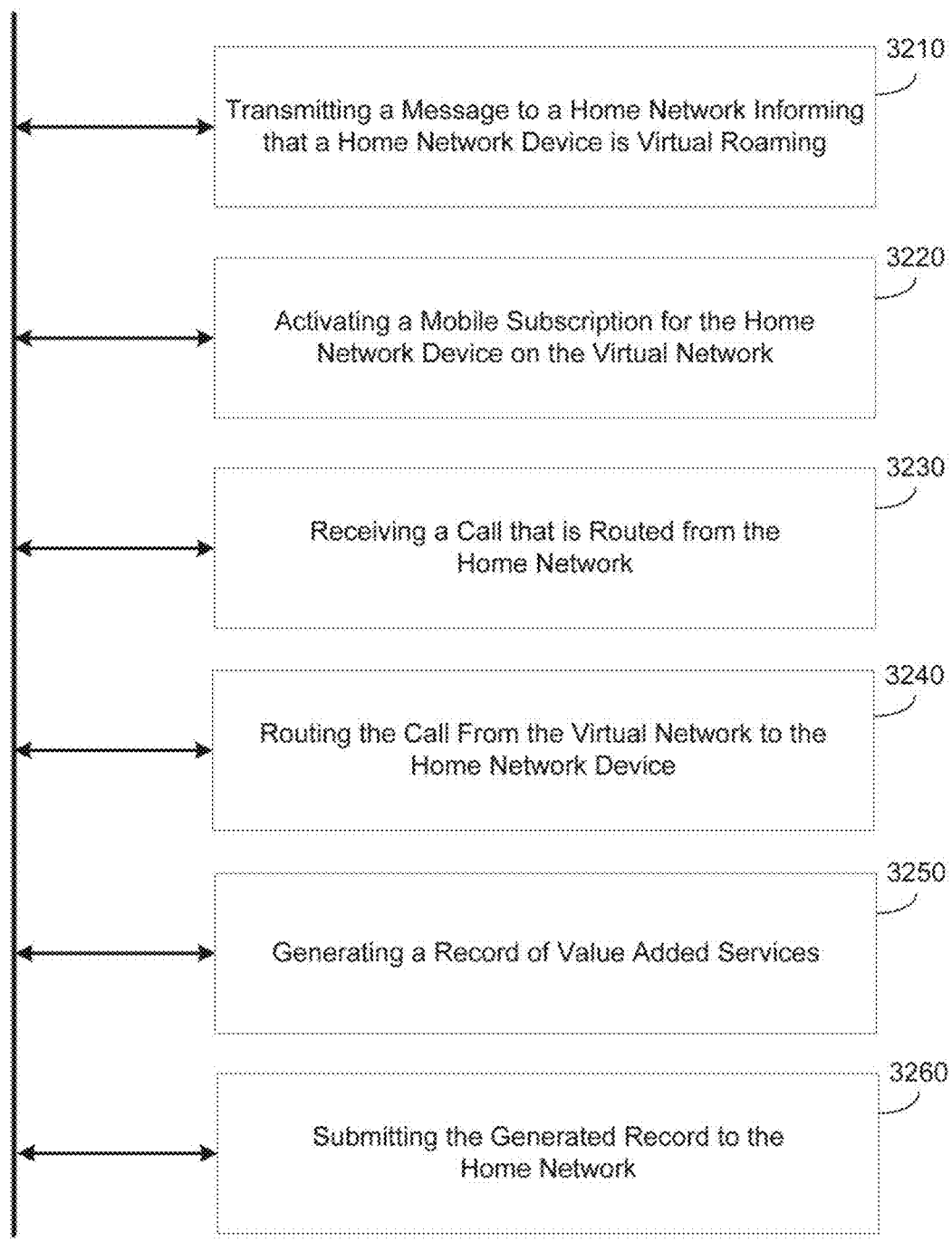
FIG. 32 is a diagram illustrating a method of routing, via the virtual network, a call for a home network subscriber device that is routed from a home network according to an example embodiment.

FIG. 32 illustrates a method 3200 of routing, via the virtual network, a call for a home network subscriber device that is routed from a home network according to an example embodiment. Referring to FIG. 32, in 3210, the method may include transmitting, via a virtual network, a message to a home network informing the home network that a home network subscriber device is roaming on the virtual network. In 3220, the method may include activating, via the virtual network, a mobile subscription for the home network subscriber device on the virtual network. In 3230, the method may include receiving, via the virtual network, a call for the home network subscriber device that is routed from the home network. In 3240, the method may include routing the call from the virtual network to the home network subscriber device with the activated mobile subscription, wherein the routing further comprises executing, via the virtual network, value added services while routing the call from the virtual network to the home network subscriber device. In 3250, the method may include generating, via the virtual network, a record of the executed value added services. In 3260, the method may include submitting, via the virtual network, the generated record to the home network.

In some embodiments, the method may further include activating a bilateral roaming agreement between the home network and the virtual network which allows the home network subscriber device to utilize a serving network of the virtual network. In some embodiments, the executing may include one or more of sending a message to service provider of the home network subscriber device, recording the call, sending a copy of the call to the service provider, and routing the call or session to another session control service to apply one or more of unified communications, contact center, and PBX services. In some embodiments, the method may further include transmitting, via the virtual network, a message to the home network which comprises an indicator that the home network subscriber device is virtually roaming on the virtual network.

In some embodiments, the method may further include continuously sending, via the virtual network, the message to the home network until a termination condition of the virtual roaming. In some embodiments, the method may further include generating, by the virtual network, a record for the call for the home network subscriber device and delivering the record to the home network subscriber device. In some embodiments, the record for the call generated by the virtual network is equivalent in value to a record received by the home network for delivering the call to the virtual network. In some embodiments, the activating the mobile subscription may be performed via a subscriber identity module (SIM) card installed within the home network subscriber device.

With the enhancements of the current functions, upgrading and adopting new 5G core functions and promoting an open interface to begin with (HTTP/HTTPS) the VRS solution, as claimed by this document, can accommodate next generations architecture for 5G, 6G and beyond.

What is claimed is:

1. A method comprising:
   transmitting, by a virtual network, a message to a home network informing the home network that a home network subscriber device is roaming on the virtual network;
   activating, by the virtual network, a mobile subscription for the home network subscriber device on the virtual network;
   receiving, by the virtual network, a call for the home network subscriber device that is routed from the home network;
   routing, by the virtual network, the call to the home network subscriber device, wherein the routing further comprises executing value added services while routing the call from the virtual network to the home network subscriber device;
   generating, by the virtual network, a record of the executed value added services; and
   submitting, by the virtual network, the generated record to the home network.

2. The method of claim 1, the method further comprising:
   activating a bilateral roaming agreement between the home network and the virtual network which allows the home network subscriber device to utilize a serving network of the virtual network.

3. The method of claim 1, wherein the executing the value added services comprises one or more of:
   sending a message to a service provider of the home network subscriber device,
   recording the call,
   sending a copy of the call to the service provider, and
   routing the call or session to another session control service to apply one or more of unified communications, contact center, and PBX services.

4. The method of claim 1, the method further comprising:
   transmitting, by the virtual network, a message to the home network, the message comprising an indicator indicating that the home network subscriber device is virtually roaming on the virtual network.

5. The method of claim 4, the method further comprising:
   continuously sending, by the virtual network, the message to the home network until a termination condition of the virtual roaming.

6. The method of claim 1, the method further comprising:
   generating, by the virtual network, a record for the call for the home network subscriber device; and
   delivering, by the virtual network, the record to the home network subscriber device.

7. The method of claim 6, wherein a value of the record for the call generated by the virtual network is equivalent to a value associated with a record generated by the home network for delivering the call to the virtual network.

8. The method of claim 1, wherein the activating the mobile subscription is performed by a subscriber identity module (SIM) card installed within the home network subscriber device.

9. An apparatus comprising:
   a network interface configured to transmit, via a virtual network, a message to a home network informing the home network that a home network subscriber device is roaming on the virtual network; and
   a processor of the virtual network, the processor configured to:
      activate a mobile subscription for the home network subscriber device on the virtual network;
      receive a call for the home network subscriber device that is routed from the home network;
      route the call from the virtual network to the home network subscriber device;
      execute value added services while routing the call from the virtual network to the home network subscriber device;
      generate a record of the executed value added services; and
      submit the generated record to the home network.

10. The apparatus of claim 9, wherein the processor is further configured to:
    activate a bilateral roaming agreement between the home network and the virtual network which allows the home network subscriber device to utilize a serving network of the virtual network.

11. The apparatus of claim 9, wherein, when the processor executes the value added services, the processor is further configured to one or more of:
    send a message to a service provider of the home network subscriber device,
    record the call,
    send a copy of the call to the service provider, and
    route the call or session to another session control service to apply one or more of unified communications, contact center, and PBX services.

12. The apparatus of claim 9, wherein the network interface is further configured to:
    transmit, via the virtual network, a message to the home network, the message comprising an indicator indicating that the home network subscriber device is virtually roaming on the virtual network.

13. The apparatus of claim 12, wherein the processor is further configured to:
    continuously send, via the virtual network, the message to the home network until a termination condition of the virtual roaming.

14. The apparatus of claim 9, wherein the processor is further configured to:
    generate a record for the call for the home network subscriber device; and
    deliver the record to the home network subscriber device.

15. The apparatus of claim 14, wherein the record for the call generated by the virtual network is equivalent in value to a record received by the home network for delivering the call to the virtual network.

16. The apparatus of claim 9, wherein the processor is further configured to:
activate the mobile subscription via a subscriber identity module (SIM) card installed within the home network subscriber device.

17. A non-transitory computer-readable medium comprising instructions that when executed by a processor of a virtual network cause the processor to perform:
transmitting, via the virtual network, a message to a home network informing the home network that a home network subscriber device is roaming on the virtual network;
activating, via the virtual network, a mobile subscription for the home network subscriber device on the virtual network;
receiving, via the virtual network, a call for the home network subscriber device that is routed from the home network;
routing, via the virtual network, the call to the home network subscriber device with the activated mobile subscription, wherein the routing further comprises executing value added services while routing the call from the virtual network to the home network subscriber device;
generating, via the virtual network, a record of the executed value added services; and
submitting, via the virtual network, the generated record to the home network.

18. The non-transitory computer-readable medium of claim 17, wherein the instructions further cause the processor to perform:
activating a bilateral roaming agreement between the home network and the virtual network which allows the home network subscriber device to utilize a serving network of the virtual network.

19. The non-transitory computer-readable medium of claim 17, wherein the executing the value added services comprises one or more of:
sending a message to a service provider of the home network subscriber device,
recording the call,
sending a copy of the call to the service provider, and
routing the call or session to another session control service to apply one or more of unified communications, contact center, and PBX services.

20. The non-transitory computer-readable medium of claim 17, wherein the instructions further cause the processor to perform:
transmitting, via the virtual network, a message to the home network, the message comprising an indicator indicating that the home network subscriber device is virtually roaming on the virtual network.

* * * * *